(12) United States Patent
Miyazaki

(10) Patent No.: US 9,997,088 B2
(45) Date of Patent: Jun. 12, 2018

(54) PELVIC MODEL

(71) Applicant: Douglas Miyazaki, Winston-Salem, NC (US)

(72) Inventor: Douglas Miyazaki, Winston-Salem, NC (US)

( * ) Notice: Subject to any disclaimer, the term of this patent is extended or adjusted under 35 U.S.C. 154(b) by 0 days. days.

(21) Appl. No.: 15/786,280

(22) Filed: Oct. 17, 2017

(65) Prior Publication Data

US 2018/0102069 A1 Apr. 12, 2018

Related U.S. Application Data

(63) Continuation of application No. 14/510,761, filed on Oct. 9, 2014, now Pat. No. 9,830,834.

(51) Int. Cl.
*G09B 23/28* (2006.01)
*G09B 23/34* (2006.01)

(52) U.S. Cl.
CPC .................................. *G09B 23/34* (2013.01)

(58) Field of Classification Search
USPC ......................................................... 434/272
See application file for complete search history.

(56) References Cited

U.S. PATENT DOCUMENTS

| | | | |
|---|---|---|---|
| 2,324,702 A | 7/1943 | Hoffman et al. | |
| 2,495,568 A | 1/1950 | Kanning et al. | |
| 2,763,070 A | 9/1956 | McCormick | |
| 3,921,311 A | 11/1975 | Beasley et al. | |
| 4,433,961 A | 2/1984 | Chandler | |
| 4,439,162 A | 3/1984 | Blaine | |
| 4,734,039 A | 3/1988 | Thompson | |
| 4,773,865 A | 9/1988 | Baldwin | |
| 4,789,340 A | 12/1988 | Zikria | |
| 5,061,187 A | 10/1991 | Jerath | |
| 5,104,328 A | 4/1992 | Lounsbury | |
| 5,403,191 A | 4/1995 | Tuason | |
| 5,472,345 A | 12/1995 | Eggert | |
| 5,518,407 A | 5/1996 | Greenfield et al. | |
| 5,775,916 A | 7/1998 | Cooper et al. | |
| 6,062,866 A | 5/2000 | Prom | |
| 6,336,812 B1 | 1/2002 | Cooper et al. | |
| 6,428,323 B1 | 8/2002 | Pugh | |
| 6,503,087 B1 | 1/2003 | Eggert | |
| 6,780,016 B1 | 8/2004 | Toyl | |
| 7,080,984 B1 | 7/2006 | Cohen | |
| 7,241,145 B2 | 7/2007 | Riener et al. | |

(Continued)

OTHER PUBLICATIONS

"Advanced Surgical Uterus, Part #60287", [online]. © Copyright 2010 Limbs & Things LTD. [retrieved Jul. 22, 2010], Retrieved from the Internet: <URL: http://www.golimbs.com/products.php?id=60287>, 1 pg.

(Continued)

*Primary Examiner* — Kesha Frisby
(74) *Attorney, Agent, or Firm* — Kilpatrick Townsend & Stockton LLP

(57) ABSTRACT

Devices, systems, and methods for practicing, teaching, and/or simulating various surgical procedures are disclosed. For example, devices, systems, and methods for practicing, teaching, and/or evaluating physician competency in various surgical procedures or techniques are disclosed. As another example, devices, systems, and methods for practicing, teaching, simulating, and/or evaluating surgeon competency for a surgical procedure, such as a vaginal hysterectomy, and/or technique are disclosed.

19 Claims, 41 Drawing Sheets

(56) References Cited

U.S. PATENT DOCUMENTS

| | | | |
|---|---|---|---|
| 7,465,168 | B2 | 12/2008 | Allen et al. |
| 7,553,159 | B1 | 6/2009 | Arnal et al. |
| 7,632,100 | B2 | 12/2009 | Allen et al. |
| 7,648,367 | B1 | 1/2010 | Makower et al. |
| 8,166,834 | B2 | 5/2012 | Dougherty |
| 2005/0214727 | A1 | 9/2005 | Stoianovici et al. |
| 2006/0073456 | A1 | 4/2006 | Allen et al. |
| 2006/0166681 | A1 | 7/2006 | Lohbihler |
| 2008/0131855 | A1 | 6/2008 | Eggert et al. |
| 2008/0138778 | A1 | 6/2008 | Eggert et al. |
| 2008/0138779 | A1 | 6/2008 | Eggert et al. |
| 2008/0138780 | A1 | 6/2008 | Eggert et al. |
| 2009/0208915 | A1 | 8/2009 | Pugh |
| 2010/0086906 | A1 | 4/2010 | Allen et al. |
| 2011/0091855 | A1 | 4/2011 | Miyazaki |
| 2012/0245490 | A1 | 9/2012 | Fausett et al. |

OTHER PUBLICATIONS

Gardner, R., "Simulation n Obstetrics and Gynecology," Obstetrics and Gynecology Clinics on North America, 35(1), Mar. 2008, 97-127.

"Helix Connectors (Pack of 10), Part #90100", [online]. © Copyright 2010 Limbs & Things LTD. [retrieved Jul. 22, 2010]. Retrieved from the Internet: <URL: http://www.golimbs.com/products.php?id=90100>, 1 pg.

"Surgical Female Pelvic Trainer (SFPT) with Advanced Surgical Uterus, Part #60283", [online]. © Copyright 2010 Limbs & Things LTD. [retrieved Jul. 22, 2010], Retrieved from the Internet: <URL: http://www.golimbs.com/products.php?id=60283>, 1 pg.

Moen. M. D. et al.. "Natural orifice hysterectomy". International Urogynecology Journal, 19(9), (2008), 1189-1192.

Semm, K,, "Pelvi-Trainer, ein Obungsgeratfurdie operative Pelviskopie zum Erleren endoskopischer Ligatur und Nahttechniken [Pelvi-trainer, a training device in operative pelviscopy for teaching endoscopic ligation and sulture technics]", (w/ English Abstract), Geburtshilfe und Frauenheilkunde. 46(1). (1986), 60-62.

Tu. F. F. et al. "Route of Hysterectomy Influence and Teaching Hospital Status". Obstetrics & Gynecology. 114(1). (2009), 1374-1375.

International Application Serial No. PCT/US2010/002743, Search Report dated Jan. 31, 2011.

International Application Serial No. PCT/US2010/002743, Written Opinion dated Jan. 31, 2011.

The Creation of a Pelvic Surgery Training Model for: Vaginal Hysterectomy Urethral Sling Procedures, Steve Lieberman, web page at http://www.youtube.com/watch?v=Eq0aHeLcwIg &list=UU4-hAg3KomFZX-2lqkvt5Hw, published May 20, 2012.

Miya Model the first affordable realitistic model for training pelvic surgeries, Steve Lieberman, web page at http://www.youtube.com/watch?v=9WdxtOjeeVk&list=UU4-hAg3KomFZX-2lqkvt5Hw, published Jun. 28, 2012.

MiyaModel, Steve Lieberman, web page at http://www.youtube.com/watch?v=nDpWB1GpdTl&list=UU4-hAg3KomFZX-2lqkv15Hw, published Jun. 28, 2012.

MiyaModel™ Pelvic Surgery Training Model, Steve Lieberman, web page at http://www.youtube.com/watch?v=A2RjOgVRclo &list=UU4-hAg3KomFZX-2lqkvt5Hw, published Oct. 9, 2013.

Teaching Vaginal Hysterectomy Through Simulation 9 20 13—MiyaModel, web page at http://www.youtube.com/watch?v=dwiOz4DTyy8&list=UU4-hAg3KomFZX-2lqkvt5Hw, published Jun. 11, 2014.

MiyaModel™ Pelvic Surgery Training Model, web page at https://web.archive.org/web/20130526125546/http://www.miyazakienterprises.com, as available via the Internet and printed May 26, 2013.

United States Patent and Trademark Office, Office Action, U.S. Appl. No. 12/904,623 dated Apr. 22, 2014.

United States Patent and Trademark Office, Office Action, U.S. Appl. No. 12/904,623 dated Apr. 24, 2013.

United States Patent and Trademark Office, Office Action, U.S. Appl. No. 12/904,623 dated Nov. 6, 2013.

PELVIC MODEL

CROSS-REFERENCE TO RELATED APPLICATIONS

This application is a continuation of U.S. application Ser. No. 14/510,761, filed Oct. 9, 2014, entitled "Pelvic Model," the entirety of which is hereby incorporated by reference.

TECHNICAL FIELD

The present disclosure relates generally to devices, systems, and methods for practicing, teaching, and/or simulating various surgical procedures. In particular, this disclosure relates to devices, systems, and methods for practicing, teaching, and/or evaluating physician competency in various surgical procedures or techniques. More specifically, but not by way of limitation, this disclosure relates to devices, systems, and methods for practicing, teaching, simulating, and/or evaluating surgeon competency for various surgical procedures or techniques, such as a vaginal hysterectomy.

BACKGROUND

Surgical techniques can be learned through the study of surgical procedures, viewing videos of surgeries, and/or observing and assisting in live surgeries under the instruction of a skilled surgeon. The current "hands on" apprenticeship method of teaching surgery and the philosophy of "see one, do one, teach one" can pose substantial risk to live patients in an operating or surgical room. Furthermore, the need for an appropriate live patient or "teaching case" can limit physician training, and can expose physicians and teaching hospitals to potential malpractice suits and increased insurance premiums. More recently, due to the risks of malpractice suits, fewer qualified physicians are teaching surgical procedures, resulting in fewer physicians who are well-trained in surgical procedures.

Cadavers can also be used to teach surgical procedures, but cadavers are expensive and pose risks of disease transmission to or by the physician. The cost to provide a cadaver lab and the ancillary personnel to staff the lab and perform training makes it unfeasible for many hospitals. As a result, these physicians may be required to travel to cadaver seminars thereby increasing the costs associated with cadaver training. For religious and cultural reasons, some physicians object to the use of cadavers to teach surgical procedures. Another drawback of using cadavers is that once a specific area of a cadaver has been operated on, the tissues are destroyed and cannot be used again to repeat the procedure. The application of preservatives, cooling, freezing, or other methods to prevent decomposition of cadaver tissue can affect the feel, softness, firmness, consistency, or texture, so that the cadaver tissue does not mimic living tissue. It can be challenging to develop realistic medical simulation tools for delivering high quality training to practitioners.

SUMMARY

Embodiments provide devices, systems, and methods for a pelvic model. In one embodiment, a pelvic model comprises a stand, a pelvic bone module, a uterus module, a bladder module, a vagina module, and a vulva module. The pelvic bone module can comprise a means for attaching to and detaching from the stand and the stand can comprise a corresponding means for receiving the pelvic bone module. The uterus module can comprise a means for attaching to and detaching from the pelvic bone module and the pelvic bone module can comprise a corresponding means for receiving the uterus module. The bladder module can comprise a means for attaching to and detaching from the pelvic bone module and the pelvic bone module can comprise a corresponding means for receiving the bladder module. The vagina module can comprise a means for attaching to and detaching from the pelvic bone module and the pelvic bone module can comprise a corresponding means for receiving the vagina module. The vulva module can comprise a means for attaching to and detaching from the pelvic bone module and the pelvic bone module can comprise a corresponding means for receiving the vulva module. In some embodiments, the pelvic model comprises a sacrospinous ligament module, an obturator module, and a perineum module. The sacrospinous ligament module can comprise a means for attaching to and detaching from the pelvic bone module and the pelvic bone module can comprise a corresponding means for receiving the sacrospinous ligament module. The obtruator module can comprise a means for attaching to and detaching from the pelvic bone module and the pelvic bone module can comprise a corresponding means for receiving the obturator module. The perineum module can comprise a means for attaching to and detaching from the pelvic bone module and the pelvic bone module can comprise a corresponding means for receiving the perineum module. Numerous other embodiments are disclosed herein and variations are within the scope of this disclosure.

In some embodiments, a pelvic model comprises a pelvic bone module and a vagina module. The pelvic pone module can comprise a plurality of pegs and the vagina module can comprise a plurality of openings corresponding to the plurality of pegs. The vagina module may be attachable to and detachable from the pelvic bone module by slipping each of the plurality of openings over a respective peg from the plurality of pegs. The vagina module may comprise a first material defining a vagina and the plurality of openings. The vagina may comprise a thickness between two millimeters and five millimeters. The vagina module can comprise a second material defining an endopelvic fascia layer. The vagina module can comprise a means of permanently attaching the endopelvic fascia layer and the vagina. The endopelvic fascia layer may comprise a means of attaching the vagina module to and detaching the vagina module from the pelvic bone structure. The pelvic model may comprise a bladder module defining a bladder, the bladder module attachable to and detachable from the pelvic bone module, the bladder module comprising a sensor configured to detect at least one of a nick, a cut, or a puncture of at least part of the bladder. The pelvic model can have a stand comprising a base and a camera. The base may have a display for displaying a video feed from the camera. The pelvic model may have a camera and a means for sending a video feed from the camera to a separate electronic device from the pelvic model. The pelvic model may have a vulva module attachable to and detachable from the pelvic bone module. The vulva module can define a first vaginal opening corresponding with a second vaginal opening on the vagina module when the pelvic model is assembled. In embodiments, the vulva module and the vagina module are not attached when the pelvic model is assembled. Numerous other embodiments are disclosed herein and variations are within the scope of this disclosure.

In embodiments, a vagina module for use in a pelvic model is disclosed. The vagina module may comprise a first material defining a vagina and a plurality of openings for attaching the vagina module to a pelvic bone module in the pelvic model. The plurality of openings may comprise a first opening, a second opening, and a third opening configured to be slid over mating pegs in the pelvic bone module. The first opening, the second opening, and the third opening can form a triangular shape. The first material may a cervix opening for receiving a part of a uterus module in the pelvic model and/or a urethra opening. The first material may define a vaginal wall in the vagina, the vaginal wall comprising a plurality of ridges. The first material may have a durometer of approximately 10 on a Shore 00 scale. At least part of the vagina may be reinforced with a subcutaneous mesh. At least part of the vagina may have a thickness between two millimeters and five millimeters. The vagina module can have a second material defining an endopelvic fascia layer. The second material may have a durometer of approximately 20 on a Shore 00 scale. The second material can define a plurality of fittings for attaching the vagina module to the pelvic bone module in the pelvic model. At least part of the vagina may be glued to at least part of the endopelvic fascia layer using a filler material. The filler material may have a durometer of approximately 10 on a Shore 00 scale. Numerous other embodiments are disclosed herein and variations are within the scope of this disclosure.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
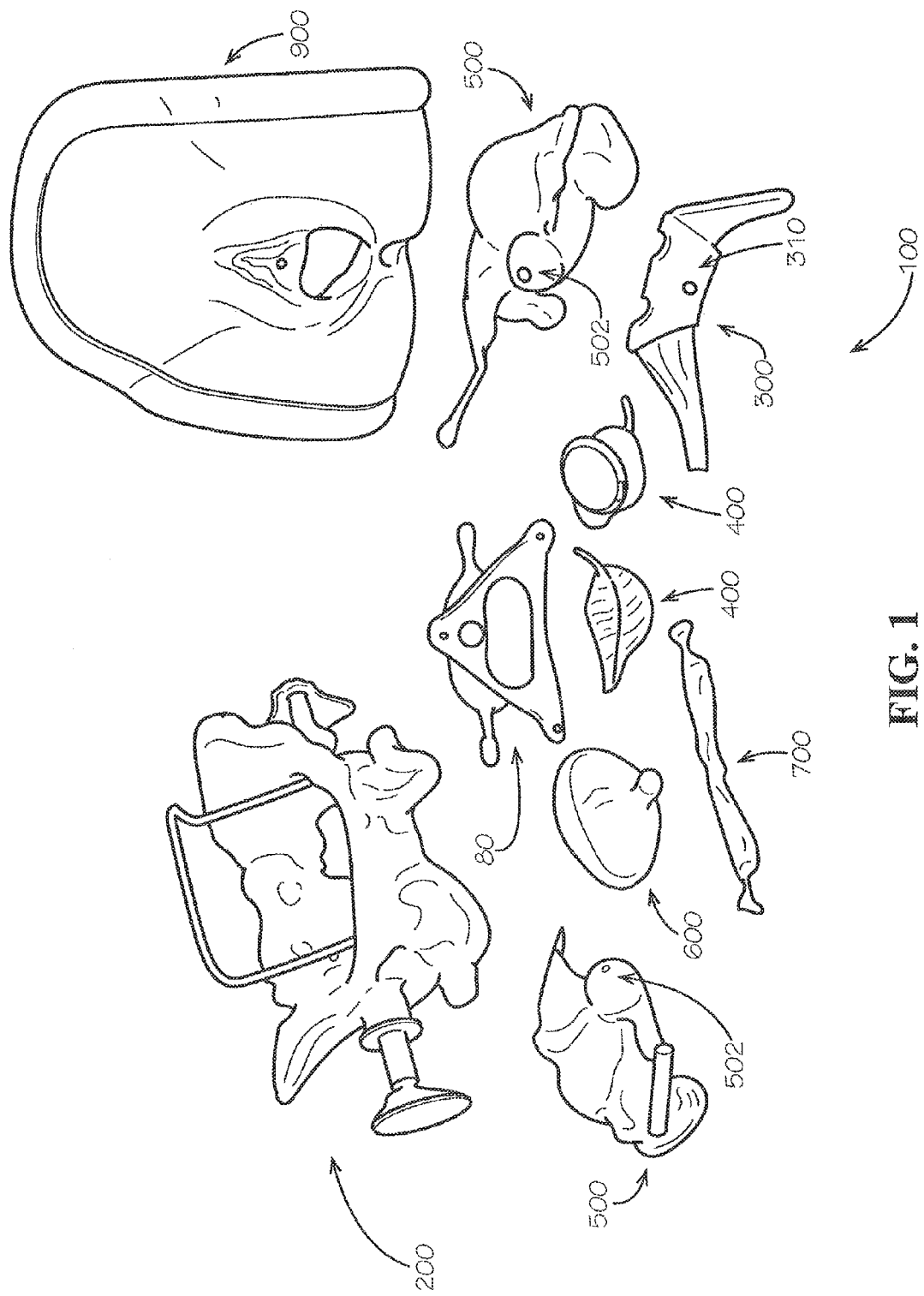
FIGS. 1-3 illustrates aspects of an illustrative pelvic model according to an embodiment.

Embodiments described herein provide devices, systems, and methods for practicing, teaching, and/or simulating various surgical procedures. Embodiments described herein provide devices, systems, and methods for practicing, teaching, and/or evaluating physician competency in various surgical procedures or techniques. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve specific goals, such as compliance with business-related constraints, design-related constraints, and/or existing products, and that these specific goals will vary form one implementation to another.

In embodiments, a pelvic model of the present invention can include additional features. For example, stand 150, pelvic bone module 200, and certain other modules described herein can have additional features as described in U.S. application Ser. No. 12/904,623, the entirety of which is hereby incorporated by reference.

The following parts list is provided by way of example to aid the reader and to illustrate aspects of example models shown in the figures. Some embodiments may include fewer, more, or different parts.

PARTS LIST (REFERENCE NUMBER—PART)

100—Pelvic model
  150—Stand
  200—Pelvic bone module
  300—Sacrospinous ligament module
  400—Obturator module
  500—Uterus module
  600—Bladder module
  700—Perineum module
  800—Vagina module
  900—Vulva module
150—Stand
  152—Base
  154—Post
  156—Crossbar with a horizontal member 158, a left vertical member 160, and a right vertical member 162
  158—Horizontal member of crossbar 156
  160—Left vertical member of crossbar 156
  162—Right vertical member of crossbar 156
  164—Bolt to attach crossbar 156 with post 154 and to provide horizontal rotational locking 166—Groove in left vertical member 160 of crossbar 156 for attaching left rod 214 of pelvic bone module 200 with stand 150
168—Groove in right vertical member 162 of crossbar 156 for attaching right rod 216 of pelvic bone module 200 with stand 150
200—Pelvic bone module
    202—Bottom threaded receptacle for attaching vulva module 900 to pelvic bone module 200
    204—Left threaded receptacle for attaching vulva module 900 to pelvic bone module 200
    206—Right threaded receptacle for attaching vulva module 900 to pelvic bone module 200
    208—Bottom bolt to attach sacrospinous ligament module 300 to pelvic bone module and/or to attached vulva module 900 to pelvic bone module 200
    210—Left bolt to attach vulva module 900 to pelvic bone module 200
    212—Right bolt for attaching vulva module 900 to pelvic bone module 200
    214—Left rod for attaching pelvic bone module 200 to stand 150
    216—Right rod for attaching pelvic bone module 200 to stand 150
    218—Top peg for attaching vagina module 800 to the pelvic bone module 200
    220—Left peg for attaching vagina module 800 to pelvic bone module 200
    222—Right peg for attaching vagina module 800 to pelvic bone module 200
    224—Left groove or attaching perineum module 700 to pelvic bone module 200
    226—Right groove for attaching perineum module 700 to pelvic bone module 200
    228—Top groove for attaching bladder module 600 to pelvic bone module 200
    230—Bottom groove for attaching bladder module 600 to pelvic bone module 200
    232—Left sliding receptacle for attaching uterus module 500 to pelvic bone module 200
    234—Right sliding receptacle for attaching uterus module 500 to pelvic bone module 200
    236—Rotation Bar
    242—Left vertical rotation lock bolt
    244—Right vertical rotation lock bolt
    246—Left rotational locking plate (connected to left rod 214 and slides on outside of left groove 224, locks in position when left vertical rotation lock 242 tightened)
    248—Right rotational locking plate (connected to right rod 216 and slides on outside of right groove 226, locks in position when right vertical rotation lock 244 tightened)
    250—Left vertical rotation restraint opening
    252—Right vertical rotation restraint opening
    254—Support plate
    256—Left snap fitting receptacle for connecting obturator module 400 to the pelvic bone module 200
    258—Right snap fitting receptacle for connecting obturator module 400 to the pelvic bone module 200
    260—Coccyx of pelvic bone module 200
300—Sacrospinous ligament module
    302—Left snap fitting for connecting sacrospinous ligament module 300 to the pelvic bone module 200
    304—Right snap fitting for connecting sacrospinous ligament module 300 to the pelvic bone module 200
    306—Left portion of the sacrospinous ligament module 300
    308—Right portion of the sacrospinous ligament module 300
    310—Center portion of the sacrospinous ligament module 300
400—Obturator module
    401—Frame of obturator module 400
    402—Left snap fitting of frame 401 for connecting obturator module 400 to pelvic bone module 200
    404—Right snap fitting of frame 401 for connecting obturator module 400 to pelvic bone module 200
    406—Obturator membrane of obturator module 400
    408—Obturator internus of obturator module 400
    410—Arcus tendonitis fascia pelvis of obturator module 400
500—Uterus module
    502—Uterus opening (cervix) of uterus module 500
    504—Left sliding rod for attaching uterus module 500 to pelvic bone module in groove 232
    506—Right sliding rod for attaching uterus module 500 to pelvic bone module in groove 234
    508—Left tube
    510—Right tube
600—Bladder Module
    602—Bladder opening of bladder module 600
    604—Top slip fitting for attaching bladder module 600 to pelvic bone module 200 using groove 228
    606—Bottom slip fitting for attaching bladder module 600 to pelvic bone module 200 using groove 230
    608—Bladder plug of bladder module 600
700—Perineum module
    702—Left slip fitting for attaching perineum module 700 to pelvic bone module 200 using groove 224
    704—Right slip fitting for attaching perineum module 700 to the pelvic bone module 200 using groove 226
800—Vagina module
    802—Endopelvic fascia material
    803—Vagina material
    804—Top opening for attaching vagina module 800 to the top peg 218 of the pelvic bone module 200
    806—Left opening for attaching vagina module 800 to the left peg 220 of the Pelvic bone module
    808—Right opening for attaching vagina module 800 to the right peg 222 of the Pelvic bone module
    810—Vaginal opening of vagina module 800
    812—Urethra opening of vagina module 800 that aligns with bladder opening 602 in bladder module 600
    814—Cervix opening of vagina module 800 for receiving part of cervix 502 (cervix) of the uterus module 500
    816—Left fitting used to slidably connect vagina module 800 with pelvic bone module 200
    818—Right fitting used to slidably connect vagina module 800 with pelvic bone module 200
    820—Vaginal wall
900—Vulva module
    902—Vulva material
    904—Vaginal opening
    906—Anus
    908—Bottom attachment opening corresponding to a bottom receptacle of pelvic bone module
    910—Left attachment opening corresponding to a left receptacle of pelvic bone module 200
    912—Right attachment opening corresponding to a right receptacle of pelvic bone module 200

914—Rectum
916—Frame for vulva module to help maintain shape of the vulva (has groove that material 902 fits between and is secured using bolts 924)
918—Left support bracket
920—Right support bracket
922—Handle
924—Bolts
926—Urethra opening of vulva module 900 that aligns with urethra opening 812 of the vagina module 800 and that aligns with bladder opening 602 in bladder module 600

Illustrative System

Figure 2:
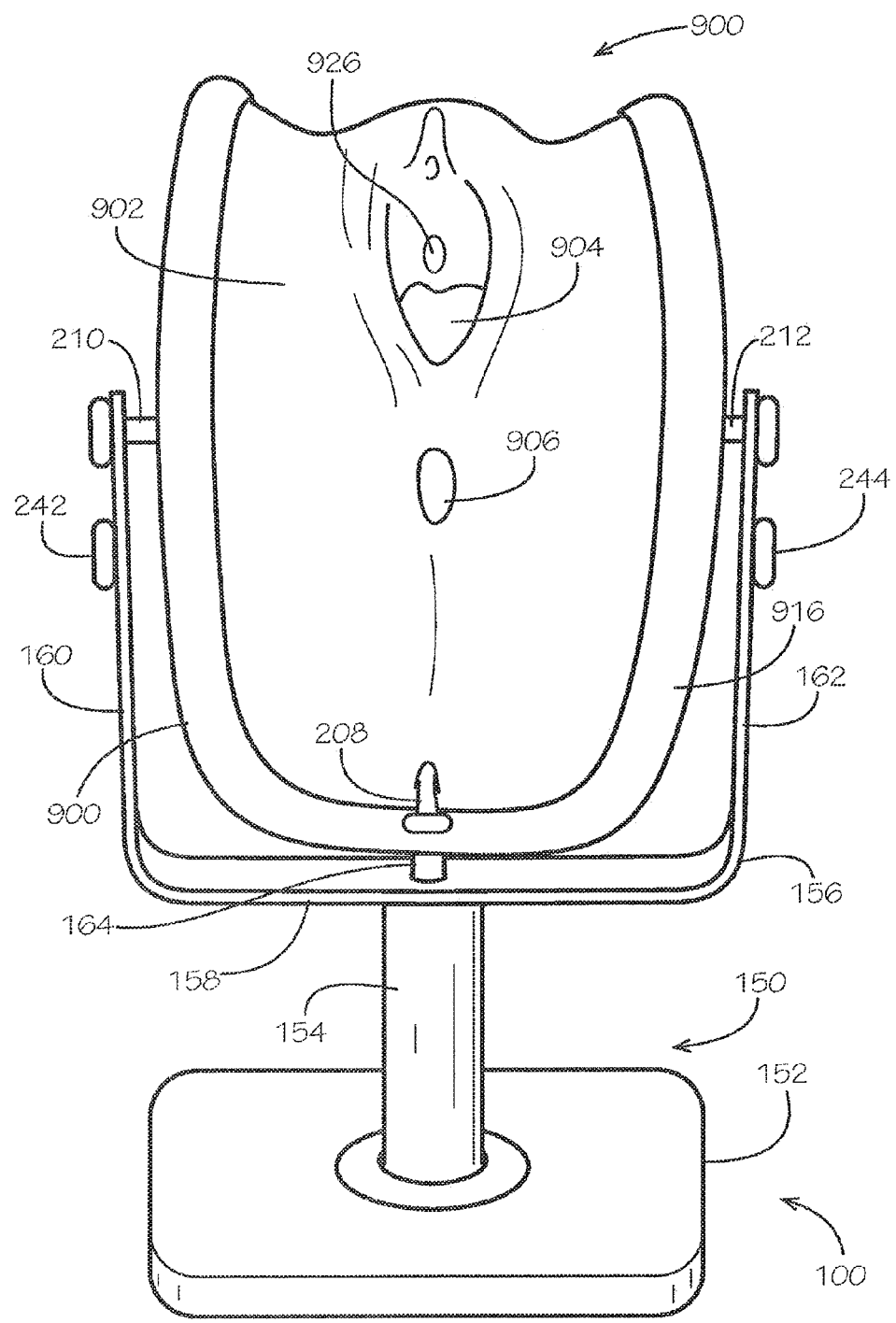

FIG. 1 illustrates aspects of an illustrative pelvic model 100 according to an embodiment. In an embodiment, model system 100 comprises a stand 150 (not shown), a pelvic bone module 200, a sacrospinous ligament module 300, a obturator module 400, a uterus module 500, a bladder module 600, a perineum module 700, a vagina module 800, and a vulva module 900. The model system can be assembled and disassembled by attaching and detaching the various components of the system. For example, in one embodiment, model system 100 shown in FIG. 1 can be assembled by attaching the sacrospinous ligament module 300, the obturator module 400, the uterus module 500, the bladder module 600, the perineum module 700, the vagina module 800, and the vulva module 900 to the pelvic bone module 200 and attaching the pelvic bone module 200 to the stand 150 (not shown). When the components of the model system 100 are attached, as shown in FIG. 2 in one embodiment, the model system 100 can be used to practice, teach, or evaluate competency for one or more surgical procedures or techniques. For example, in one embodiment, model system 100 is used to teach others how to correctly perform a vaginal hysterectomy. In other embodiments, model system 100 can be used to practice a vaginal hysterectomy and/or can be used to evaluate a physician's competency in performing a vaginal hysterectomy.

Once a surgical procedure has been completed on an assembled model, part of the model can be disassembled, one or more of the modules can be replaced, and the model can be reassembled so that another surgical procedure can be performed using the model. For example, in one embodiment, after a vaginal hysterectomy has been performed using model system 100, vaginal module 800 and uterus module 500 are replaced with a new vaginal module and a new uterus module such that another vaginal hysterectomy can be performed using model system 100.

One or more modules can also be replaced with another module that simulates a pathological condition. For example, in one embodiment, uterus module 500 represents a normal uterus and, in another embodiment, uterus module 500 simulates a condition, such as a prolapse, tumor, etc. In this embodiment, a vaginal hysterectomy may be performed using model system 100 with a normal uterus and then a vaginal hysterectomy may be performed using model system 100 with an abnormal uterus that simulates a condition by replacing the normal uterus with the abnormal uterus. In this way, surgical procedures or techniques can be taught or practiced under a variety of situations and/or surgical competencies can be evaluated under a variety of scenarios without rendering the model unsuitable for future teaching or practical exercises. Numerous other embodiments are disclosed herein and variations are within the scope of this disclosure.

Illustrative Stand

A pelvic model can comprise a stand. For example, in the embodiments shown in FIGS. 2 and 3, pelvic model 100 comprises stand 150. A stand can have one or more components that provide support for a pelvic bone module and/or other modules attached to the pelvic bone module. For example, in the embodiments shown in FIGS. 2 and 3, stand 150 comprises a base 152, a post 154, and a crossbar 156. Numerous other embodiments are disclosed herein and variations are within the scope of this disclosure.

In the embodiment shown in FIG. 2, the stand comprises a base 152 that is square and made of wood. In embodiments, base 152 can be any number of suitable shapes as long as the base 152 provides support for other components of stand 150, pelvic bone module 200, and/or other modules attached to the pelvic bone module 200. For example, in various embodiments, base 152 can be a circle, oval triangle, square, rhombus, trapezoid, rectangle, pentagon, hexagon, octagon, cross, or another suitable regular or irregular shape. In embodiments, base 152 can be made of any number of suitable materials as long as the base 152 can provide support for other components of stand 150, pelvic bone module 200, and/or other modules attached to the pelvic bone module 200. For example, in various embodiments, base 152 can be made of one or more woods, plastics, rubbers, metals, or a combination thereof. In one embodiment, the base is weighted to provide additional stability when other components of stand 150, pelvic bone module 200, and/or other modules attached to pelvic bone module 200 are attached.

Referring back to the embodiment shown in FIG. 2, stand 150 comprises a post 154 connected to a base 152. Post 154 can be connected to base 152 in any number of suitable ways including, but not limited to, using one or more screws, nails, staples, bolts, washers, nuts, glues, other fasteners, or a combination thereof. For example, in one embodiment, an end of the post 154 comprises a threaded receptacle for receiving a bolt. In this embodiment, a bolt is placed through an opening of the base 152 and screwed into the threaded receptacle of the post. In this embodiment, as the bolt is tightened the base 152 and the post 154 are drawn closer together until the bolt is tightened such that the post 154 and base 152 are physically connected and such that the post 154 is stationary or non-rotatable. As another example, in one embodiment, an end of the post 154 comprises a bolt that is inserted through an opening of the base 152 and then a nut is attached to the bolt and tightened to physically connect the post 154 and base 152 such that the post 154 is stationary or non-rotatable. In other embodiments, post 154 is connected to base 152 such that post 154 is rotatable by using, for example, one or more swivel bolts, swivel plates, other fasteners with a rotating joint, other suitable swivel connectors, or a combination thereof. Thus, in some embodiments, post 154 is rotatable relative to base 152 and, in other embodiments, post 154 is stationary or non-rotatable relative to base 152. In addition, in some embodiments, post 154 can be attached to and detached from base 152 and, in other embodiments, post 154 is not detachable. For example, in one embodiment, base 152 and post 154 are glued together and thus are not designed to be detached. As another example, in one embodiment, base 152 and post 154 are a single integrated component and thus are not designed to be detached from one another.

In the embodiment shown in FIG. 2, post 154 is a solid, round post that is made, at least in part, of metal. In embodiments, post 154 can be made of any number of suitable materials as long as the post 154 can provide support for other components of stand 150 (such as crossbar 156), pelvic bone module 200 and/or other modules attached to the pelvic bone module 200. For example, in various embodiments, post 154 can be made of one or more woods, plastics, rubbers, metals, or a combination thereof. In some embodiments, post 154 can be partially or entirely hollow thereby reducing the weight of the stand and increasing portability of the pelvic module system 100. In embodiments, post 154 can be any number of suitable shapes, lengths, and/or widths. For example, in one embodiment, post 154 is round with a radius of approximately 0.5" and a length of approximately 6". As another example, in one embodiment, post 154 is square with a width of approximately 1" and a length of approximately 4". In various embodiments, post 154 has a width between approximately 0.25" and 4", a length between approximately 1" and 12", and/or a circle, oval triangle, square, rectangle, pentagon, hexagon, octagon, or another suitable regular or irregular cross section. In the embodiment shown in FIG. 2, post 154 is attached to base 152 at approximately the center of the base 152. In other embodiments, one or more posts can be attached to base 152 at any number of suitable locations, such as the center of the base, near a perimeter of the base, off-center of the base, etc., as long as the base 152 and the post(s) provide stability for the pelvic model 100 when attached. Numerous other embodiments are disclosed herein and variations are within the scope of this disclosure.

Referring back to the embodiment shown in FIG. 2, post 154 is attached to a crossbar 156. In this embodiment, crossbar 156 has a horizontal member 158, a left vertical member 160, and a right vertical member 162 that are integrated to form a "U" shape. In this embodiment, the horizontal member 158 defines an opening at approximately the center of the horizontal member 158 through which bolt 164 can be inserted and tightened to connect crossbar 156 with post 154. In embodiments, bolt 164 can be tightened to lock the crossbar 156, an attached pelvic bone module 200, and/or other modules attached to the pelvic bone module 200 in a particular horizontal rotational position or loosened to allow for horizontal rotation. In various embodiments, an attached pelvic bone module 200 and/or other modules attached to the pelvic bone module can be locked in a Trendelenburg and/or reverse Trendelenburg position.

Figure 3:
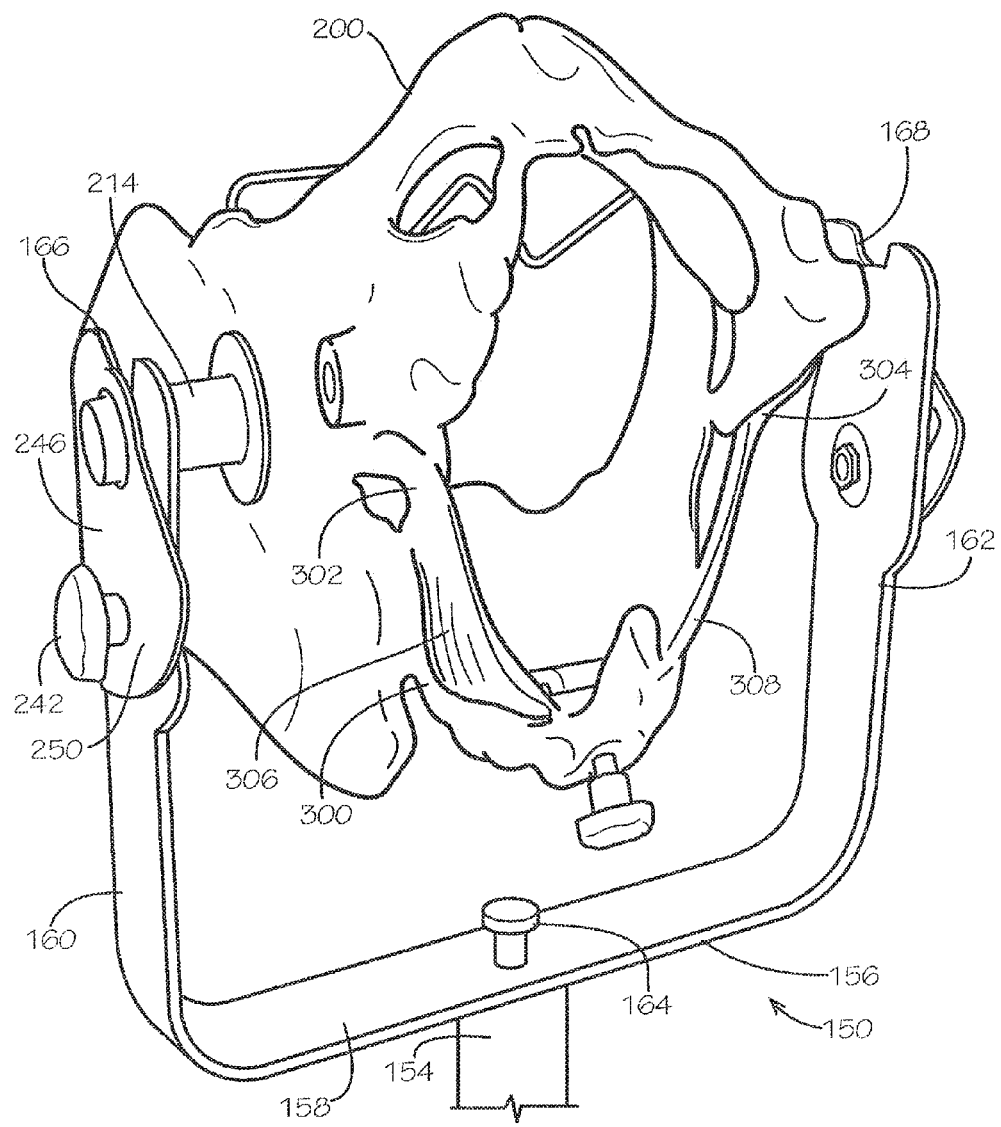

In the embodiment shown in FIG. 3, the left vertical member 160 of crossbar 156 defines a groove 166 for receiving rod 214 and the right vertical member 162 of crossbar 156 defines a groove 168 for receiving rod 216. In this embodiment, pelvic bone module 200 can easily be attached to stand 150 by placing rods 214 and 216 into grooves 166 and 168, respectively. Similarly, in this embodiment, pelvic bone module 200 can easily be removed from stand 150 by removing rods 214 and 216 from grooves 166 and 168, respectively. In some embodiments, left vertical rotation lock bolt 242 and/or right vertical rotation lock bolt 244 may require removal before pelvic bone module 200 can be removed from stand 150. In embodiments, left vertical member 160 of crossbar 156 defines an opening for receiving a bolt that can be tightened to lock a pelvic bone module and/or other modules attached to the pelvic bone module in a particular vertical rotational position or loosened to allow for vertical rotation. Similarly, in embodiments, right vertical member 162 of crossbar 156 defines an opening for receiving a bolt that can be tightened to lock a pelvic bone module and/or other modules attached to the pelvic bone module in a particular vertical rotational position or loosened to allow for vertical rotation. Numerous other embodiments are disclosed herein and variations are within the scope of this disclosure.

Crossbar 156 can be connected to post 154 in any number of suitable ways including, but not limited to, using one or more screws, nails, staples, bolts, washers, nuts, glues, other fasteners, or a combination thereof. For example, in the embodiment shown in FIG. 2, an end of the post 154 (e.g., an end of post 154 opposite the end of the post 154 connected with base 152) comprises a threaded receptacle for receiving a bolt 164. In this embodiment, the bolt 164 is placed through an opening of the crossbar 156 and screwed into the threaded receptacle of the post 154. In this embodiment, as the bolt 164 is tightened the post 154 and the crossbar 156 are drawn closer together until the bolt is tightened such that the post 154 and base 152 are physically connected and such that the post 154 is stationary or non-rotatable. In this embodiment, the bolt 164 can be loosened to provide horizontal rotation of the crossbar 156, an attached pelvic bone module 200, and/or other modules attached to the pelvic bone module 200. In certain embodiments, crossbar 156, an attached pelvic bone module 200, and/or other modules attached to the pelvic bone module 200 can be rotated horizontally 360 degrees. In other embodiments, crossbar 156, an attached pelvic bone module 200, and/or other modules attached to the pelvic bone module 200 can be rotated horizontally within a specified range of degrees. In some embodiments, crossbar 156, an attached pelvic bone module 200, and/or other modules attached to the pelvic bone module 200 can be locked into a particular horizontal rotational position. In the embodiment shown in FIG. 2, post 154 is attached to base 152 at approximately the center of the base 152. In various embodiments, one or more crossbars can be connected with one or more posts at any number of suitable locations as long as the post(s) and crossbar(s) provide stability for the pelvic model 100 when attached. In other embodiments, one or more crossbars can be connected with one or more posts at any number of suitable locations as long as the post(s) and crossbar(s) allow for horizontal rotation and/or vertical rotation of a pelvic bone module and/or other modules attached to the pelvic bone module 200.

As another example, in one embodiment, an end of the post 154 comprises a bolt that is inserted through an opening of the crossbar 156 and then a nut is attached to the bolt and tightened to physically connect the post 154 and crossbar 156 such that the crossbar 156 is stationary or non-rotatable. In certain embodiments, the bolt may be loosened to allow for horizontal rotation. In other embodiments, post 154 is connected to crossbar 156 such that crossbar 156 is rotatable by using, for example, one or more swivel bolts, swivel plates, other fasteners with a rotating joint, other suitable swivel connectors, or a combination thereof. Thus, in some embodiments, crossbar 156 is rotatable relative to base 152 and/or post 154 and, in other embodiments, crossbar 156 is stationary or non-rotatable relative to base 152 and/or post 154. In addition, in some embodiments, crossbar 154 can be attached to and detached from post 152 and, in other embodiments, crossbar 156 is not detachable. For example, in one embodiment, post 154 and crossbar 156 are welded together and thus are not designed to be detached. As another example, in one embodiment, post 154 and crossbar 154 are a single integrated component d thus are not designed to be detached from one another.

In the embodiment shown in FIG. 3, crossbar 156 is a solid, U-shaped piece of metal. In embodiments, crossbar 156 can be made of any number of suitable materials as long as the crossbar 156 can provide support for pelvic bone module 200 and/or other modules attached to the pelvic bone module 200. For example, in various embodiments, crossbar 156 can be made of one or more woods, plastics, rubbers, metals, or a combination thereof. In some embodiments, crossbar 156 can be partially or entirely hollow thereby reducing the weight of the stand and increasing portability of the pelvic module system 100. In embodiments, crossbar 156 can be any number of suitable lengths, widths, heights, thicknesses, cross-sections, designs, etc. For example, in the embodiment, shown in FIG. 3, the horizontal member 158 of crossbar 156 is connected with the left vertical member 160 and the right vertical member 162 at a respective rounded corner. In other embodiments, the horizontal member 158 of crossbar 156 is connected with the left vertical member 160 and the right vertical member 162 at a respective perpendicular corner. In the embodiment shown in FIG. 3, the crossbar 156 comprises a single, integrated component that defines the horizontal member 158, left vertical member 160, and right vertical member 162. In other embodiments, crossbar 156 includes two or more detachable components that can be connected together to form crossbar 156. Numerous other embodiments are disclosed herein and variations are within the scope of this disclosure.

A stand, when assembled, can provide support for a pelvic bone module. For example, in the embodiment shown in FIG. 3, the stand 150 provides support for pelvic bone module 200. A stand can also provide support for one or more modules directly or indirectly attached to a pelvic bone module. For example, in the embodiment shown in FIG. 3, the stand 150 provides support for sacrospinous ligament module 300 which is attached to pelvic bone module 200. As another example, in the embodiment shown in FIG. 2, stand 150 provides support for vulva module 900 which is attached to pelvic bone module 200. In various embodiments, stand 150 provides support for a pelvic bone module and one or more modules directly or indirectly attached to the pelvic bone module, such as a sacrospinous ligament module, an obturator module, an uterus module, a bladder module, a perineum module, a vagina module, a vulva module, other modules, or a combination thereof.

A stand may allow horizontal rotation or vertical rotation, or both, of a pelvic bone module attached to the stand. In embodiments, the stand also provides horizontal rotation or vertical rotation, or both, for one or more modules directly or indirectly attached to the pelvic bone module that is attached to the stand. For example, in the embodiment shown in FIG. 3, the stand 150 allows horizontal rotation and vertical rotation of pelvic bone module 200 as well as sacrospinous ligament module 300 relative to stand 150. In embodiments, the stand can provide 360 degree horizontal rotation. For example, in the embodiment shown in FIG. 3, the stand 150 allows pelvic bone structure 200 (and any other modules directly or indirectly attached to the pelvic bone structure 200, if any) to be rotated horizontally by loosening bolt 164. In this embodiment, 360 degree horizontal rotation is allowed and the crossbar 156, pelvic bone module 200, and any other modules directly or indirectly attached to the pelvic bone structure 200, if any, can be locked in any desired horizontal rotational position by tightening bolt 164.

In the embodiment shown in FIG. 3, the stand 150 allows pelvic bone structure 200 (and any other modules directly or indirectly attached to the pelvic bone structure 200, if any) to be rotated horizontally by loosening bolts 242 and 244. In this embodiment, vertical rotation is allowed within a specified range of degrees as provided by the left rotation restraint 250 and right rotation restraint 252. In this embodiment, pelvic bone module 200, and any other modules directly or indirectly attached to the pelvic bone structure 200, if any, can be locked in any desired vertical rotational position within the specified range of degrees allowed by restraints 250 and 252 by tightening bolts 242 and 244. In various embodiments, pelvic bone module 200 can be horizontally and/or vertically rotated relative to the stand 150 without base 152 and/or post 154 moving.

In embodiments, a stand may be a single integrated component. For example, in one embodiment, a stand may comprise a base, a post, and/or a crossbar that is a single integrated component. In this embodiment, the stand is not designed to be taken apart. For example, in this embodiment, the stand is not designed for the base to be separated from the post and/or the post to be separated from the crossbar. In other embodiments, one or more components of a stand may be detachable. For example, in embodiments, a crossbar can be removably detached from and attached to a post and/or the post can be removably detached from and attached to the base. Thus, in various embodiments, one or more components of a stand can be assembled to form the stand and disassembled for greater portability and, in other embodiments, the stand is a single integrated component. Numerous other embodiments are disclosed herein and variations are within the scope of this disclosure.

In embodiments, a stand may comprise fewer or additional components. For example, in one embodiment, a stand does not comprise a base. In this embodiment, a post may slidably fit into an opening in a table or other structure to provide support for the pelvic model 100. As another example, in one embodiment, a stand comprises two or more posts and one or more horizontal rotation restraints that allows for horizontal rotation of a pelvic bone module within a range of particular degrees. In other embodiments, the stand allows 360 degree horizontal rotation and/or 360 vertical rotation. Numerous other embodiments are disclosed herein and variations are within the scope of this disclosure.

Illustrative Pelvic Bone Module

A pelvic model can comprise a pelvic bone module. For example, in the embodiment shown in FIG. 3, pelvic model 100 comprises pelvic bone module 200. In this embodiment, pelvic bone module 200 comprises a realistic representation of a human female pelvic skeleton. Pelvic bone module 200 can comprise all of the landmarks on a human female pelvic skeleton that are necessary in order to practice, teach, simulate, and/or evaluate surgeon competency for a particular surgical procedure or technique. For example, in one embodiment, pelvic bone module 200 comprises all of the landmarks on a human female pelvic skeleton that are necessary in order to realistically practice a vaginal hysterectomy.

A pelvic bone module can comprise one or more anatomical landmarks. For example, in one embodiment where the pelvic model 100 is used for a vaginal hysterectomy, pelvic bone module 200 has all the anatomical landmarks on a female pelvis required to practice, teach, simulate, and/or evaluate surgical competency for the vaginal hysterectomy. As another example, in an embodiment, an assembled pelvic model 100 can allow palpation of one or more public tubercles, one or more public rami, one or more obturator fossa, an ischial spine, and/or other surgical landmarks detailed on the pelvic bone module 200 through the uterus module 600, vagina module 800, vulva module 900, and/or another module. In embodiments, an assembled pelvic model supports palpation of one or more surgical landmarks. For example, an assembled pelvic model may support palpation of one or more public tubercles, one or more public rami, one or more obturator fossa, an arcus tendineous fascia pelvis, an ischial spine, a sacrospinous ligament, and/or other surgical landmarks needed for particular surgical procedure(s). In embodiments, a pelvic bone module and/or a pelvic model of the present invention may include one or more landmarks described in U.S. application Ser. No. 12/904,623.

Figure 18:
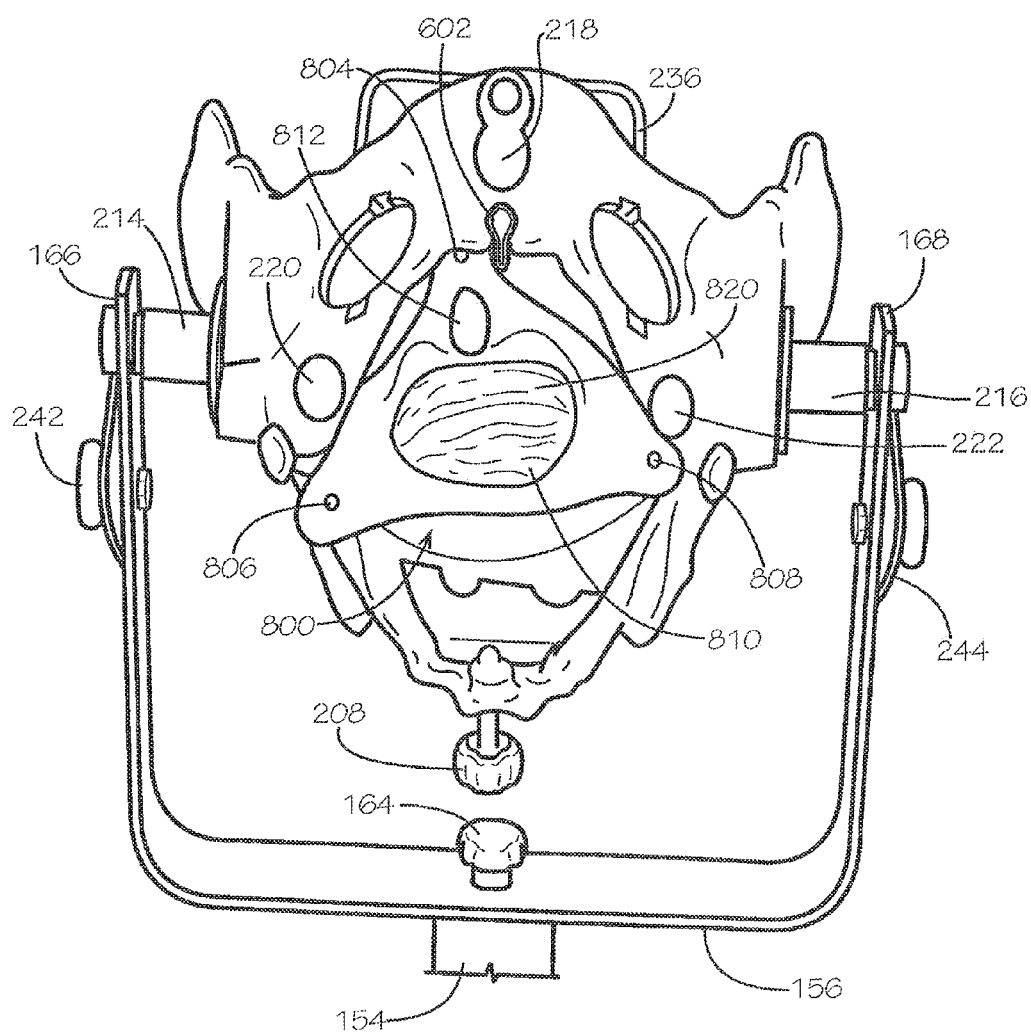

A pelvic bone module can comprise one or more rods that can be used to attach the pelvic bone module with a corresponding stand. For example, as shown in FIGS. 3 and 18, a left rod 214 and a right rod 216 can be attached to the pelvic bone module 200 using one or more screws. In other embodiments, left rod 214 and/or right rod 216 may be integrated into pelvic bone module 200 rather than being attachable to and detachable from the pelvic bone module 200. One or more rotational locking plates can be attached to or integrated into a rod. For example, in the embodiments shown in FIGS. 23 and 21, left rotational locking plate 246 is connected with left rod 214 and right rotational locking plate 248 is connected with right rod 216. Moreover, in the embodiments shown in FIGS. 23 and 21, left rotational locking plate 246 defines a left vertical rotation restraint opening 250 that allows the pelvic bone module 200 to be vertically rotated only within a specified range of degrees. Similarly, the embodiments in these figures show that right rotational locking plate 248 defines a right vertical rotation restraint opening 252 that allows the pelvic bone module 200 to be vertically rotated only within a specified range of degrees. In these embodiments, the pelvic bone module 200 and any other modules attached to the pelvic bone module 200 can be vertically rotated by loosening left vertical rotation lock bolt 242 and right vertical rotation lock bolt 244 and then rotating pelvic bone module 200 to a desired vertical angle within the specified range of degrees. Once the pelvic bone module 200 has been placed in a desired vertical angle position, then the pelvic bone module 200 can be locked in that position by tightening left vertical rotation lock bolt 242 and/or right vertical rotation lock bolt 244.

In various embodiments, pelvic bone module 200 can be attached to stand 150 by removing bolts 242 and 244 (if not already removed) and sliding rods 214 and 216 such that plates 246 and 248 are on the outside of left vertical member 160 and right vertical member 162, respectively. In this embodiment, left vertical rotation restraint opening 250 can be positioned such that left vertical rotation lock bolt 242 can be inserted through the opening 250 of plate 246 and a corresponding opening in the left vertical member 160 of crossbar 156. Similarly, in this embodiment, right vertical rotation restraint opening 252 can be positioned such that right vertical rotation lock bolt 244 can be inserted through the opening 252 of plate 248 and a corresponding opening in the right vertical member 162 of crossbar 156. Bolt 242 and/or bolt 244 can be tightened to attach the pelvic bone module 200 to the stand 150. Thus, in embodiments, pelvic bone module 200, left rod 214, and right rod 216 are designed such that the overall width of the module 200 with rods 214 and 216 is slightly longer than the width between left vertical member 160 and right vertical member 162. In addition, in embodiments, locking plates 246 and 248 are designed such that openings 250 and 252 correspond with threaded receptacles on vertical members 160 and 162, respectively, such that bolts 242 and 244 can secure pelvic bone module 200 to stand 150 when rods 214 and 216 are connected with pelvic bone module 200 and inserted into grooves 166 and 168.

Figure 21:
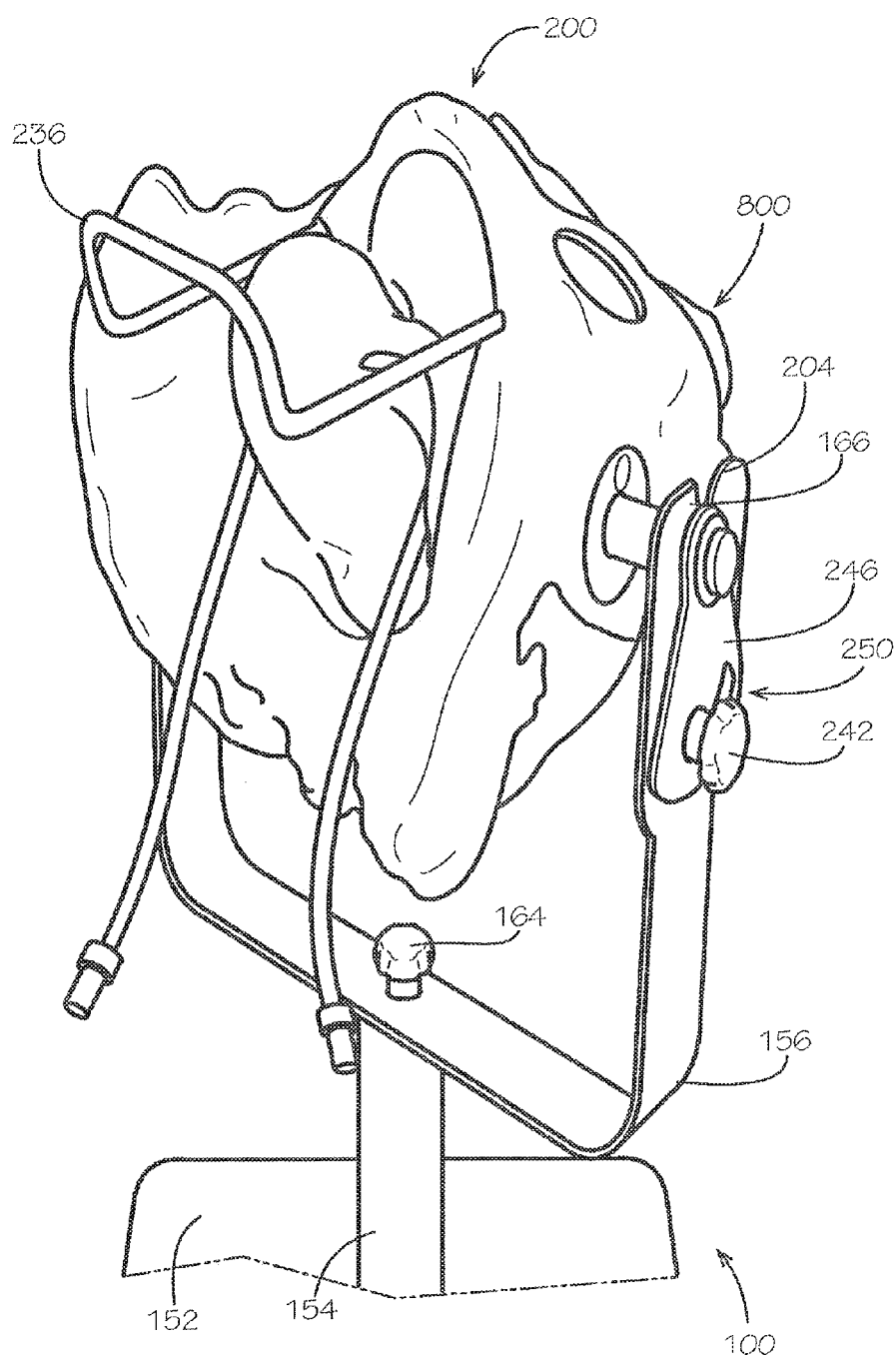
Figure 23:
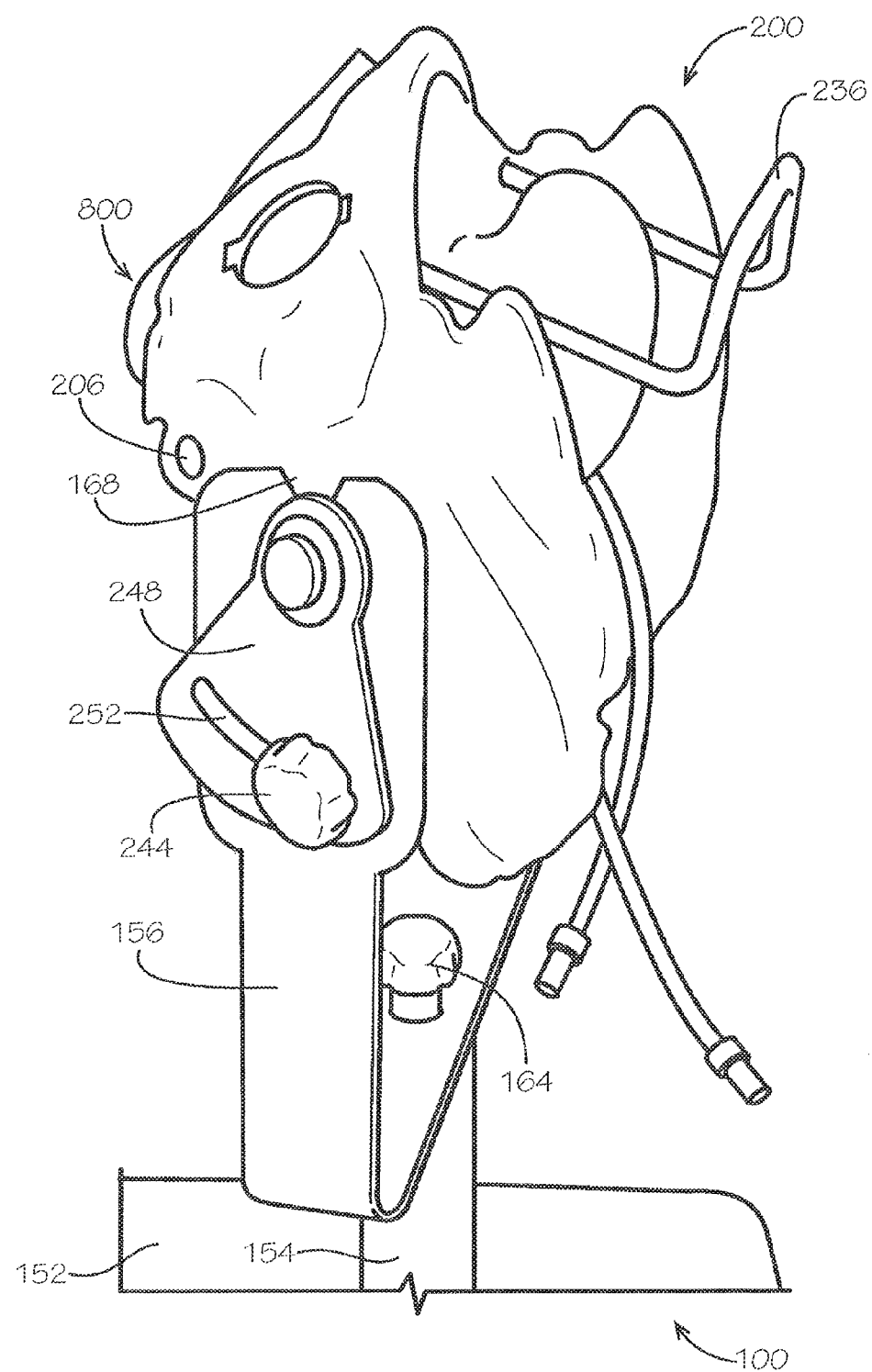

In the embodiment shown in FIGS. 23 and 21, rods 214 and 216 are solid, round rods that are made of metal. In embodiments, rod 214 and/or rod 216 can be made of any number of suitable materials as long as the rod 216 and rod 216 can provide support for pelvic bone module 200 and/or other modules attached to the pelvic bone module 200. For example, in various embodiments, rod 214 and/or rod 216 can be made of one or more woods, plastics, rubbers, metals, or a combination thereof. In some embodiments, rod 214 and/or rod 216 can be partially or entirely hollow thereby reducing the weight of the system 100 and increasing portability of the pelvic module system 100.

In the embodiment shown in FIG. 21, pelvic bone module 200 is connected to a rotation bar 236. In this embodiment, rotation bar 236 is detachably mounted to the pelvic bone module 200 by inserting a portion of the rotation bar 236 into two corresponding grooves on the pelvic bone module 200. In other embodiments, rotation bar 236 may be integrated into the pelvic bone module 200 rather than being attachable to and detachable from the pelvic bone module 200. In various embodiments, the rotation bar 236 can be used to rotate the model horizontally and/or vertically. The rotation bar 236 shown in FIG. 21 comprises metal; however, in embodiments, rotation bar 236 may be made of one or more woods, plastics, rubbers, metals, or a combination thereof. In certain embodiments, pelvic model 100 and/or pelvic bone module 200 does not comprise a rotation bar 236. Moreover, in the embodiment shown in FIG. 21, rotation bar comprises a U-shape with the ends of the U-shape inserted into the pelvic bone module 200. In other embodiments, any other suitable shape of rotation bar 236 can be used and rotation bar may be connected with or integrated into pelvic bone module 200 at a single location or two or more locations.

A pelvic bone module can comprise various grooves, openings, threaded receptacles, pegs, and/or other features that can be used to connect one or more other modules to the pelvic bone module. For example, pelvic bone module 200 may have various features 202, 204, 206, 218, 220, 222, 224, 226, 228, 230, 232, 234, etc.) for attaching various modules to and detaching various modules from (e.g., sacrospinous ligament module 300, obturator module 400, uterus module 500, bladder module 600, perineum module 700, vagina module 800, vulva module 900) the pelvic bone module 200. The features on the pelvic bone module 200 for attaching various modules may be positioned such that the modules, when attached, are in an anatomically correct position.

In various embodiments, one or more of a sacrospinous ligament module 300, an obturator module 400, an uterus module 500, a bladder module 600, a perineum module 700, a vagina module 800, a vulva module 900 can be directly or indirectly attached to the pelvic bone module 200. For example, in the embodiments shown in FIGS. 3 and 6, sacrospinous ligament module 300 can be attached to the pelvic bone module 200 using a left snap fitting 302 that corresponds with a mating snap fitting on the pelvic bone module 200 and by using a left snap fitting 304 that corresponds with another mating snap fitting on the pelvic bone module. In addition, in the embodiments shown in FIGS. 3, 6, and 4, sacrospinous ligament module 300 can define an opening and bolt 208 can be placed through receptacle 202 of pelvic bone module 200 and through the opening in the sacrospinous ligament module 300 and screwed into a threaded receptacle of support plate 254 connected to or integrated with pelvic bone module 200. In embodiments, when the sacrospinous ligament module 300 has been correctly placed underneath support plate 254, bolt 208 has been tightened, and snap fittings 302 and 304 connected with the pelvic bone module 200, the sacrospinous ligament module 300 is in an anatomically accurate position relative to pelvic bone module 200.

Figure 6:
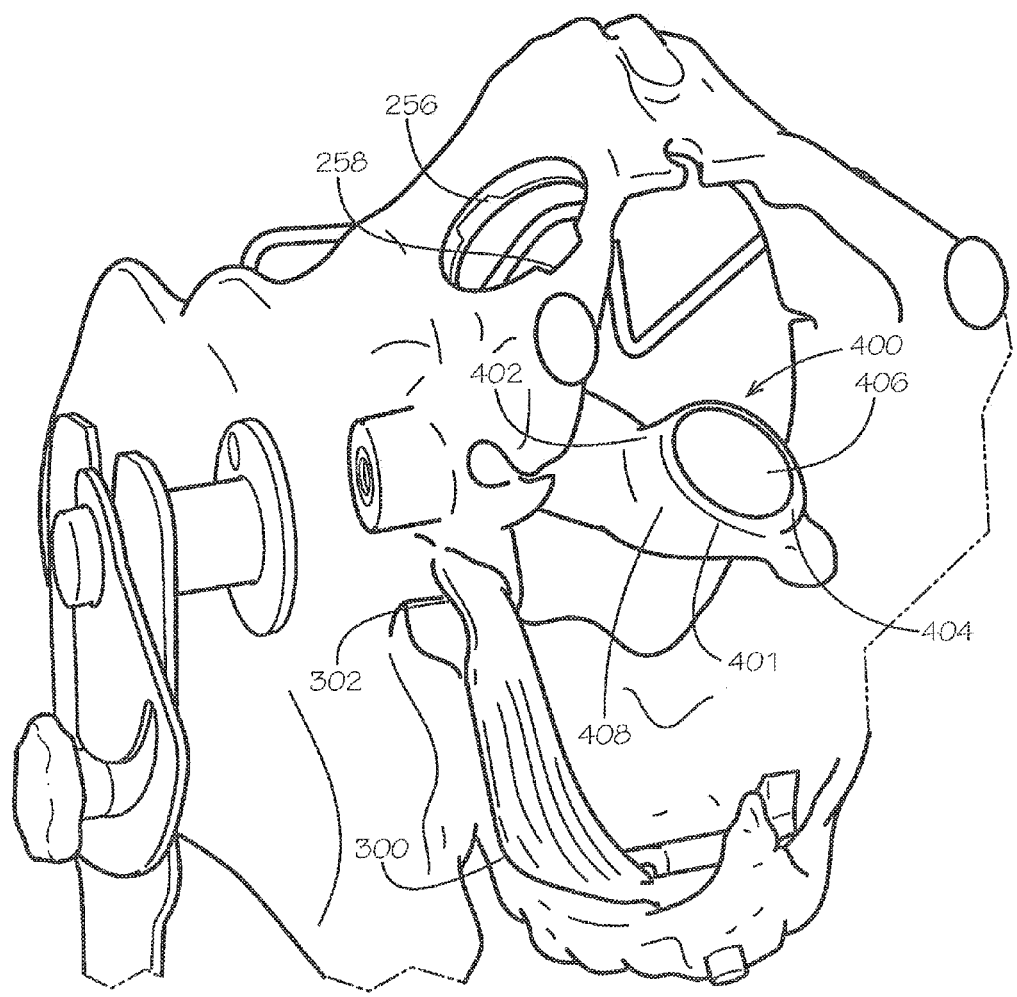
Figure 7:
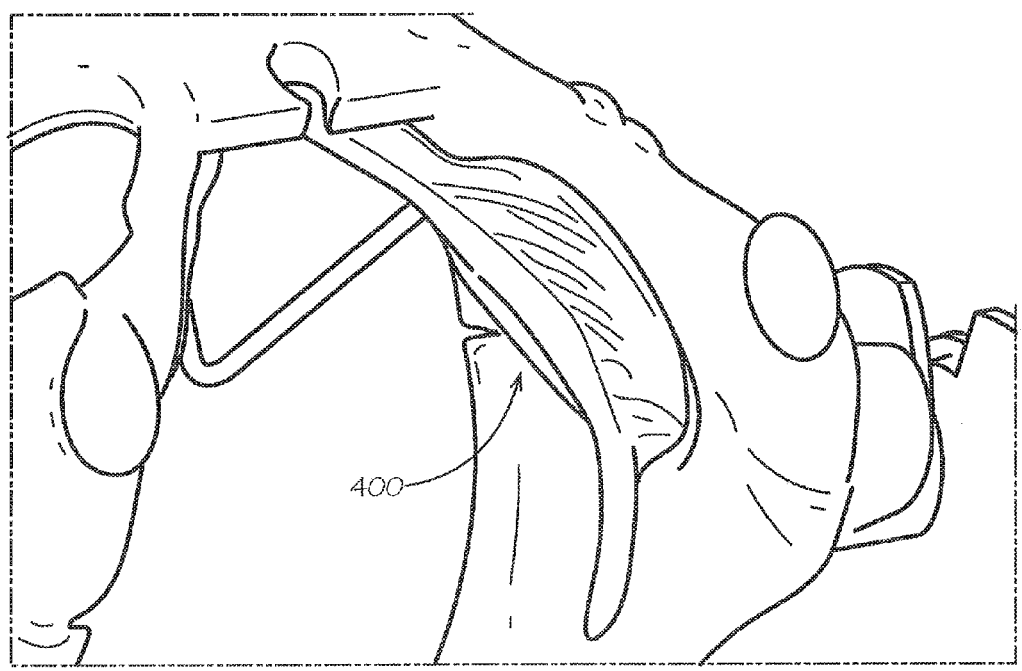
Figure 8:
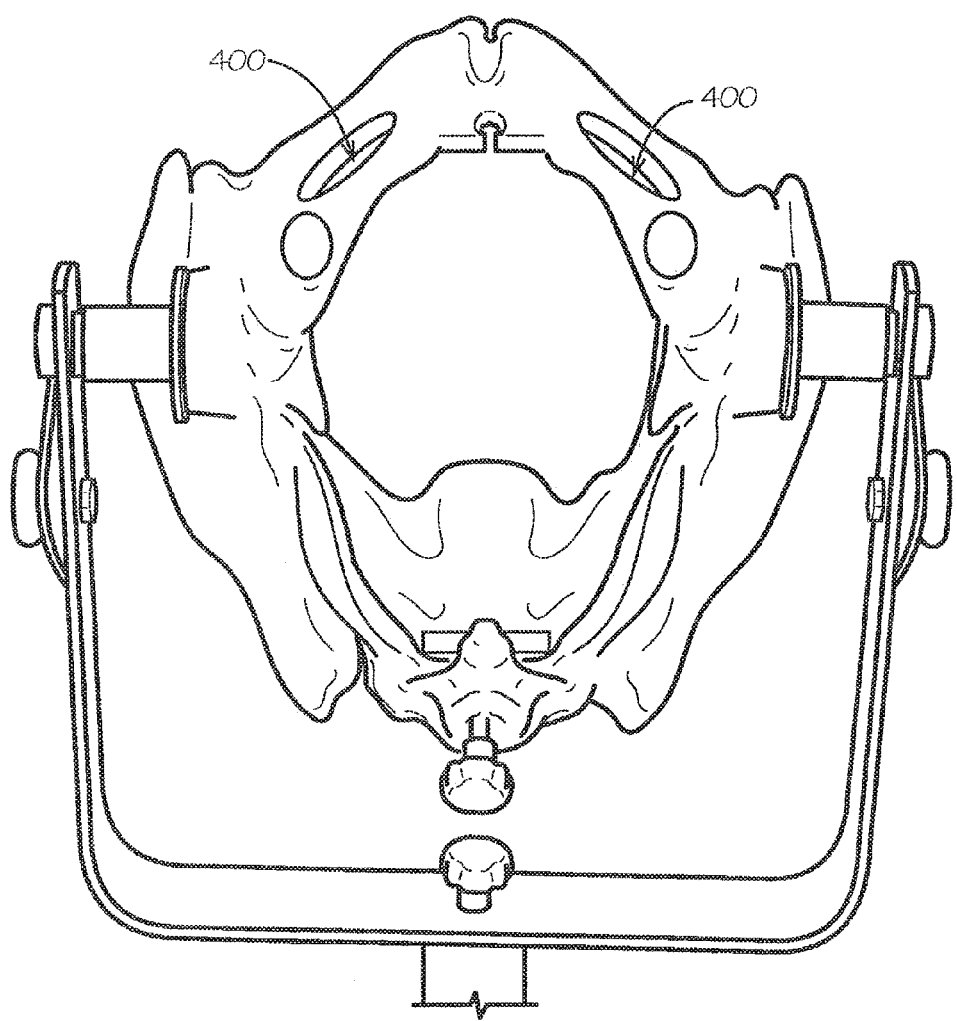

In the embodiments shown in FIGS. 6, and 7, obturator module 400 can be attached to pelvic bone module 200 using left snap fitting 402 and right snap fitting 404 on the obturator module 400 with a mating left snap fitting receptacle 256 and a mating right snap fitting receptacle 258 on the pelvic bone module 200. Moreover, as shown in FIG. 8, in some embodiments, two obturator modules 400 can be simultaneously attached to pelvic bone module 200. In this embodiment, obturator module 400 can be attached to and detached from pelvic bone module 200 without using any bolts, threaded receptacles, etc. In embodiments, once one or more obturator modules 400 have been correctly snapped into position in the pelvic bone module 200 (e.g., attaching 402 with 256 and attaching 404 with 258), the one or more obturator modules 400 is in an anatomically accurate position relative to pelvic bone module 200.

Figure 9:
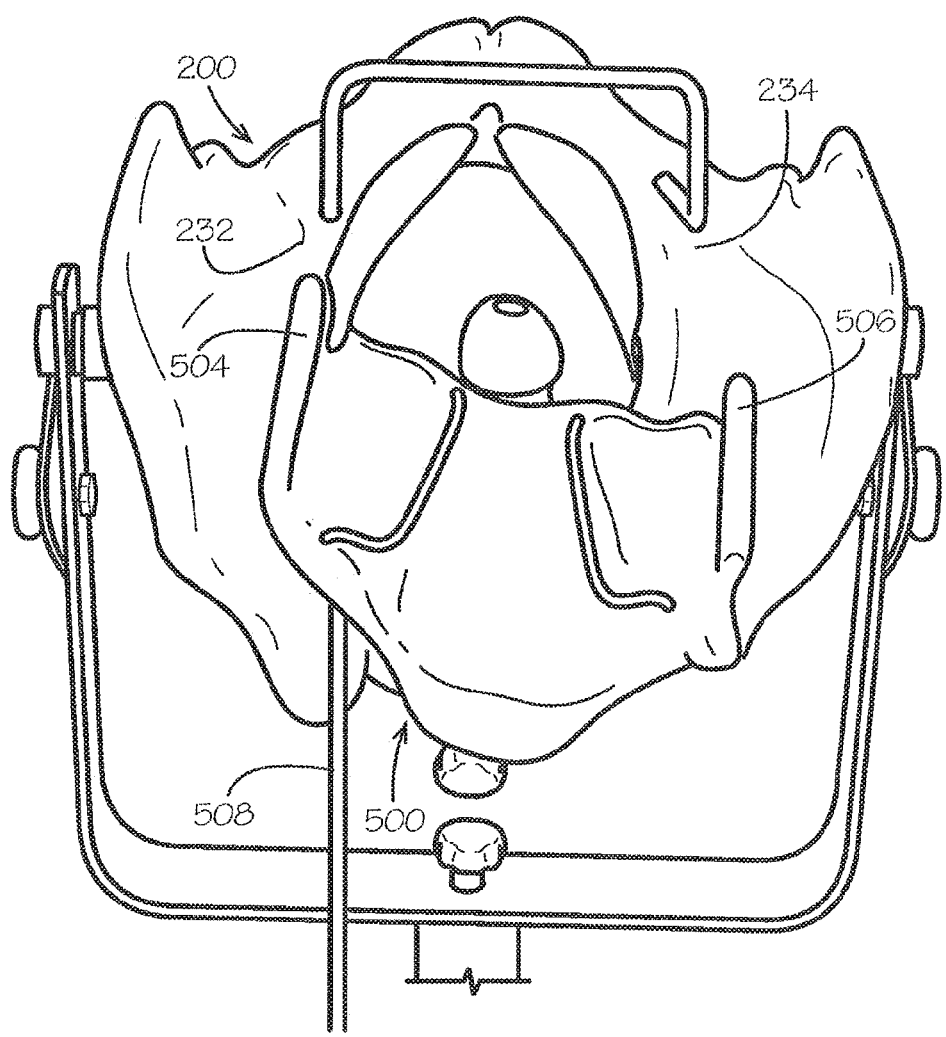
Figure 10:
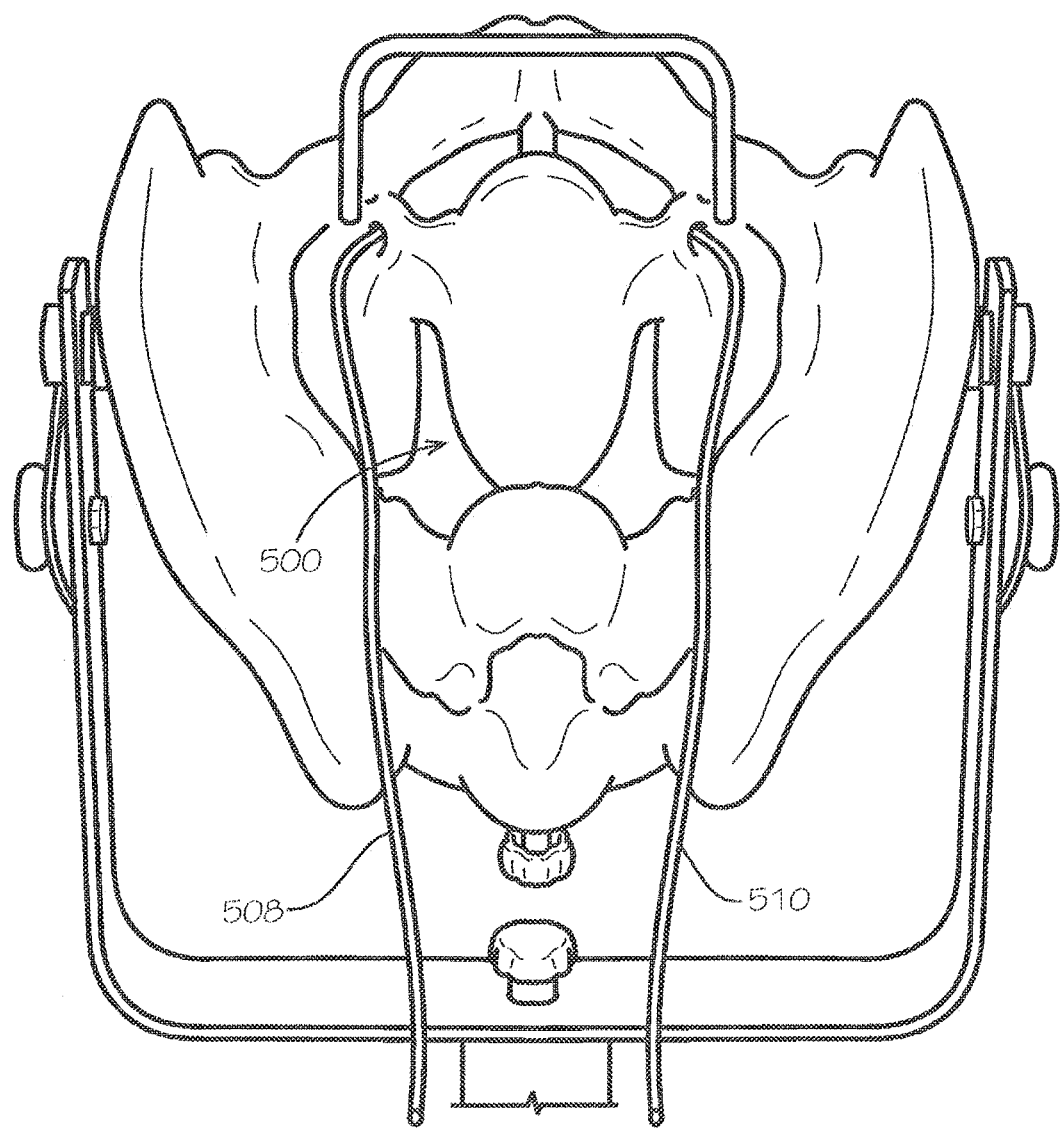

In the embodiments shown in FIGS. 9 and 10, uterus module 500 can be attached to pelvic bone module 200 using left sliding connection 504 and right sliding connection 506 of the uterus module 500 and mating left sliding receptacle 232 and mating right sliding receptacle 234 of the pelvic bone module 200. In this embodiment, uterus module 500 can be attached to and detached from pelvic bone module 200 without using any bolts, threaded receptacles, etc. In embodiments, once uterus module 500 has been correctly slid into place in the pelvic bone module 200 (e.g., attaching 504 with 232 and attaching 506 with 234), the uterus module 500 is in an anatomically accurate position relative to pelvic bone module 200.

Figure 11:
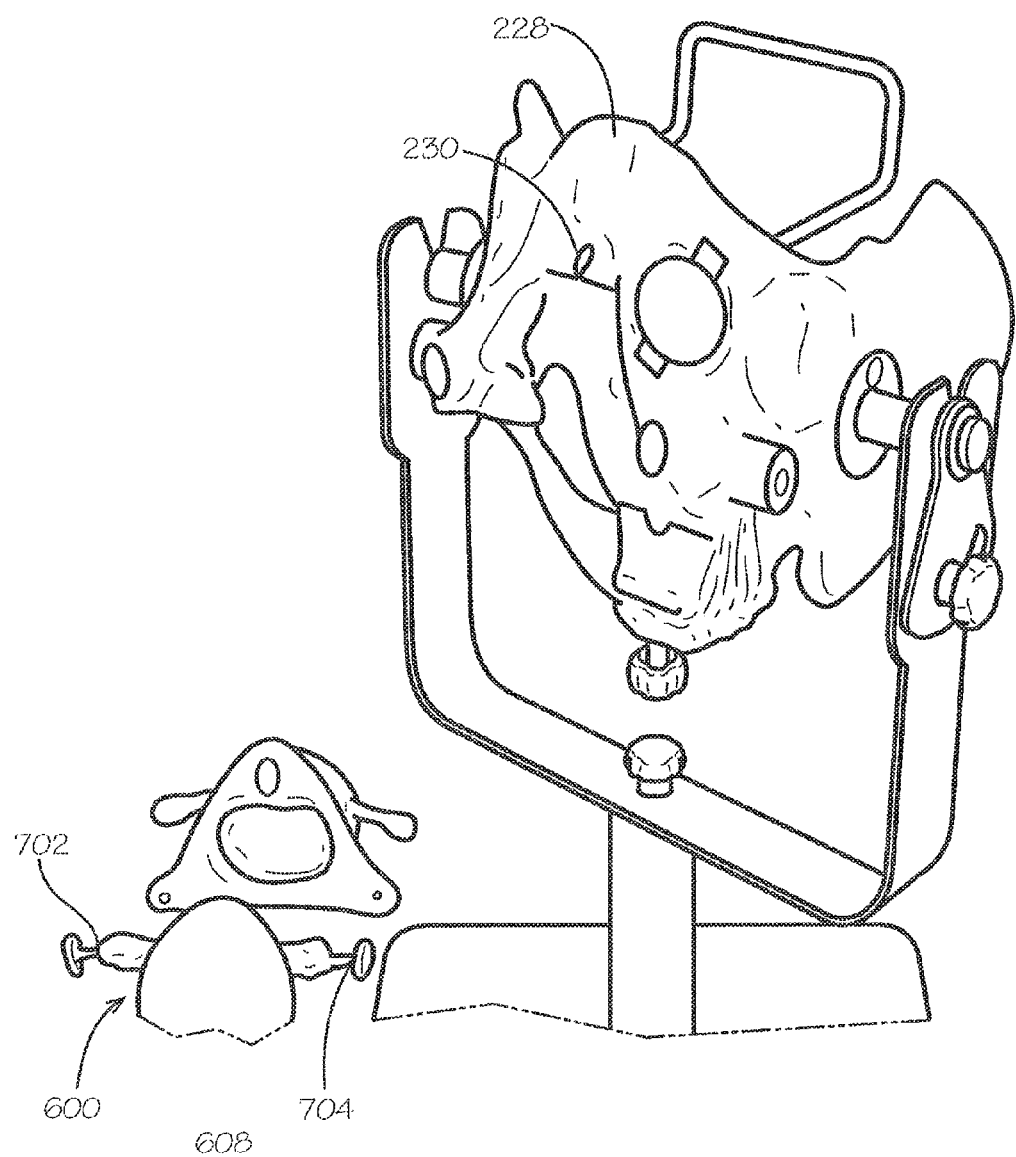
Figure 12:
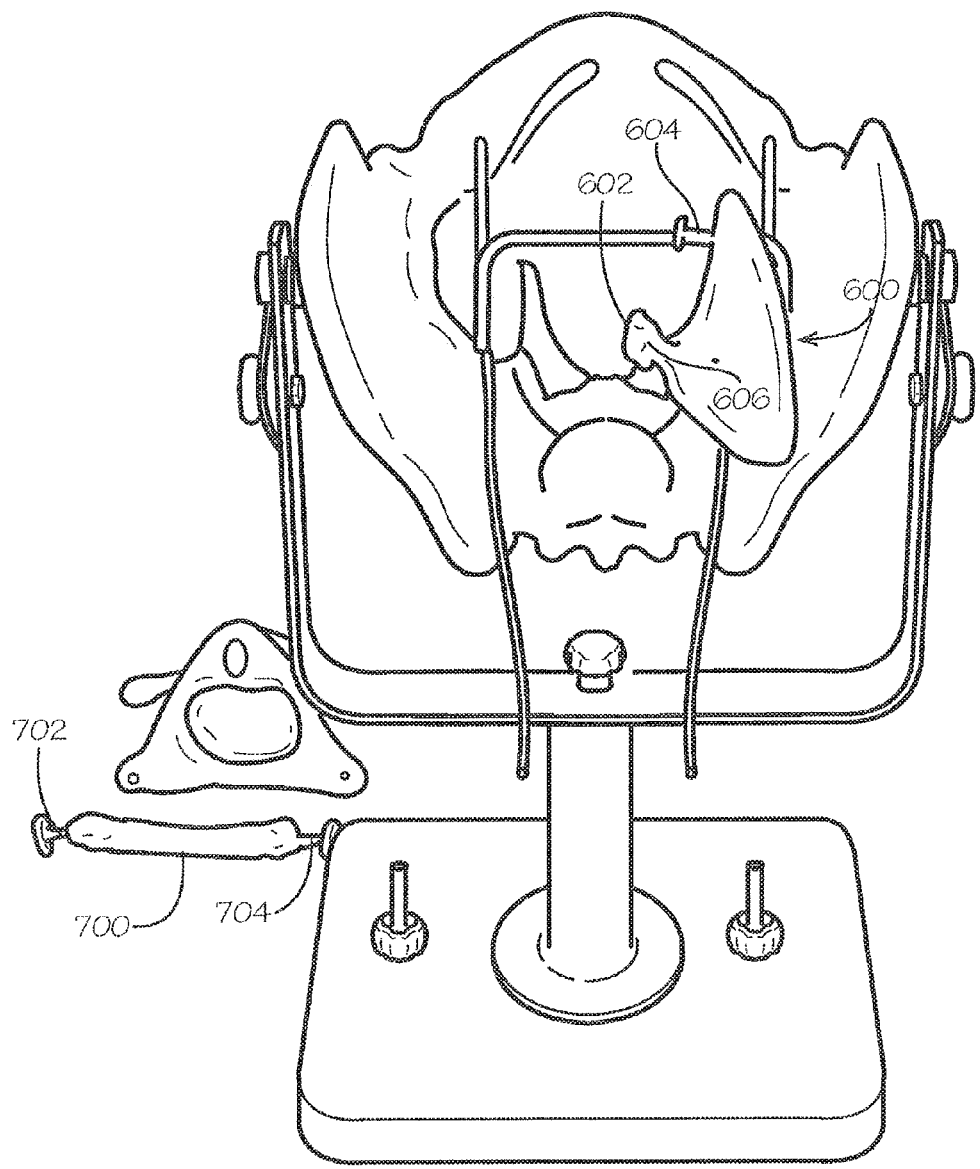
Figure 14:
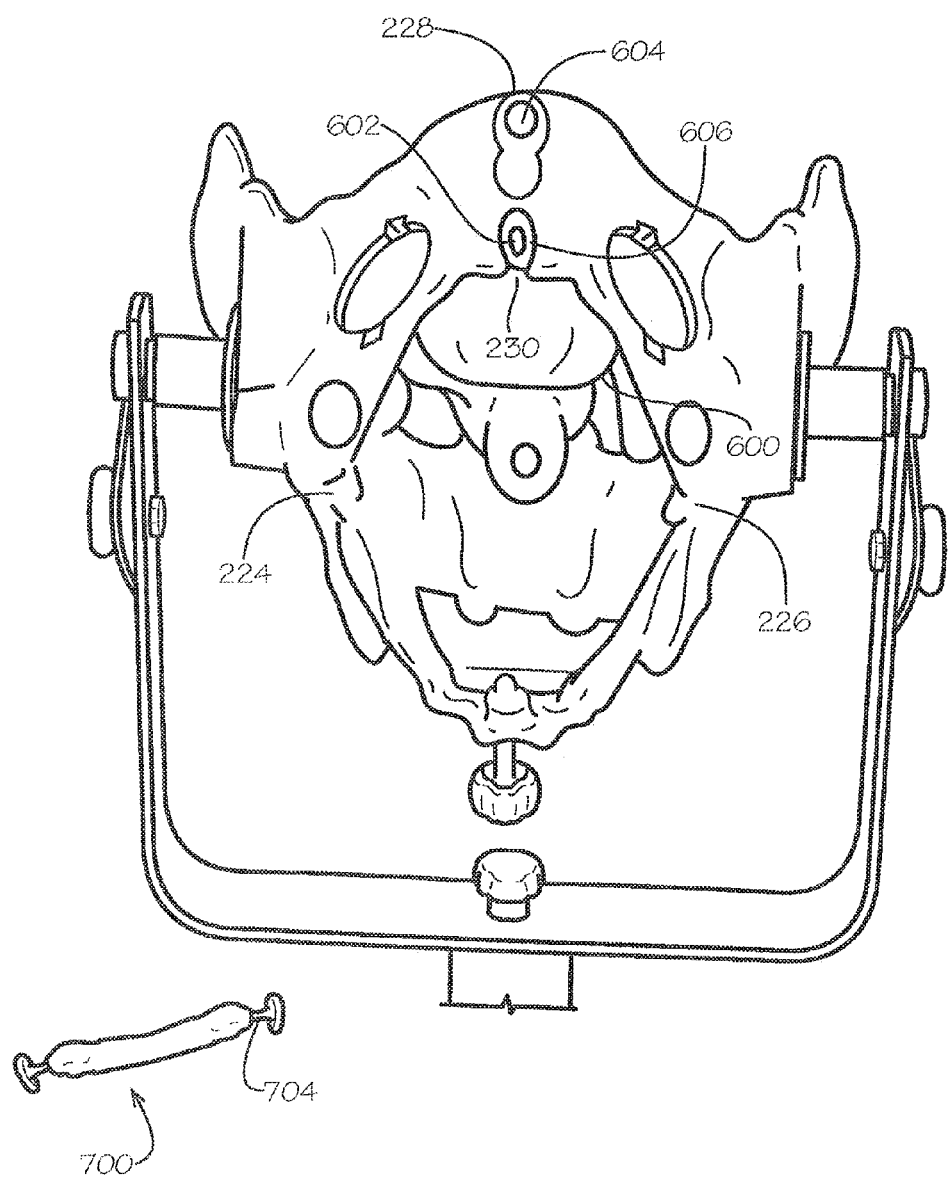

In the embodiments shown in FIGS. 11, 12, and 14, bladder module 600 can be attached to pelvic bone module 200 using top slip attachment 504 and bottom slip attachment 506 on the bladder module 600 and top groove 228 and bottom groove 230 on the pelvic bone module 200. In this embodiment, bladder module 600 can be attached to and detached from pelvic bone module 200 without using any bolts, threaded receptacles, etc. In embodiments, once bladder module 600 has been correctly attached to the pelvic bone module 200 (e.g., attaching 504 with 228 and attaching 506 with 230), the bladder module 600 is in an anatomically accurate position relative to pelvic bone module 200.

Figure 15:
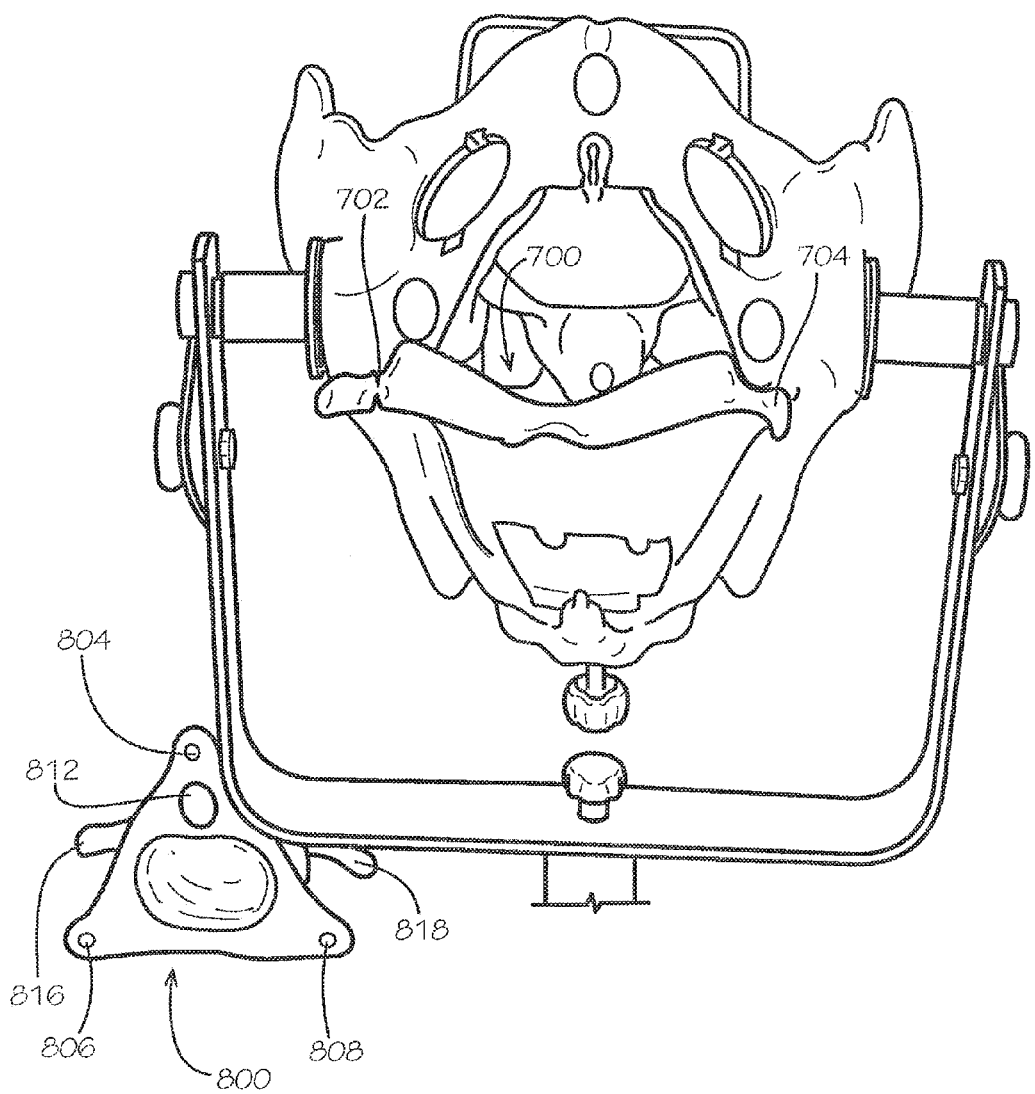
Figure 16:
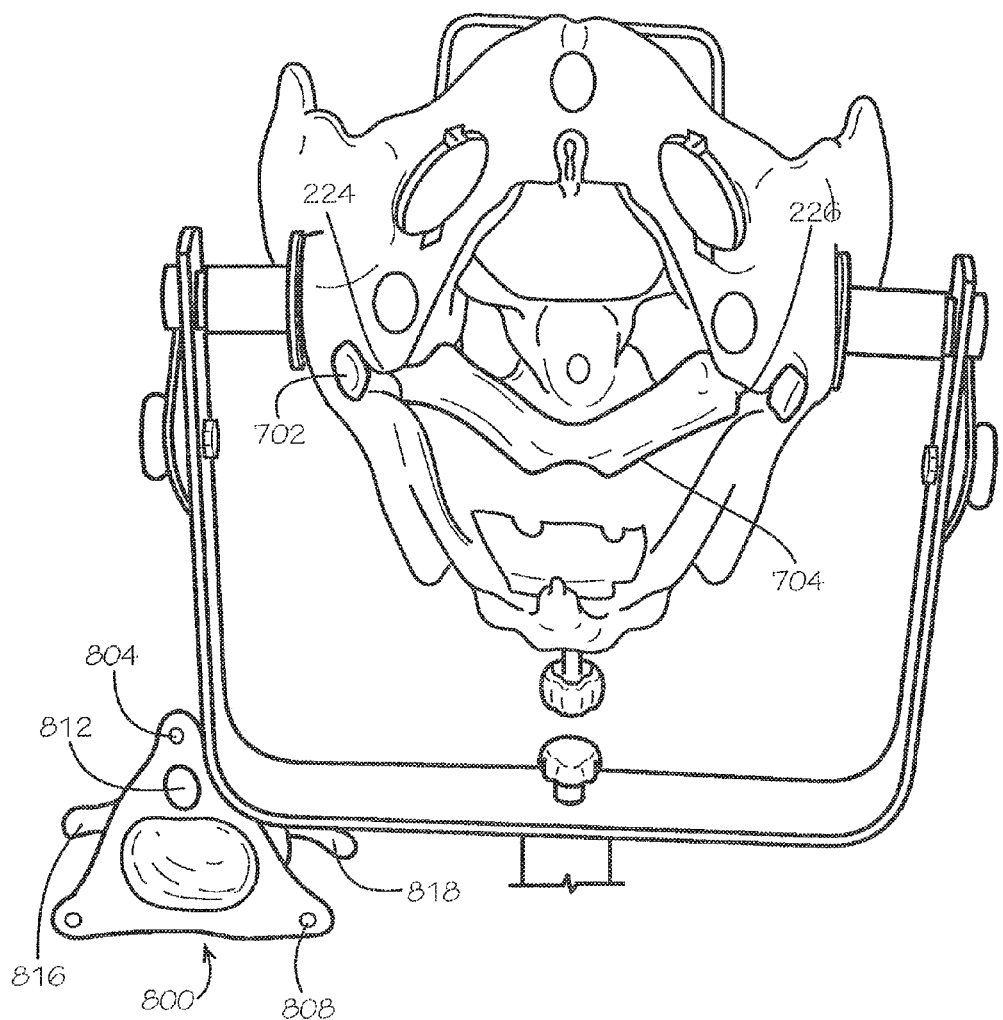

In the embodiments shown in FIGS. 15 and 16, perineum module 700 can be attached to pelvic bone module 200 using left slip attachment 702 and right slip attachment 704 on the perineum module 700 and left groove 224 and right groove 228 on the pelvic bone module 200. In this embodiment, perineum module 700 can be attached to and detached from pelvic bone module 200 without using any bolts, threaded receptacles, etc. In embodiments, once perineum module 700 has been correctly attached to the pelvic bone module 200 (e.g., attaching 702 with 224 and attaching 704 with 226), the perineum module 700 is in an anatomically accurate position relative to pelvic bone module 200.

Figure 17:
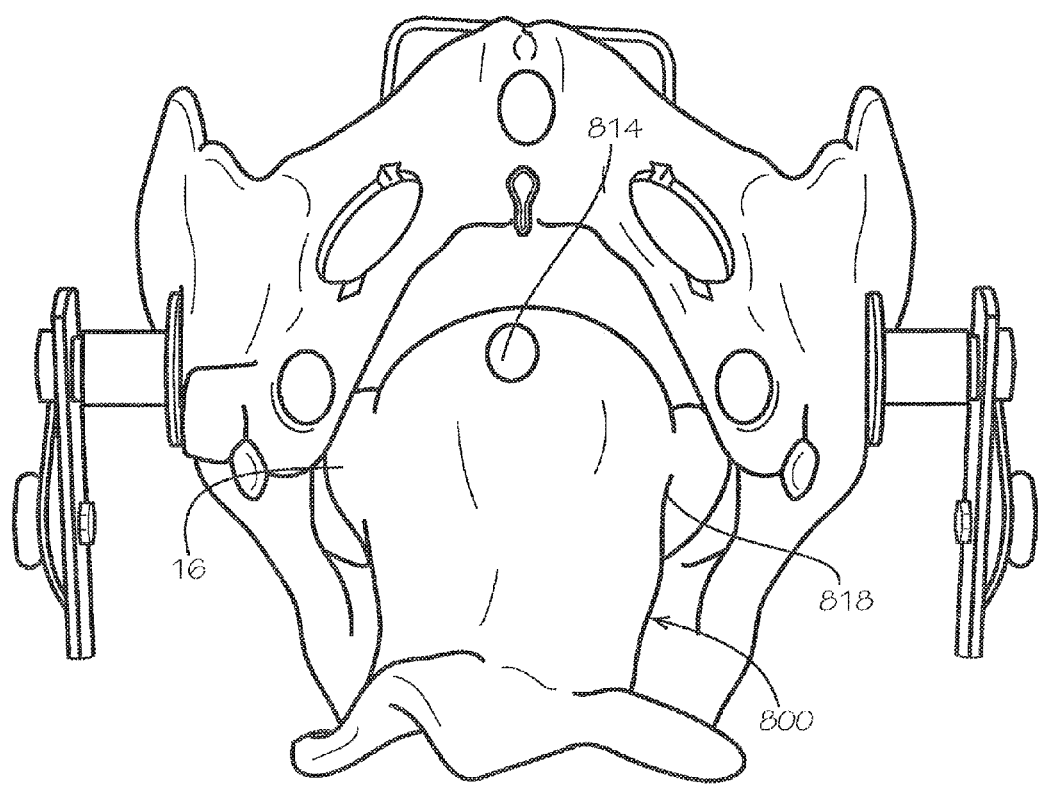
Figure 19:
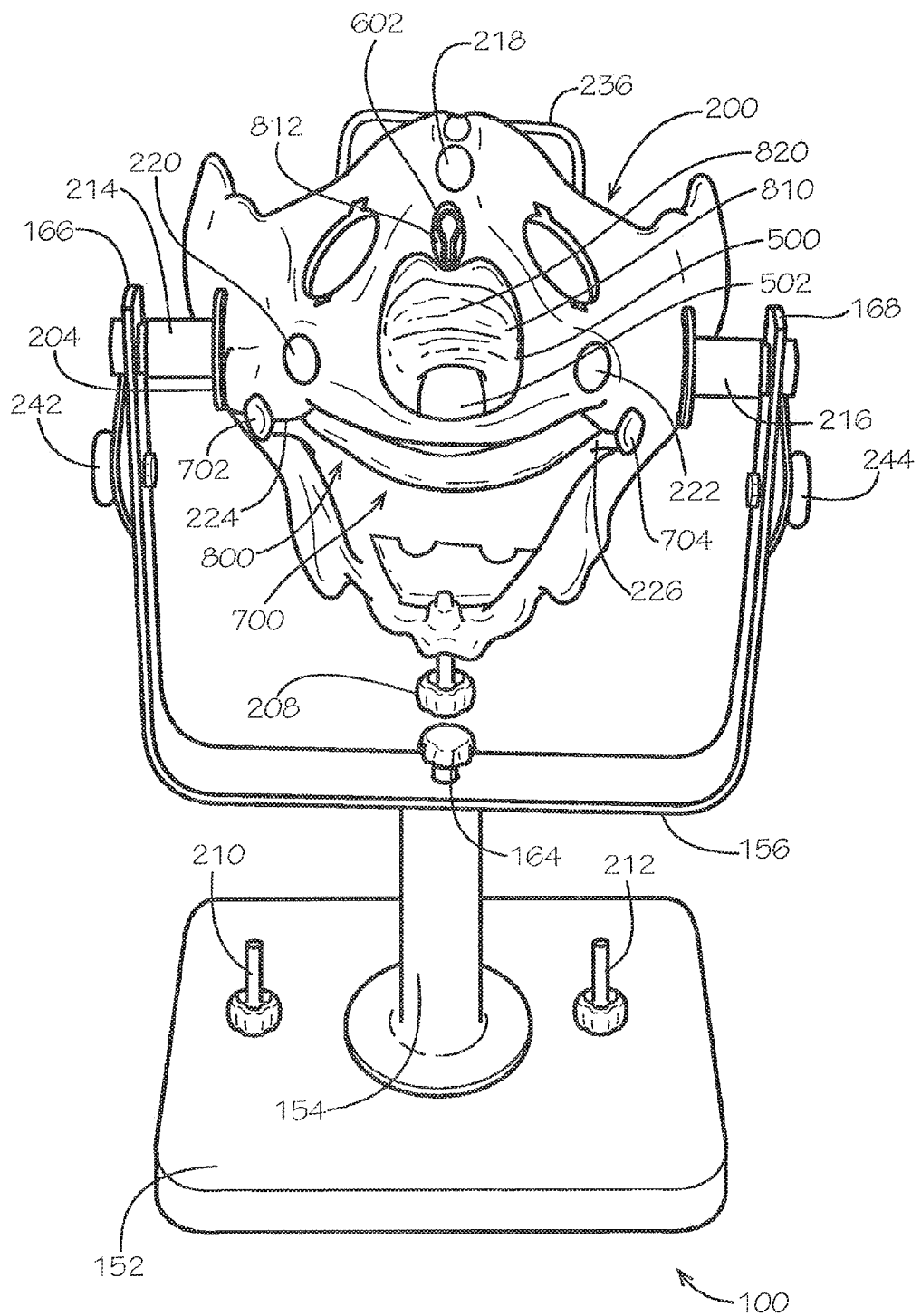

In the embodiments shown in FIGS. 17, 18, and 19, vagina module 800 comprises a vagina material 802 that defines a top opening 804, left opening 806, and right opening 808. In these embodiments, the top opening 804 of the vagina module 800 can be slid over top peg 218 of the pelvic bone module 200, left opening 806 of the vagina module 800 can be slid over left peg 220 of the pelvic bone module 200, and right opening 808 of the vagina module 800 can be slid over right peg 222 of the pelvic bone module 200 to attach the vagina module 800 with the pelvic bone module 200. In this embodiment, vagina module 800 can be attached to and detached from pelvic bone module 200 without using any bolts, threaded receptacles, etc. In embodiments, once vagina module 800 has been correctly attached to the pelvic bone module 200 (e.g., attaching 804 with 218, attaching 806 with 220, and attaching 808 with 222), the vagina module 800 is in an anatomically accurate position relative to pelvic bone module 200.

In the embodiments shown in FIGS. 2, 26, 27, 28, and 29, vulva module 900 comprises a vulva material 902 that defines a bottom attachment opening 908, a left attachment opening 910, and a right attachment opening 912. In these embodiments, bottom bolt 208 can be inserted through bottom attachment opening 902 of the vulva module 900 and inserted into bottom threaded receptacle 202 of the pelvic bone module 200, left bolt 210 can be inserted through left attachment opening 904 of the vulva module 900 and inserted into bottom threaded receptacle 204 of the pelvic bone module 200, and right bolt 212 can be inserted through right attachment opening 906 of the vulva module 900 and inserted into right threaded receptacle 206 of the pelvic bone module 200. In other embodiments, vulva module 900 may be attached to pelvic bone module 200 using clips, sliding receptacles, etc. such that the vulva module 900 can be attached to the pelvic bone module 200 without using any bolts, threaded receptacles, etc. In embodiments, once vulva module 900 has been correctly attached to the pelvic bone module 200 (e.g., attaching 202 to 208 through 902, attaching 204 to 210 through 904, and attaching 206 to 212 through 906), the vulva module 900 is in an anatomically accurate position relative to pelvic bone module 200.

Figure 22:
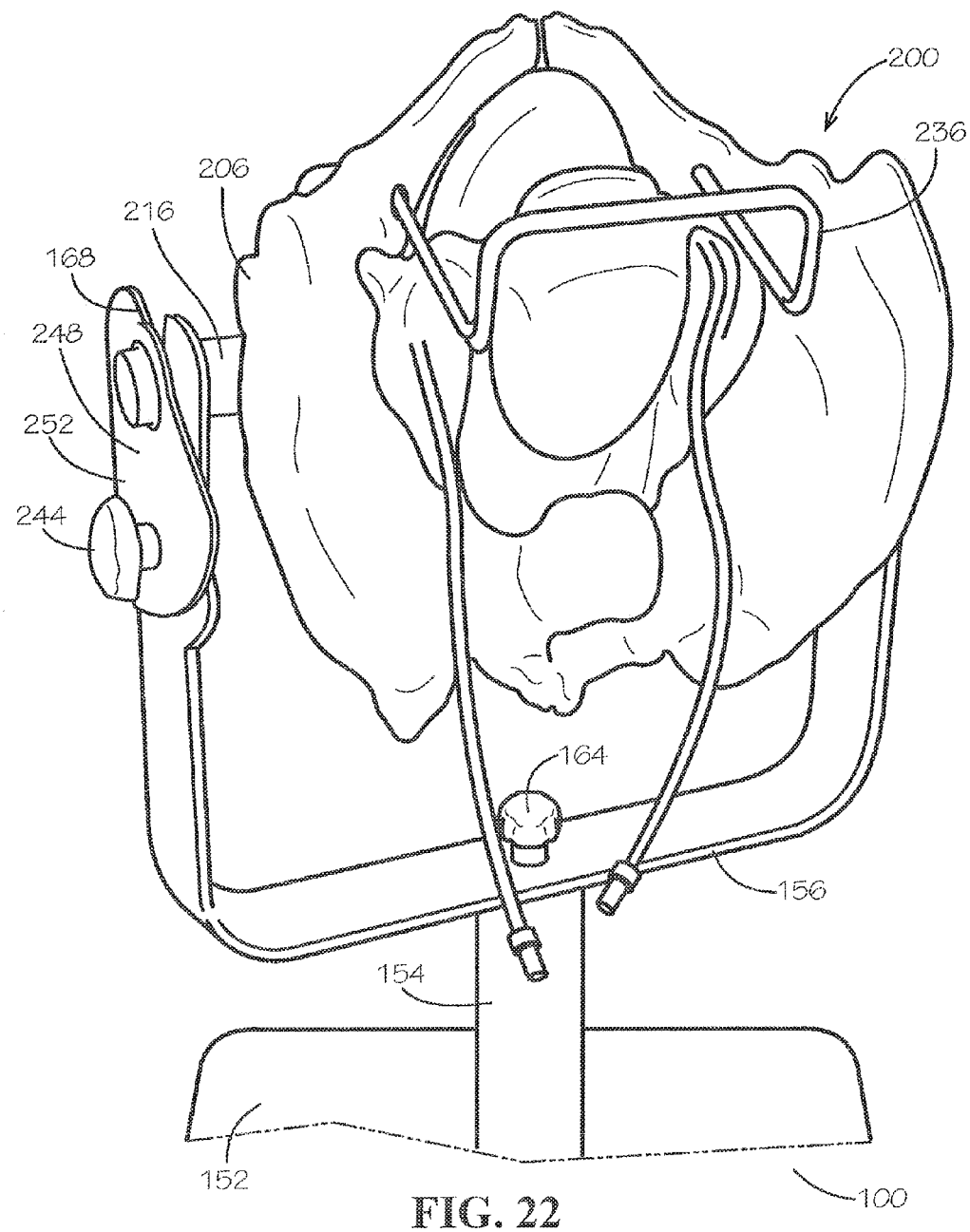

In embodiments, pelvic bone module 200 comprises an open-ended pelvis. For example, in one embodiment, when pelvic model 100 is assembled, a side opposite the vaginal opening may be easily visible to an evaluator either in-person of by using one or more cameras. FIG. 22 provides one example pelvic bone module 200 having an open-ended pelvis. As shown in FIG. 22, an evaluator (in-person or remotely by using one or more cameras) can easily view uterus module 500 and bladder module 600. In this example, the view is opposite the vaginal opening on the pelvic model, which is shown in FIG. 19, for example. In the embodiment shown in FIG. 22 the vulva module 900 is not yet attached; however, even when the vulva module 900 is attached, the view as shown in FIG. 22 is substantially the same and would allow an evaluator (in-person or remotely by using one or more cameras) to view at least part of uterus module 500 and/or bladder module 600. Numerous other embodiments are disclosed herein and variations are within the scope of this disclosure.

In the embodiment shown in FIG. 3, the pelvic bone module 200 comprises a single, integrated component that provides a realistic representation of a human female pelvic skeleton. In other embodiments, pelvic bone module 200 comprises two or more human female pelvic skeleton components that, when assembled, provide a realistic representation of a human female pelvic skeleton. In various embodiments, one or more of sacrospinous ligament module 300, obturator module 400, uterus module 500, bladder module 600, perineum module 700, vagina module 800, and/or vulva module 900 may be integrated into pelvic bone module 200. In yet other embodiments, one or more modules may be integrated into a single module. For example, in one embodiment, a left obturator module and a right obturator module are integrated into a single obturator module comprising the left obturator module and the right obturator module. As another example, in one embodiment, perineum module and a vagina module may be integrated into a single perineum-vagina module. Numerous other embodiments are disclosed herein and variations are within the scope of this disclosure.

Illustrative Sacrospinous Ligament Module

In embodiments, pelvic model 100 comprises a sacrospinous ligament module 300. In one embodiment, sacrospinous ligament module 300 is attached to and detachable from pelvic bone module 200. For example, in the embodiment shown in FIG. 3, sacrospinous ligament module 300 comprises a left snap fitting 302 for connecting the left portion 306 of the sacrospinous ligament module 300 to a mating snap connector on the left side of pelvic bone module 200. As also shown in FIG. 3, sacrospinous ligament module 300 can comprise a right snap fitting 304 for connecting the right portion 308 of the sacrospinous ligament module 300 to a mating snap connector on the right side of pelvic bone module 200. In one embodiment, left and right snap connectors of the pelvic bone module 200 are located on a left ischium and a right ischium, respectively, of the pelvic bone structure 200.

Figure 4:
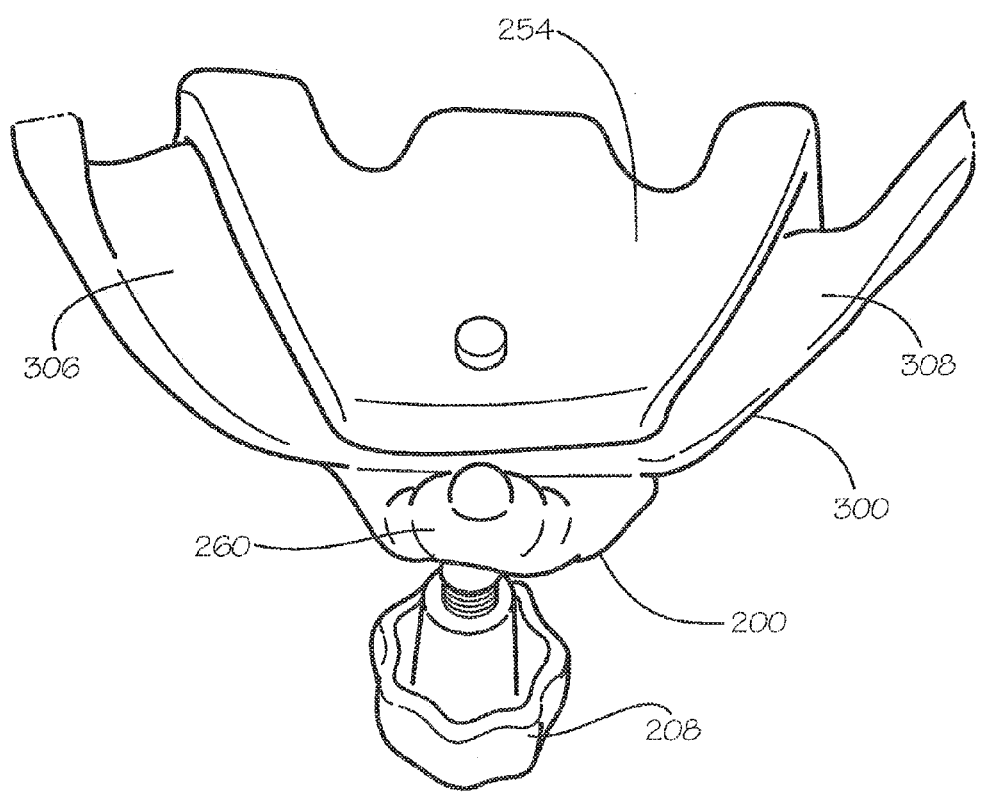
FIG. 4 illustrates aspects of an illustrative sacrospinous ligament module for a pelvic model according to an embodiment.

In embodiments, when sacrospinous ligament module 300 is correctly attached to pelvic bone module 200, the sacrospinous ligament module 300 is in an anatomically correct position relative to the pelvic bone module 200. In some embodiments, sacrospinous ligament module 300 can be configured to look, feel, or otherwise mimic a human sacrospinous ligament. As shown in FIGS. 1, 3, and 4, the left portion 306 and/or the right portion 308 of the sacrospinous ligament module can be textured and have various ridges. In embodiments, sacrospinous ligament module 300 also has a center portion 310 that can be smooth and designed to fit a matching plate to further secure the sacrospinous ligament module. As shown in FIGS. 1, 3, and 4, the center portion 310 of the sacrospinous ligament module 300 can be designed to match support plate 254.

In some embodiments, the center portion 310 of the sacrospinous ligament module 300 defines an opening through which bolt 208 can be inserted and tightened to secure the sacrospinous ligament module 300 to the pelvic bone structure. For example, in one embodiment, coccyx 260 of the pelvic bone module 200 defines an opening that corresponds with the opening in the center portion 310 of the sacrospinous ligament module 300. In this embodiment, a support plate 254 defines a threaded receptacle that corresponds with the openings in the coccyx 260 of the pelvic bone module 200 and the center portion 310 of the sacrospinous ligament module 300. In one embodiment, the opening in the center portion 310 of the sacrospinous ligament module 300 can be aligned with the opening in the coccyx 260 of the pelvic bone module and the threaded receptacle of support place 254. In this embodiment, the center portion 310 of the sacrospinous ligament module 300 can be fitted between the coccyx 260 of the pelvic bone module 200 and the support plate 254 such that the openings and receptacles align. In this embodiment, bolt 208 can be inserted through the opening in the coccyx 260, then through the opening in the center portion 310 of the sacrospinous ligament 300, and into the threaded receptacle of support plate 254. Bolt 208 can then be tightened to secure the center portion 310 of the sacrospinous ligament 300 between the coccyx 260 of the pelvic bone module 200 and the support plate 254. Moreover, as shown in FIGS. 1 and 4, support plate 254 can have a matching configuration as the center portion 310 of the sacrospinous ligament module 300. For example, as shown in FIGS. 1 and 4, both the support plate 254 and the center portion 310 of the sacrospinous ligament module 300 can define u-shaped notches at the back of the support plate 254 and the back of the sacrospinous ligament module 300. As another example, the back of the center portion 310 of the sacrospinous ligament module 300 and the back of the support plate 254 may be wider than the front of the center portion 310 of the sacrospinous ligament module 300 and the front of the support plate 254, as shown in FIGS. 1 and 4. In one embodiment, In embodiments, bolt 208 can also be used to secure vulva module 900 to pelvic bone module 200. For example, as shown in FIG. 2, vulva module 900 can define an opening 908 towards the bottom of the vulva module 900 through which bolt 208 can be inserted. In this embodiment, vulva module 900 and sacrospinous ligament module 300 can be attached to pelvic bone module 200 by inserting bolt 208 through opening 908 of vulva module 900 then through the corresponding opening in the coccyx 260 of pelvic bone module 200, then through the corresponding opening in the center portion 310 of the sacrospinous ligament module 300, and into the corresponding receptacle of support plate 254. In this way, the same fastener, such as bolt 208, can be used to secure at least part of the vulva module 900 and at least part of the sacrospinous ligament module 300 to the pelvic bone module 200.

The pelvic bone module 200 and sacrospinous ligament module 300 can designed to attach such that passage with a surgical instrument (such as a trocar and/or a needle) can be performed above and/or below the sacrospinous ligament module 300. In one embodiment, the back edge (e.g., the sacral edge or the edge closest to the sacrum of the pelvic bone structure) of the center portion 310 of the sacrospinous ligament module 300 aligns with sacral vertebrae S4 or S5. In one embodiment, the width (e.g., the length between the sacral edge of the center portion 310 and the coccyx edge of the center portion 310) of the center portion 310 of the sacrospinous ligament module 300 is three centimeters. In other embodiments, the width of the center portion 310 of the sacrospinous ligament module 300 is between two centimeters and five centimeters.

Sacrospinous ligament module 300 and/or support plate 254 can be made of one or more suitable materials. In one embodiment, center portion 310 of sacrospinous ligament module 300 and/or support plate 254 comprises a material having a Shore hardness of approximately D70 (e.g., Shore scale D and durometer of 70). For example, in one embodiment, center portion 310 of sacrospinous ligament module 300 and/or support plate 254 is made using a suitable plastic, such as a urethane plastic. In one embodiment, center portion 310 of sacrospinous ligament module 300 and/or support plate 254 is made using Smooth Cast 305. In other embodiments, center portion 310 of sacrospinous ligament module 300 and/or support plate 254 can be made using a material having a Shore hardness of between D40 and D100, preferably between D65 and D100.

In some embodiments, all or a portion of sacrospinous ligament module 300 comprises rubber. In one embodiment, left portion 306 and right portion 308 of sacrospinous ligament module 300 comprises one or more rubbers. In another embodiment, the entire sacrospinous ligament module 300 comprises one or more rubbers. In one embodiment, a casted rubber with high-density polyethylene reinforcement may be used for the entire sacrospinous ligament module 300 or left portion 306 and right portion 308 of sacrospinous ligament module 300. For example, in one embodiment, the entire sacrospinous ligament module 300 or left portion 306 and right portion 308 of sacrospinous ligament module 300 can be made of a material having a Shore hardness of A20 (e.g., Shore scale A and durometer of 20). In other embodiments, the entire sacrospinous ligament module 300 or left portion 306 and right portion 308 of sacrospinous ligament module 300 can be made of a material having a Shore hardness between A0 and A60, preferably between A10 and A30. In some embodiments, the entire sacrospinous ligament module 300 or left portion 306 and right portion 308 of sacrospinous ligament module 300 can be reinforced with high-density polyethylene. In one embodiment, the entire sacrospinous ligament module 300 or left portion 306 and right portion 308 of sacrospinous ligament module 300 comprises Poly PT Flex 20 with Tyvek reinforcement.

Figure 5:
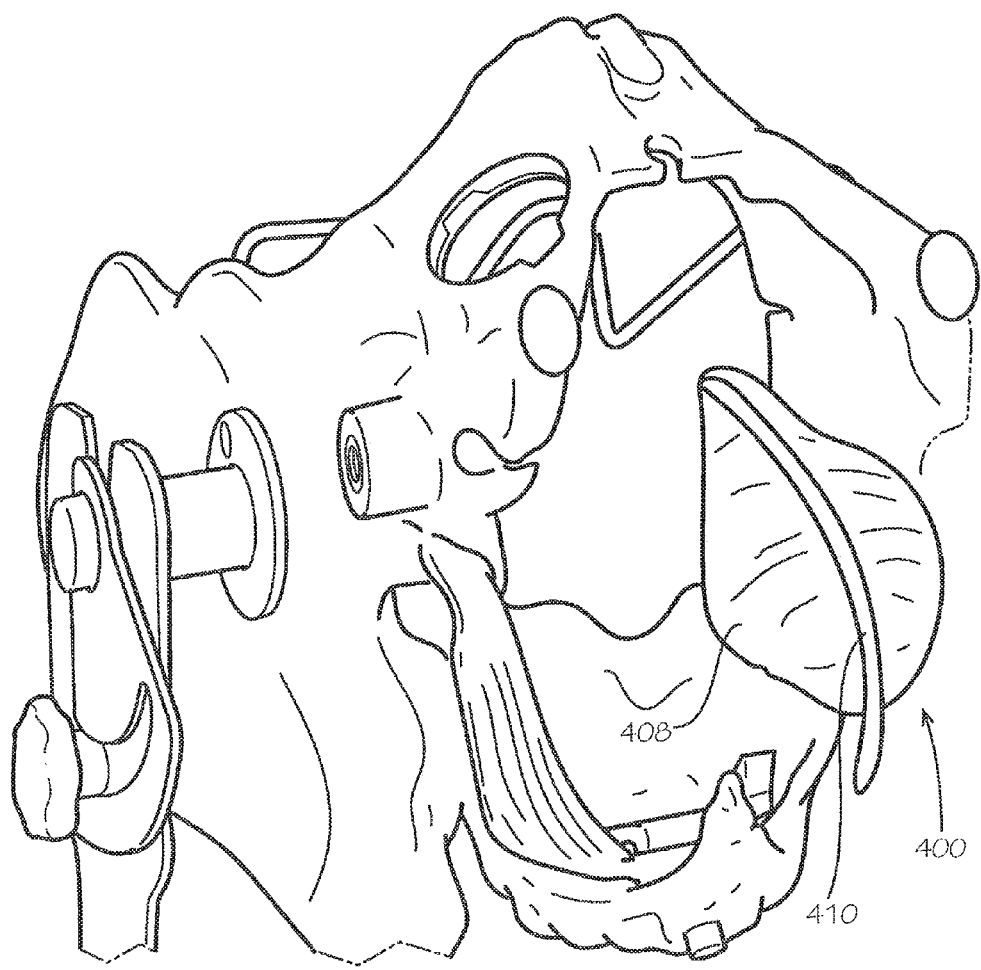
FIG. 5-29 illustrates aspects of an illustrative pelvic model according to an embodiment.

In one embodiment, at least the left portion 306 and the right portion 308 of the sacrospinous ligament module 300 requires a force of 1.5 lb/in$^2$ before being penetrated. In other embodiments, at least the left portion 306 and the right portion 308 of the sacrospinous ligament module 300 requires a force of between 1 lb/in$^2$ and 3 lb/in$^2$ for penetration. In these embodiments, the sacrospinous ligament module 300 can simulate the "pop" typically heard when puncturing a human sacrospinous ligament, such as with trocar passage. In some embodiments, the left portion 306 and/or the right portion 308 of the sacrospinous ligament module is textured. For example, the left and right portions 306, 308 may have ridges and/or grooves as shown in FIGS. 1, 5, and 6. In this embodiment, the texture can be discernible through the vaginal wall of the vagina module 800 when the pelvic model. 100 is assembled. In some embodiments, the ridges and/or grooves on the left and/or right portions 306, 308 of the sacrospinous ligament module 300 can be palpated through the vagina module 800 or the rectum 914 on the vulva module 900 such as during a vaginal or rectal exam. Numerous other embodiments are disclosed herein and variations are within the scope of this disclosure.

Illustrative Obturator Module

In embodiments, pelvic model 100 comprises one or more obturator modules. In one embodiment, pelvic model 100 comprises a left obturator module and a separate right obturator module. In another embodiment, a single, integrated obturator module comprises both the left obturator module and the right obturator module. In some embodiments, an obturator module comprises an obturator membrane 406 and an obturator internus 408. For example, in one embodiment, as shown in FIGS. 1, 5, and 6, a left obturator module comprises an integrated obturator membrane 406 and an obturator internus 408, and/or a right obturator module comprises an integrated obturator membrane 406 and an obturator internus 408. An obturator module can comprise a frame 401 that allows the obturator module 400 to be attached to the pelvic model 100. For example, in one embodiment, the frame 401 of the obturator module 400 slidably connects with pelvic bone module 200 by fitting into an opening of the pelvic bone module 200 defining an obturator forman. In the embodiment shown in FIG. 6, frame 401 comprises a left snap fitting 402 for attaching the obturator module 400 to a corresponding left snap fitting receptacle 256 on the pelvic bone module 200 and a right snap fitting 404 for attaching the obturator module 400 to a corresponding right snap fitting receptacle 258 on the pelvic bone module 200. In one embodiment, the obturator module 400 can be attached to the pelvic bone module by aligning snap fittings 402, 404 with receptacles 256, 258 and pushing the obturator module 400 into the receptacles 256, 258. In another embodiment, once the fittings 402, 404 have been inserted into the receptacles 256, 258, the obturator module 400 is turned clockwise and/or counterclockwise to allow the fittings 402, 404 to be slid into grooves of the pelvic bone module 200 at the receptacles 256, 258 to lock the obturator module 400 into the pelvic bone module 200. In various embodiments, the frame 401 of the obturator module 400 and the pelvic bone module 200 provide 360 degrees of tension for the obturator module 400 to hold the obtruator module 400 in place during palpation.

In embodiments, when obturator module 400 is correctly attached to pelvic bone module 200, obturator module 400 is in an anatomically correct position relative to the pelvic bone module 200. In some embodiments, obturator module 400 can be configured to look, feel, or otherwise mimic a human sacrospinous ligament. As shown in FIG. 5, the obturator module 400 may comprise an arcus tendinous fascia pelvis 410. In one embodiment, the arcus tendinous fascia pelvis 410 is represented by a raised ridge on the obturator internus 408. In some embodiments, when the obturator module 400 is attached to the pelvic bone module 200, the arcus tendinous fascia pelvis 410 of the obturator module 400 extends from an inferior pubic ramus of the pelvic bone module 200 towards an ischial spine of the pelvic bone module 200. As shown in FIG. 5, arcus tendonius fascia pelvis 410 can extend beyond obturator internus 408. In some embodiments, once assembled, an anchoring device and/or suturing can be performed along the arcus tendonius fascia pelvis 410 during a surgical procedure being performed on pelvic model 100. In embodiments, obturator internus 408 may comprise one or more ridges for palpation during a surgical procedure. For example, as shown in FIG. 5, obturator internus 408 comprises ridges that are substantially perpendicular to arcus tendonius fascia pelvis 410. Moreover, as shown in FIG. 5, a ridge representing the arcus tendinous fascia pelvis 410 may be larger (e.g., wider, taller, longer, etc.) than one or more ridges on the obturator internus 408. In this way, a surgeon may be able to determine the location of obturator internus 408 and/or arcus tendonius fascia pelvic 410 by palpating the ridges of the obturator module 400 when using pelvic model 100. The pelvic bone module 200 and obturator module 400 can be designed to attach such that passage with a surgical instrument (such as a trocar and/or a needle) can be performed from an inside out approach or from an outside in approach.

An obturator module 400 can be made of one or more suitable materials. For example, in one embodiment, obturator module 400 comprises a single material. As another example, in one embodiment, frame 410 comprises a first material and the remaining parts of the obturator module 400 (such as obturator membrane 406, obturator internus 408, and/or arcus tendonius fascia pelvis 410) comprises a second material. In yet other embodiments, various components of the obturator module 400 can be made of one, two, three, or more suitable materials. In one embodiment, frame 410 comprises a material having a Shore hardness of approximately D70 (e.g., Shore scale D and durometer of 70). For example, in one embodiment, frame 410 of obturator module 400 is made using a suitable plastic, such as a urethane plastic. In one embodiment, frame 410 of obturator module 400 is made using Smooth Cast 305. In other embodiments, frame 410 of obturator module 400 can be made using a material having a Shore hardness of between D40 and D100, preferably between D65 and D100.

In some embodiments, all or a portion of obturator module 400 comprises rubber. In one embodiment, obturator membrane 406, obturator internus 408, and arcus tendonius fascia pelvis 410 is an single, integrated component. In embodiments, a casted rubber with high-density polyethylene reinforcement may be used for the obturator membrane 406, obturator internus 408, and/or arcus tendonius fascia pelvis 410. For example, in one embodiment, obturator membrane 406, obturator internus 408, and/or arcus tendonius fascia pelvis 410 can be made of a having a Shore hardness of A20 (e.g., Shore scale A and durometer of 20). In other embodiments, obturator membrane 406, obturator internus 408, and/or arcus tendonius fascia pelvis 410 can be made of a material having a Shore hardness between A0 and A60, preferably between A10 and A30. In some embodiments, obturator membrane 406, obturator internus 408, and/or arcus tendonius fascia pelvis 410 can be reinforced with high-density polyethylene. In one embodiment, obturator membrane 406, obturator internus 408, and/or arcus tendonius fascia pelvis 410 comprises Poly PT Flex 20 with Tyvek reinforcement.

In one embodiment, obturator membrane 406, obturator internus 408, and/or arcus tendonius fascia pelvis 410 of obturator module 400 requires a force of 1.5 lb/in$^2$ before being penetrated. In other embodiments, obturator membrane 406, obturator internus 408, and/or arcus tendonius fascia pelvis 410 of obturator module 400 requires a force of between 1 lb/in$^2$ and 3 lb/in$^2$ for penetration. In these embodiments, obturator module 400 can simulate the "pop" typically heard when puncturing a human obturator membrane 406, obturator internus 408, and/or arcus tendonius fascia pelvis 410 with a surgical instrument, such as a trocar or a needle. Numerous other embodiments are disclosed herein and variations are within the scope of this disclosure.

Illustrative Uterus Module

In embodiments, pelvic model 100 comprises a uterus module. For example, in the embodiments shown in FIGS. 9 and 10, pelvic model 100 comprises uterus module 500. In embodiments, a suitable uterus module can be selected from two or more available uterus modules. For example, in one embodiment, a first uterus module can be used when assembling pelvic model 100 if a vaginal hysterectomy is going to be performed on pelvic model 100 and a second uterus model can be used when assembling pelvic model 100 for more general usage.

In one embodiment, a uterus module comprises a cervix, a fallopian tube, an ovary, and/or a broad ligament. For example, in one embodiment, uterus module 500 comprises a single, integrated component that comprises a cervix, a fallopian tube, a ovary, and a broad ligament. In other embodiments, one or more components may be attached together to form a uterus module. For example, in one embodiment, a broad ligament can be attached to a fallopian tube and/or an ovary to form a uterus module. A uterus module may define a cervical os connecting to a full uterine cavity having a normal gynecoid shape. In one embodiment, the uterus module comprises a cervix that is approximately 1.5 inches long and/or that has an expandable diameter. For example, in one embodiment, the cervical os has a diameter of 6 mm that can expand to 7 mm. In various embodiments, the cervical os can have a diameter between 5-7 mm and, in various embodiment, the cervical os can expand to be between 6 and 8 mm these embodiments, pelvic model 100, when assembled, may be used for an intrauterine device (IUD) insertion procedure, an IUD removal procedure, an endometrial biopsy, dilation and curettage, and/or a diagnostic hysteroscopy.

In some embodiments, a broad ligament of a uterus module comprises one or more rods for attached the uterus module to a pelvic bone module. For example, as shown in FIG. 9, a broad ligament of uterus module 500 can have a left rod 504 and a right rod 506 for attaching uterus 500 to pelvic bone module 200. In one embodiments, uterus module 500 can be connected to pelvic bone module 200 by slidably inserting rod 504 into groove 232 and rod 506 into groove 234. In various embodiments, one or more vessels can run through the broad ligament and can be used to simulate vascular supply. In one embodiment, the vessel(s) can connect via one or more luer locks to simulate vascular supply. In some embodiment, vessel(s) may be configured to receive a 14 Fr catheter. As another example, vessel(s) can have an interior diameter between 3 mm and 4 mm and an outer diameter between 4 mm and 6 mm. The uterus module 500 can define one or more grooves and/or openings for tubing that can be connected to the uterus module 500. For example, referring to FIGS. 9 and 10, uterus module 500 can define a left opening and a left groove for receiving tube 508 and a right opening and a right groove for receiving tube 510. A liquid or gas (e.g., water or air) can be pumped through the tube 508 and/or tube 510, such as to simulate blood flow. In one embodiment, a blood pressure cuff can be coupled to the tube 508 and/or tube 510 and used to supply air pressure.

In one embodiment, the broad ligament of a uterus module has a thickness of 3 mm. In other embodiments, the broad ligament of a uterus module can have a single thickness or a varying thickness of between 2 mm and 4 mm. In one embodiment, the length from the cervix of a uterus module to the fundus is 4 inches and/or the width is 2.5 inches. In other embodiments, the length from the cervix of a uterus module to the fundus is a single length or a varying length between 3.5 inches and 4.5 inches and/or the width is a single width or a varying width between 2 inches and 3 inches.

A uterus module 500 can be made of one or more suitable materials. For example, in one embodiment, uterus module 500 comprises a single material. As another example, in one embodiment, uterus module 500, comprises two, three, four, or more materials. In some embodiments, uterus module 500 comprises one or more polyurethanes and/or one or more rubbers. In other embodiments, at least part of a uterus module comprises one or more plastics. For example, in one embodiment, rod 504 and/or rod 506 can be made of plastic, such as a urethane plastic. In some embodiments, rod 504 and/or rod 506 of uterus module 500 can be made using a material, such as certain polyurethanes and plastics, having a Shore hardness of between D55 and D100. In various embodiments, all or a portion of uterus module 500 comprises a material having a durometer between 30 and 60 on the Shore 00 scale, and preferably between 38 and 48. For example, in one embodiment, at least a cervix, a fallopian tube, an ovary, and/or a broad ligament of uterus module 500 comprises a polyurethane having a Shore hardness of approximately 43. In some embodiments, at least part of the uterus module can be reinforced with a mesh. For example, in one embodiment, the broad ligament of a uterus module is reinforced with a subcutaneous mesh. In one embodiment, uterus module 500 comprises an integrated cervix, fallopian tubes, ovaries, broad ligament made using BJB polyurethance TC-422 with 50% urethane material. In this embodiment, the broad ligament can be reinforced with subcutaneous mesh. In another embodiment, uterus module 500 comprises an integrated cervix, fallopian tubes, ovaries, broad ligament made using BJB polyurethane TC-422 A+B with 50% C. In yet another embodiment, uterus module 500 comprises an integrated cervix, fallopian tubes, ovaries, broad ligament made using BJB polyurethane TC-422 A+B with 50% C and a urethane material, in these embodiments, the broad ligament can be reinforced with subcutaneous mesh. Numerous other embodiments are disclosed herein and variations are within the scope of this disclosure.

Illustrative Bladder Module

In embodiments, pelvic model 100 comprises a bladder module. For example, in the embodiments shown in FIGS. 12 and 13, pelvic model 100 comprises a bladder module 600. In one embodiment, the bladder module 600 comprises at least one slip fitting for attaching the bladder module 600 to a corresponding groove in the pelvic bone module 200. For example, as shown in FIGS. 11, 12, and 14, bladder module 600 can have a top slip fitting 604 and a bottom slip fitting 606. Moreover, as shown in these figures, bladder module 600 can be attached to the pelvic bone module 200 by sliding top slip fitting 604 of bladder module 600 into corresponding groove 228 of the pelvic bone module 200 and by sliding bottom slip fitting 606 of bladder module 600 into corresponding groove 230 of pelvic bone module 200. In this embodiment, when bladder module 600 is attached to pelvic bone module 200, bladder module 600 is in an anatomically accurate position relative to the pelvic bone module 200. In one embodiment, bladder module 600, when attached, fits snugly between a pubic bone of the pelvic bone module 200 and the uterus module 500. Further, as shown in FIG. 14, bladder module 600 can define a bladder opening 602 representing a urethra. In embodiments, bladder module 600 comprises a one-way valve in the urethra. In embodiments, the one-way valve simulates a sphincter. In some embodiments, the bladder opening 602 representing the urethra can allow a urinary catheterization procedure to be performed on an assembled pelvic model 100. For example, in one embodiment, bladder module 600 can receive a catheter through the bladder opening 602. In embodiments, the bladder module 600 can accept a 12 fr catheter, a 16, fr catheter, and/or another catheter between 12 fr and 16 fr.

Figure 13:
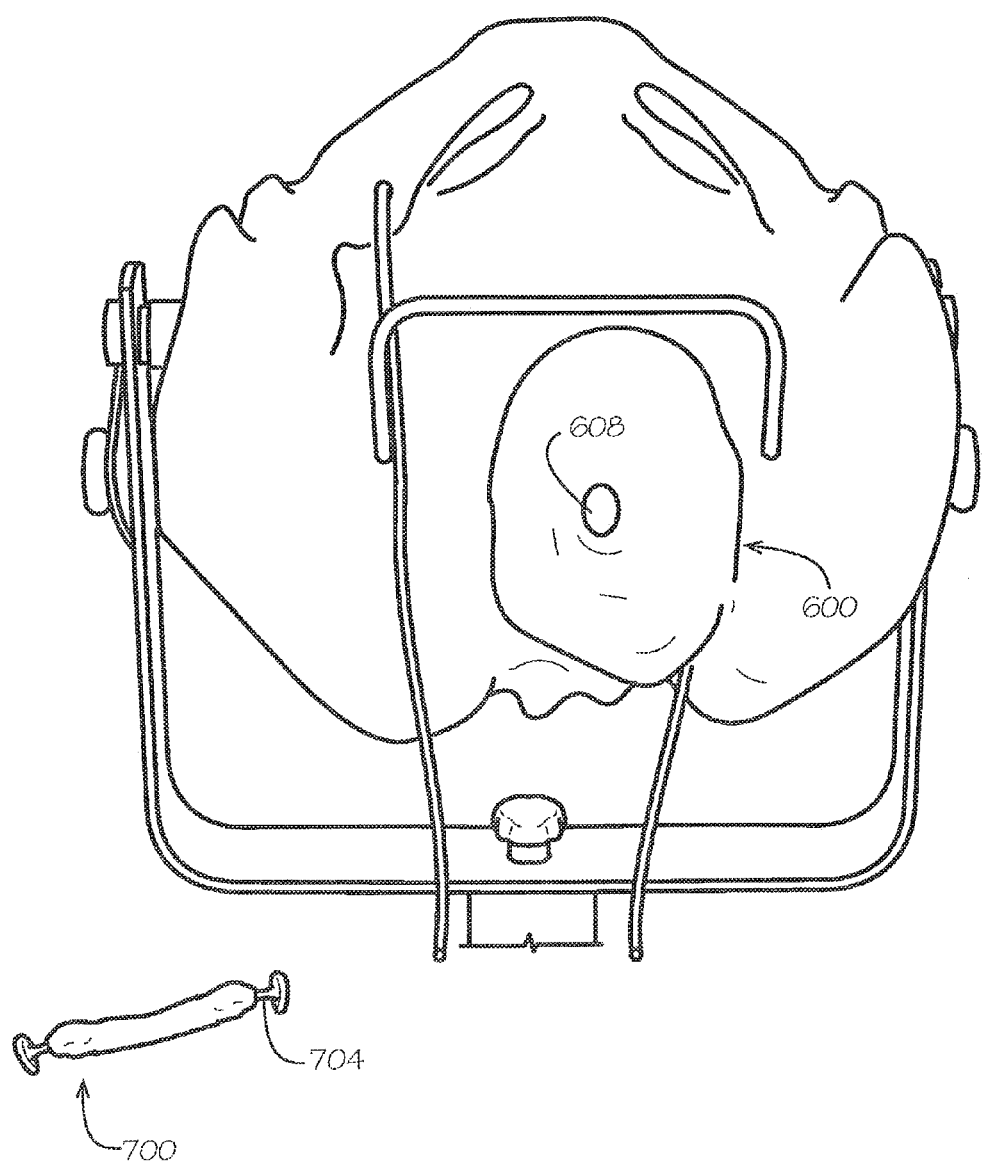

In one embodiment, bladder module 600 is hollow. In this embodiment, bladder module 600 may deflate when empty. In some embodiments, bladder module 600 includes an opening for filling the bladder module 600 with a fluid, such as water. The fluid may simulate, for example, urine. In one embodiment, bladder module 600 can hold 100 cc of fluid. In other embodiments, bladder module 600 may hold between 75 cc and 125 cc of fluid. As shown in FIG. 13, bladder module 600 can include a plug 608 to close or other prevent fluid from discharging through the opening used to fill the bladder module. In embodiments, bladder module 600 can include a thin wall. In one embodiment, the bladder module 600 can leak fluid when punctured.

A bladder module 600 can be made of one or more suitable materials. For example, in one embodiment, bladder module 600 comprises a single material. As another example, in one embodiment, bladder module 600, comprises two, three, four, or more materials. In some embodiments, bladder module 600 comprises one or more polyurethanes and/or one or more rubbers. In other embodiments, at least part of a bladder comprises one or more plastics. For example, in one embodiment, plug 608 can be made of plastic, such as a urethane plastic. In some embodiments, plug 608 can be made using a material, such as certain polyurethanes and plastics, having a Shore hardness of between D55 and D100. In various embodiments, all or a portion of bladder module 600 comprises a material having a durometer between 30 and 60 on the Shore 00 scale, and preferably between 38 and 48. For example, in one embodiment, the entire bladder module 600 except for plug 608 is a single, integrated component. In this embodiment, the entire bladder module 600 or the entire bladder module 600 except plug 608 comprises a polyurethane having a Shore hardness of approximately 43. In one embodiment, the entire bladder module 600 or the entire bladder module 600 except for plug 608 is made using BJB polyurethane TC-422 with 50% urethane material. In another embodiment, e entire bladder module 600 or the entire bladder module 600 except for plug 608 may be made using RIB polyurethane TC-422 MB with 50% C. In some embodiments, the entire bladder module 600 or the entire bladder module 600 except for plug 608 may be made using BJB polyurethane TC-422 A+B with 50% C and a urethane material. Numerous other embodiments are disclosed herein and variations are within the scope of this disclosure.

Illustrative Perineum Module

In embodiments, pelvic model 100 comprises a perineum module. For example, in the embodiments shown in FIGS. 15 and 16, pelvic model 100 comprises perineum module 700. Moreover, as shown in these figures, the perineum module can have a left slip fitting 702 and/or a right slip fitting 704. In embodiments, slip fittings 702 and 704 can be used to attach the perineum module 700 to the pelvic bone structure 200. For example, as shown in FIGS. 15 and 16, perineum module 700 can be attached to pelvic bone module 200 by sliding left slip fitting 702 of perineum module 700 into corresponding groove 224 of the pelvic bone module 200 and by sliding right slip fitting 704 of perineum module 700 into corresponding groove 226 of pelvic bone module 200. Thus, as shown in FIGS. 15 and 16, perineum module 700 can be attached to pelvic bone module 200 by sliding parts of perineum module 700 into one or more grooves on the left ischium and/or the right ischium of pelvic bone module 200. In embodiments, when perineum module 700 is attached to pelvic bone module 200, perineum module 700 is in an anatomically accurate position relative to the pelvic bone module 200. In one embodiment, when pelvic model 100 is assembled, perineum module 700 sits behind the vulva. In some embodiments, when pelvic model 100 is assembled, perineum module 700 provides a stabilizing space between the vagina and the rectum.

Perineum module 700 can be made of one or more suitable materials. In one embodiment, all or a portion of perineum module 700 comprises a rubber. In another embodiment, all or a portion of perineum module 700 comprises a polyurethane. In one embodiment, perineum module 700 comprises a single, integrated component. In other embodiments, perineum module 700 comprises multiple components. For example, in one embodiment, the left and right portions (e.g., slip fittings 702, 704) of perineum module 700 are made of one material and the remaining portion of perineum module 700 are made of another material. In this embodiment, slip fittings 702, 704 can be made of a metal, plastic, rubber, polyurethane, etc. and the remaining portion of perineum module 700 can be made of rubber and/or polyurethane. In some embodiments, at least part of perineum module 700 comprises a material having a Shore hardness of A50 (e.g., Shore scale A and durometer of 50). For example, in one embodiment, the entire perineum module 700 or all of the perineum module 700 except slip fittings 702, 704 comprises a polyurethane having a Share hardness of A50. In other embodiments, the entire perineum module 700 or all of the perineum module 700 except slip fittings 702, 704 can be made of a material having a Shore hardness between A40 and A80, preferably between A45 and A65. In one embodiment, the entire perineum module 700 or all of perineum module 700 except slip fittings 702, 704 comprises Poly PT Flex 50. Numerous other embodiments are disclosed herein and variations are within the scope of this disclosure.

Illustrative Vagina Module

In embodiments, pelvic model 100 comprises a vagina module. For example, in the embodiments shown in FIGS. 17-19 and 30-36, pelvic model 100 comprises vagina module 800. As shown in these figures, vagina module 800 can define one or more openings for attaching the vagina module 800 to pelvic bone module 200. For example, in one embodiment, vagina module 800 defines a top opening 804, a left opening 806, and a right opening 808. These openings 804, 806, 808 can be used to attach the vagina module 800 to the pelvic bone module 200 by slipping the openings 804, 806, 808 over corresponding pegs 218, 220, 222 on the pelvic bone module 200. As shown in FIGS. 17-19, the openings 802, 804, 806 in vagina module 800 that are used to attached the vagina module to pelvic bone module 200 can form a triangular shape. Similarly, as shown in these figures, the corresponding pegs 218, 220, 222 on pelvic bone module 200 can form a triangular shape. As shown in FIG. 1, in some embodiments, vaginal module 800 may also have a left slip fitting 816 and/or a right slip fitting 818. In these embodiments, left slip fitting 816 and/or right slip fitting 818 on vagina module 800 may be attached to pelvic bone module 200 by slidably attaching fittings 816, 818 in corresponding grooves on pelvic bone module 200. For example, in one embodiment, pelvic bone module 200 can have slots above the ischial spines of the pelvis for slidably attaching fittings 816, 818 of vagina module 800.

In embodiments, when vagina module 800 is correctly attached to pelvic bone module 200, vagina module 800 is in an anatomically correct position relative to bone module 200. In some embodiments, vagina module 800 can be configured to look, feel, or otherwise mimic a human vagina. For example, vagina module 800 can define a vaginal opening 810. As shown in FIG. 18, within the vaginal opening 810, the vagina module 800 can have a vaginal wall 820. Moreover, as shown in this figure, the vaginal wall 820 can be textured. For example, as shown in FIG. 18, the vaginal wall 820 can have one or more ridges to simulate a human vagina. In some embodiments, the vaginal wall 820 can have a thickness of 3 mm. In other embodiments, the vaginal wall 820 can have a thickness of 4 mm. In various embodiments, the vaginal wall 820 can have a fixed or varying thickness between 2 mm and 5 mm. In embodiments, the vagina module 800 can also define a urethra opening 812. In this embodiment, when pelvic model 100 is assembled, urethra opening 812 of the vagina module 800 aligns with urethra opening 926 of vulva module 900 and bladder opening 602 in bladder module 600.

In one embodiment, the vaginal opening 810 of vagina module 800 has an introitis width of 5 cm. In other words, in this embodiment, the entrance of the vaginal opening 810 of the vagina module is 5 cm wide. In other embodiments, the entrance of the vaginal opening 810 may be between 3 and 8 cm wide. In one embodiment, the vaginal wall 820 of the vagina module 800 defines a vagina. In some embodiments, the width of the vagina in the vagina module 800 can vary. For example, in one embodiment, the vagina has an introitis width of 5 cm that increases to 6 cm wide and then tapers towards the cervix. In other embodiments, the vagina may have an introitis width of between 3 cm and 8 cm that changes to between 3 cm and 9 cm before tapering towards the cervix. In one embodiment, the vagina has a depth of 8 cm. In another embodiment, the vagina has a depth of 9 cm. In other embodiments, the vagina may have a depot of between 6 cm and 12 cm. Numerous other embodiments are disclosed herein and variations are within the scope of this disclosure.

As shown in FIGS. 17 and 19, vagina module 800 can define an opening 814. In one embodiment, when pelvic model 100 is assembled, at least part of cervix 502 of uterus module 500 fits through opening 814 of the vagina module 800. In this embodiment, opening 814 of vagina module 800 can fit snugly around at least part of cervix 502. Moreover, in one embodiment, when pelvic model 100 is assembled, a vagina defined by vagina module 800 opens from the vulva at the pubic rami of pelvic bone and extends almost to the spine of pelvic bone module 200. In one embodiment, the vagina module 200 stops approximately 1 cm before a spinouts process of the pelvic bone module 200. In other embodiments, vagina module 200 may stop between 0.25 cm and 3 cm before reaching the spine of pelvic bone module 200.

Figure 34:
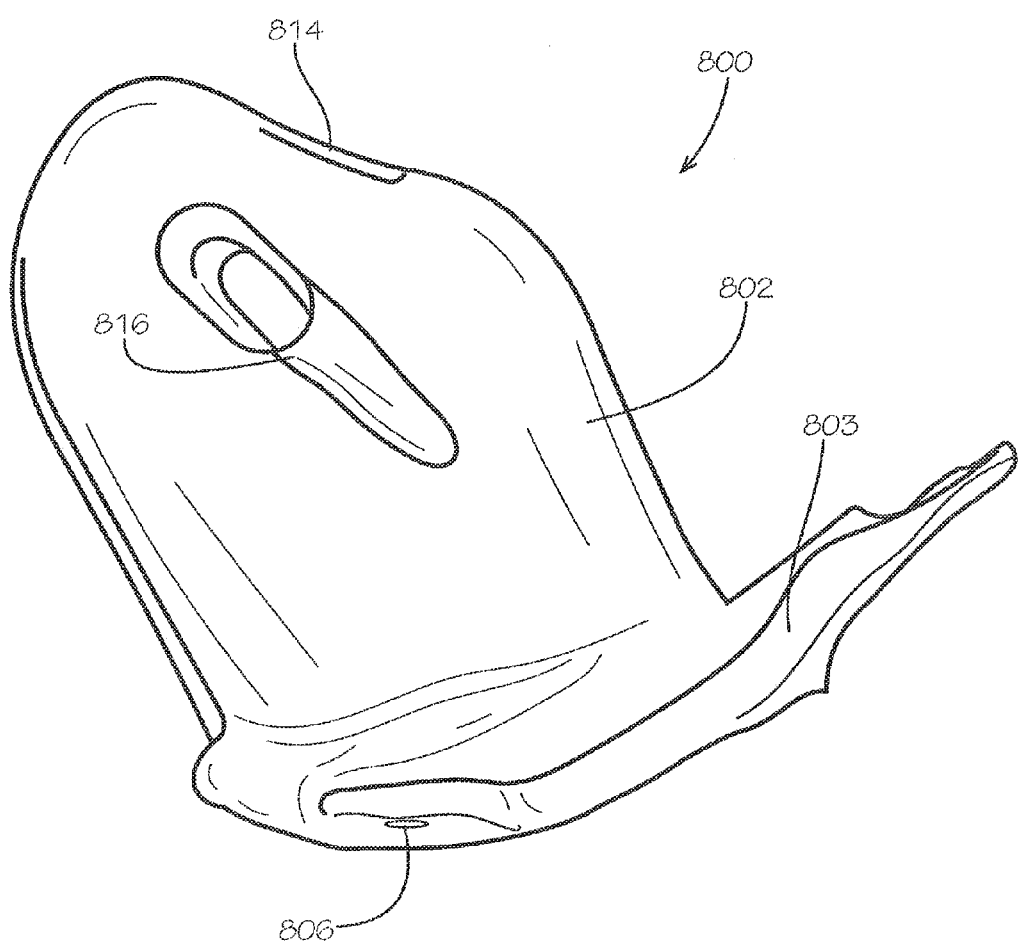
FIG. 34 illustrates aspects of an illustrative vagina module for a pelvic model according to an embodiment.
Figure 35:
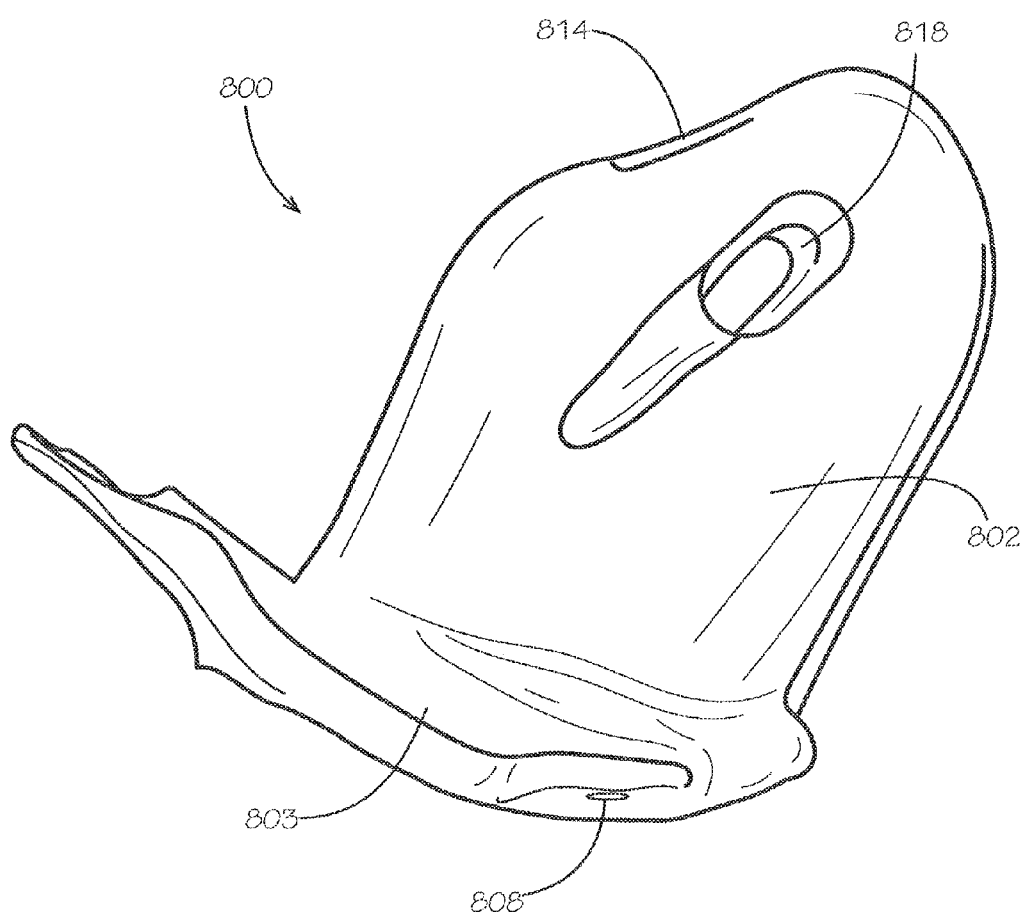
FIG. 35 illustrates aspects of an illustrative vagina module for a pelvic model according to an embodiment.
Figure 36:
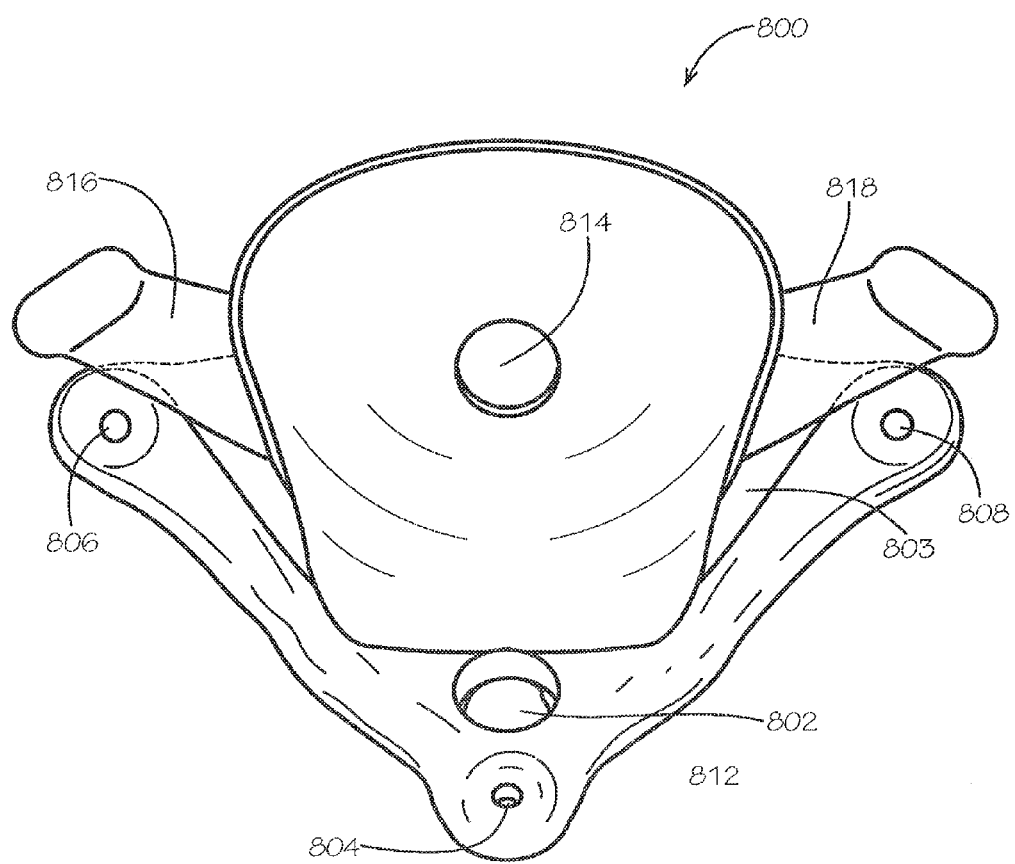
FIG. 36 illustrates aspects of an illustrative vagina module for a pelvic model according to an embodiment.

Vagina module 800 may comprise an endopelvic fascia layer. In one embodiment, endopelvic fascia layer is integrated into vagina module 800 such that a single, integrated component defines the vagina and endopelvic fascia layer. In another embodiment, endopelvic fascia layer can be attached to and detached from vagina module 800. In some embodiments, the endopelvic fascia layer is glued over another portion of the vagina module 800. For example, as shown in FIG. 34, a first portion of the vagina module can be made of a first material 803. In this embodiment, material 803 is used to create the vagina. For example, material 803 can define vaginal opening 810, vaginal wall 820, etc. Material 803 may also define openings 810, 812, and/or 814. In one embodiment, material 803 is used to create a vagina for a vagina module similar to vagina module 800 shown in FIGS. 31-36 but without fittings 816, 818 and a thin layer that is formed using material 802 that is fitted around material 803, glued to material 803, etc. Thus, in one embodiment, material 803 defines a vagina having substantially the same shape as shown in FIGS. 31-36 but without fittings 816, 818. Moreover, in this embodiment, the vagina formed using material 803 would be thinner than shown in FIGS. 31-36 because these Figures also show an endopelvic fascia layer made of material 802 attached to material 803. As shown in FIGS. 31-36, in embodiments, endopelvic fascia layer covers at least part of material 803. For example, an area opposite e.g., on the exterior) the vaginal opening and/or vaginal wall defined by material 803 may be covered by the endopelvic fascia layer. Moreover, as shown in these figures, the endopelvic fascia layer can comprise left fitting 816 and right fitting 818.

In various embodiments, all or part of endopelvic fascia layer is made of material 802. In one embodiment, the endopelvic fascia layer is 1.5 mm thick, at least for a portion of the layer that is attached to the vagina. In other embodiments, the endopelvic fascia layer can be a single thickness or have varying thicknesses between 0.5 mm and 3 mm, preferably between 1 mm and 2 mm. The endopelvic fascia layer can be attached to material 803 in several ways. In one embodiment, the endopelvic fascia layer made using material 802 defines an opening that can slide over at least part of the vagina made using material 803. In this embodiment, the endopelvic fascia layer can define an opening corresponding to cervix opening 814. In some embodiments, the endopelvic fascia layer is glued to the vagina. In other words, in one embodiment, material 802 is directly or indirectly glued to material 803. In one embodiment, at least part of the endopelvic fascia layer is glued to at least part of the vagina. In some embodiments, a filler material, such as silicone, can be used to glue the vagina and fascia together. In one embodiment, a layer of release can be added to allow for separation between the endopelvic fascia layer and the vagina. In some embodiments, the filler material has a durometer of 10 on the Shore 00 scale. In other embodiments, the filler material may have a durometer between 00 and 30 on a Shore 00 scale, preferably between 5 and 20. In embodiments, having the endopelvic fascia layer attached to the vagina can allow a full thickness vaginal wall dissection to be performed on an assembled pelvic model 100.

In some embodiments, material 802 used to make the endopelvic fitting layer and/or material 803 used to make the vagina comprises a medical grade silicone. In one embodiment, material 802 has a durometer of 20 on a Shore 00 scale, in other embodiments, material 802 has a durometer between 10 and 40 on a Shore 00 scale, preferably between 15 and 25. In one embodiment, material 803 has a durometer of 10 on a Shore 00 scale. In other embodiments, material 802 has a durometer between 0 and 30 on a Shore 00 scale, preferably between 5 and 15. In some embodiments, at least part of the vagina module 800 can be reinforced with a mesh. For example, in one embodiment, at least a portion of the vagina is reinforced with a subcutaneous mesh. In some embodiments, the vagina can be cast solid using material 803. In embodiments, endopelvic fascia layer is slip cast. Numerous other embodiments are disclosed herein and variations are within the scope of this disclosure.

Illustrative Vulva Module

Figure 26:
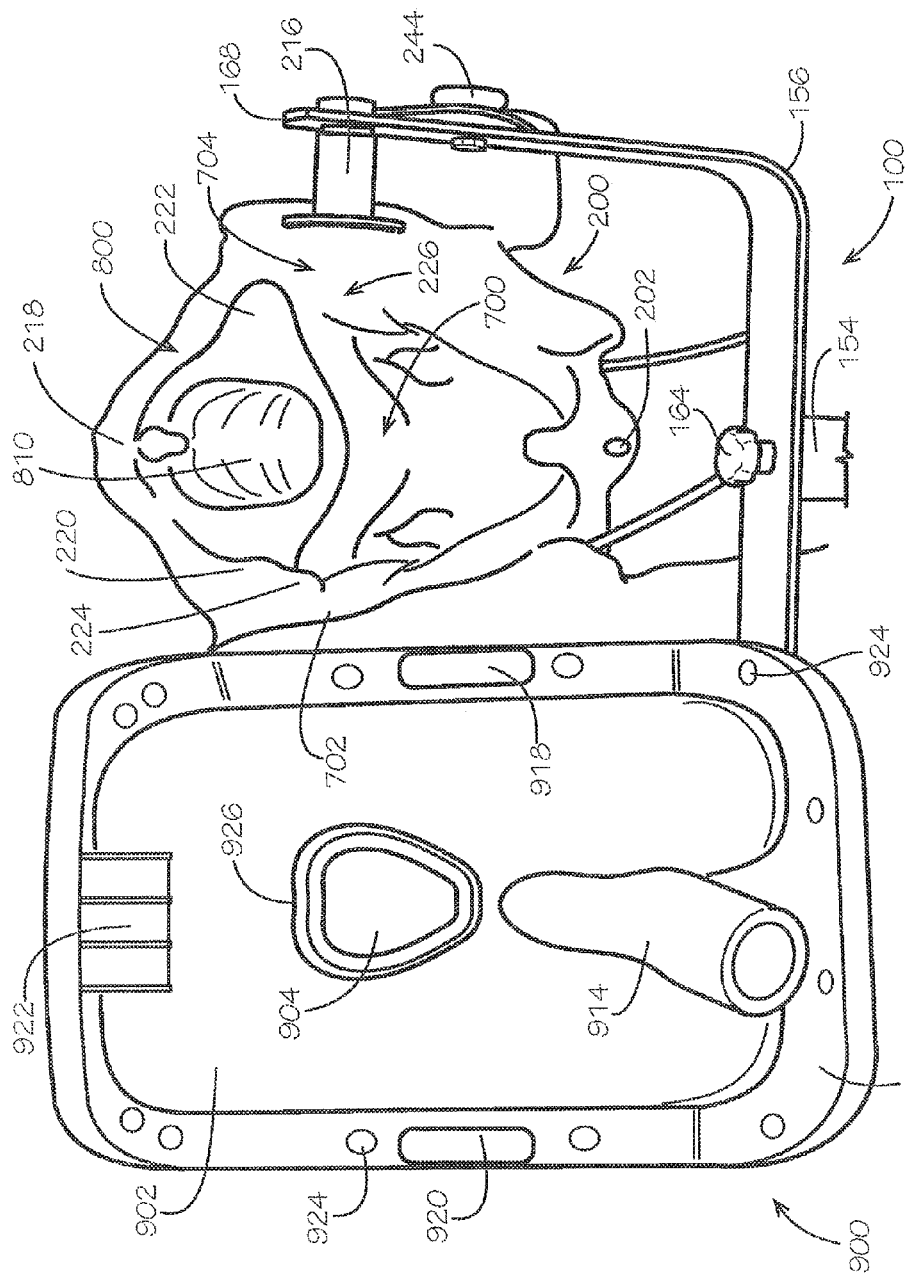
Figure 27:
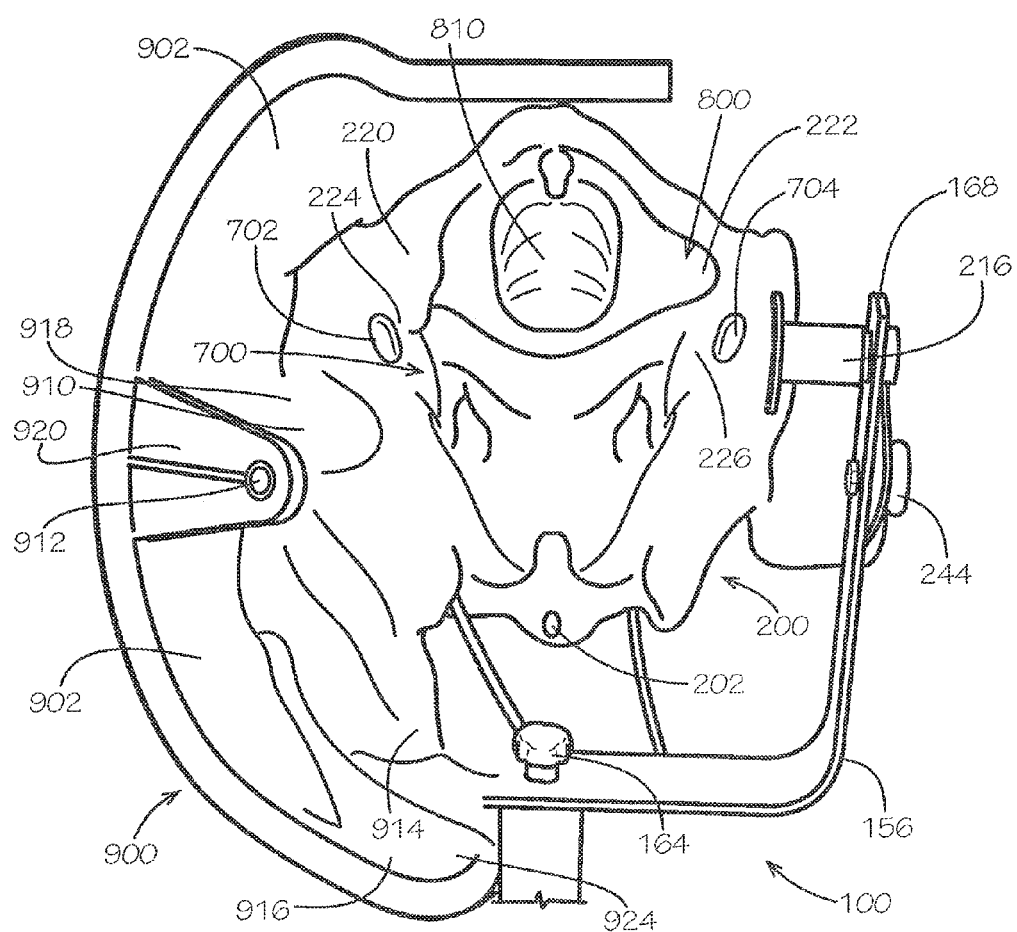
Figure 28:
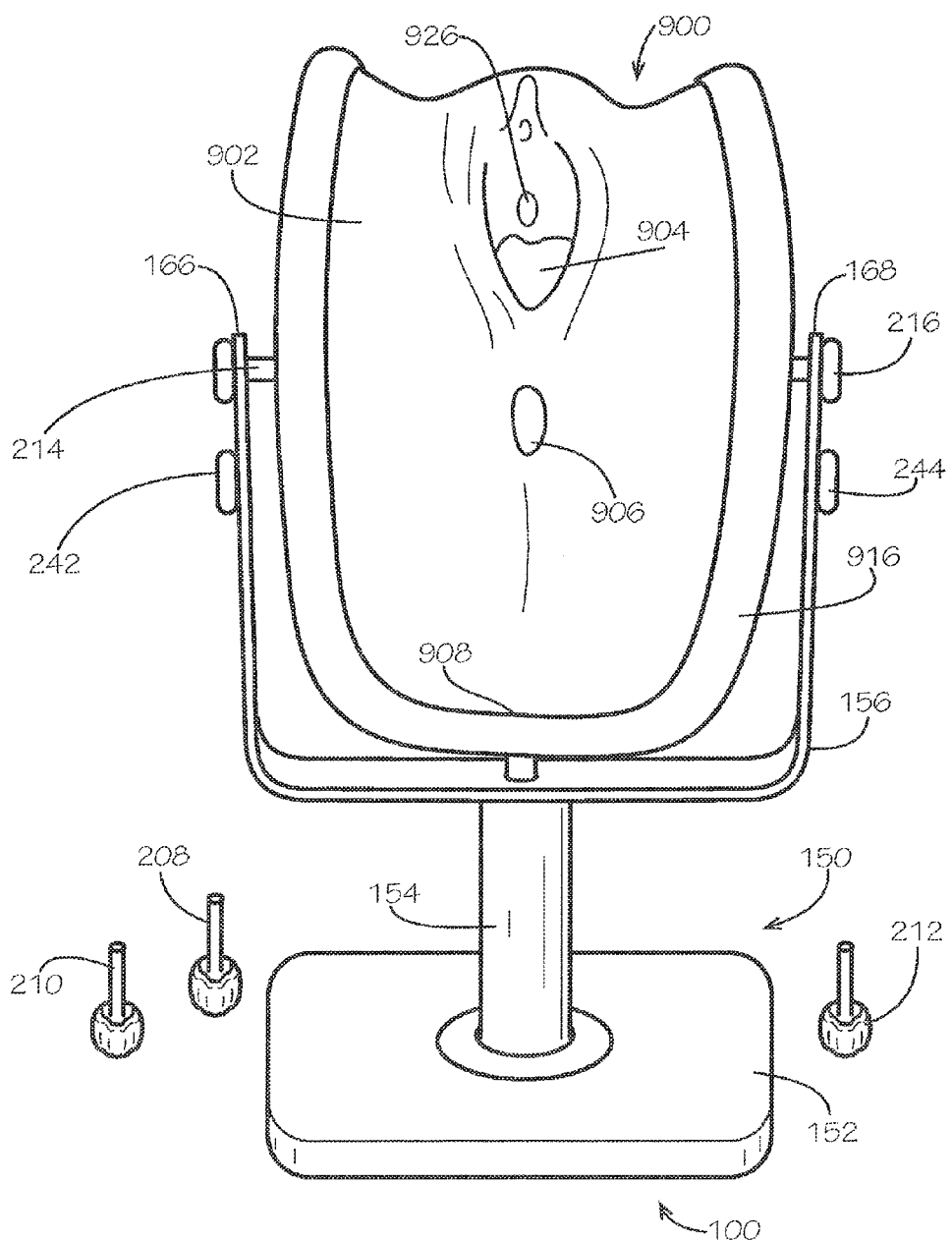

In embodiments, pelvic model 100 comprises a vulva module. For example, as shown in FIG. 26-28, pelvic model 100 comprises vulva module 900. In one embodiment, vulva module 900 can be attached to pelvic bone module 200. For example, as shown in FIGS. 20-28, vulva module 900 may be attached to pelvic bone module 200 using one or more bolts. The vulva module 900 can be made of a material 902 that defines a vulva, a vaginal opening 904, an anus 906, and/or urethra opening 926. In one embodiment, material 902 also defines an opening 908 through which a bolt can be inserted to attach the vulva module 900 to pelvic bone module 200. In other embodiments, material 902 may also define at least part of a stomach. In one embodiment, material 902 is at least 4 mm thick. In other embodiments, material 902 can be between 2 mm and 6 mm thick. In some embodiments, material 902 has varying thicknesses to simulate fatty tissues such as, for example, fatty tissues in the vulva. In some embodiments, material 902 may have a minimum thickness of at least 3 mm and, preferably, a minimum thickness of at least 4 mm. Moreover, in embodiments, material 902 may have a maximum thickness between 4 mm and 15 mm. In one embodiment, rectum 914 can be attached to the anus 906. In another embodiment, rectum 914 is integrated into vulva module 900. In one embodiment, rectum 914 has a thickness of 3 mm. In other embodiments, rectum 914 has a single thickness or a varying thickness between 1 mm and 5 mm.

In some embodiments, vulva module 900 comprises a frame 916. The support frame can have a left support bracket 918 and/or a right support bracket 920. Support bracket 918 and/or support bracket 920 can define an opening through which a bolt can be inserted to attached the vulva module 900 to the pelvic bone module 200. In some embodiments, at least part of the perimeter of material 902 can be inserted between a front and a back portion of frame 916. In this embodiment, one or more bolts 924 can be used to secure material 902 to frame 916.

Material 902 can be any number of suitable materials. In one embodiment, material 902 is a medical grade silicone. In another embodiment, material 902 can be a RTV silicone. In some embodiments material 902 has a durometer between A0 and A30, preferably between A5 and A20. In one embodiment, material 902 has a durometer between A8 and A15. In embodiments, frame 916 can made of any number of suitable materials. In one embodiment, frame 916 is made of plastic. In another embodiment, frame 916 is made of rubber. In some embodiments, frame 916 comprises a material having a Shore hardness of approximately D70 e.g., Shore scale D and durometer of 70). For example, in one embodiment, frame 916 is made using a urethane plastic. In one embodiment, frame 916 is made using Smooth Cast 305. In other embodiments, frame 916 can be made using a material having a Shore hardness of between D40 and D100, preferably between D65 and D100. Numerous other embodiments are disclosed herein and variations are within the scope of this disclosure.

Other Variations

In various embodiments, a pelvic model may have fewer components than those described herein for pelvic model 100. For example, in one embodiment, the stand 150 of pelvic model 100 does not comprise a base 152. As another example, in one embodiment, the pelvic bone module 200 of pelvic model 100 does not comprise a handle 236. In other embodiments, a pelvic model may have additional components than those described herein for pelvic model 100. For example, in one embodiment, pelvic model 100 comprises one or more sensors for detecting a nick, cut, and/or puncture of a module during a surgical procedure being performed on pelvic model 100. As another example, in one embodiment, pelvic model 100 comprises one or more cameras for remotely viewing a surgical procedure being performed on pelvic model 100. In some embodiments, some modules described herein as being detachable may not be detachable, and vice versa. For example, in one embodiment, pelvic bone module 200 is permanently connected with stand 150 such that the pelvic bone module 200 cannot be removed from stand 150. As another example, in some embodiments, left rod 214 and right rod 216 are permanently integrated into pelvic bone module 200 and, in other embodiments, left rod 214 and right rod 2016 are detachable from pelvic bone module 200. In some embodiments, one or more modules of pelvic model 100 can be attached in different ways than those described above. For example, in various embodiments, bolts (such as screws), washers, nuts, slip fittings, pegs, openings (e.g., holes) that fit around pegs, clamps, clips, other fasteners, or a combination thereof may be used to attach a module with another module, such as pelvic bone module. Numerous other embodiments are disclosed herein and variations are within the scope of this disclosure.

Illustrative Surgical Procedures Using an Assembled Model

In various embodiments, an assembled pelvic model supports one or more examinations and/or surgical procedures. For example, an assembled pelvic model may support one or more basic gynecological examinations such as a speculum exam, a cervical visualization, a pap smear, an endometrial biopsy, a bi-manual exam, and/or an intrauterine device (IUD) insertion. As another example, an assembled pelvic model can support one or more surgical procedures such as a total vaginal hysterectomy without bilateral salpingo oophorectomy, a total vaginal hysterectomy with bilateral salpingo oophorectomy, transoburator sling placement using an outside-in approach, transoburator sling placement using an inside-out approach, retropubic sling placement using a top-down approach, retropubic sling placement using a bottom-up approach, a full thickness vaginal wall dissection to the arcus tendonitis fascia pelvis, a bilateral sacrospinous ligament fixation dilation and/or curettage, uterine morcellation, dilation and curettage, a diagnostic hysteroscopy, and/or other pelvic region examinations, surgical procedures, and/or surgical techniques. In some embodiments, an assembled pelvic model supports surgical procedures such as a diagnostic cystoscopy, an operative cystoscopy (for example, e.g., Botox injections, excision of lesions, etc. a cystotomy, a vaginal hysterectomy with abnormal uterine pathology (e.g., fibroids, adenomyosis, etc.), a repair of obstetrical perineal lacerations (e.g., first degree, second degree, third degree, fourth degree, etc.), a vulvar excision procedure (e.g., Bartholin's gland cyst, cancer identification and excision, sexually transmitted disease identification and biopsy), a colonoscopy, a cervical biopsy, and/or other surgical procedures. In embodiments, one or more surgical procedures described in U.S. application Ser. No. 12/904,623 may be performed using a pelvic model of the present invention. Numerous other embodiments are disclosed herein and variations are within the scope of this disclosure.

In embodiments, an assembled pelvic model supports palpation of one or more surgical landmarks. For example, an assembled pelvic model may support palpation of one or more public tubercles, one or more public rami, one or more obturator fossa, an arcus tendinous fascia pelvis, an ischial spine, a sacrospinous ligament, and/or other surgical landmarks needed for particular surgical procedure(s). In embodiments, a pelvic bone module and/or a pelvic model of the present invention may include one or more landmarks described in U.S. application Ser. No. 12/904,623, the entirety of which is hereby incorporated by reference. Numerous other embodiments are disclosed herein and variations are within the scope of this disclosure.

Illustrative Method of Assembling a Model

Figure 20:
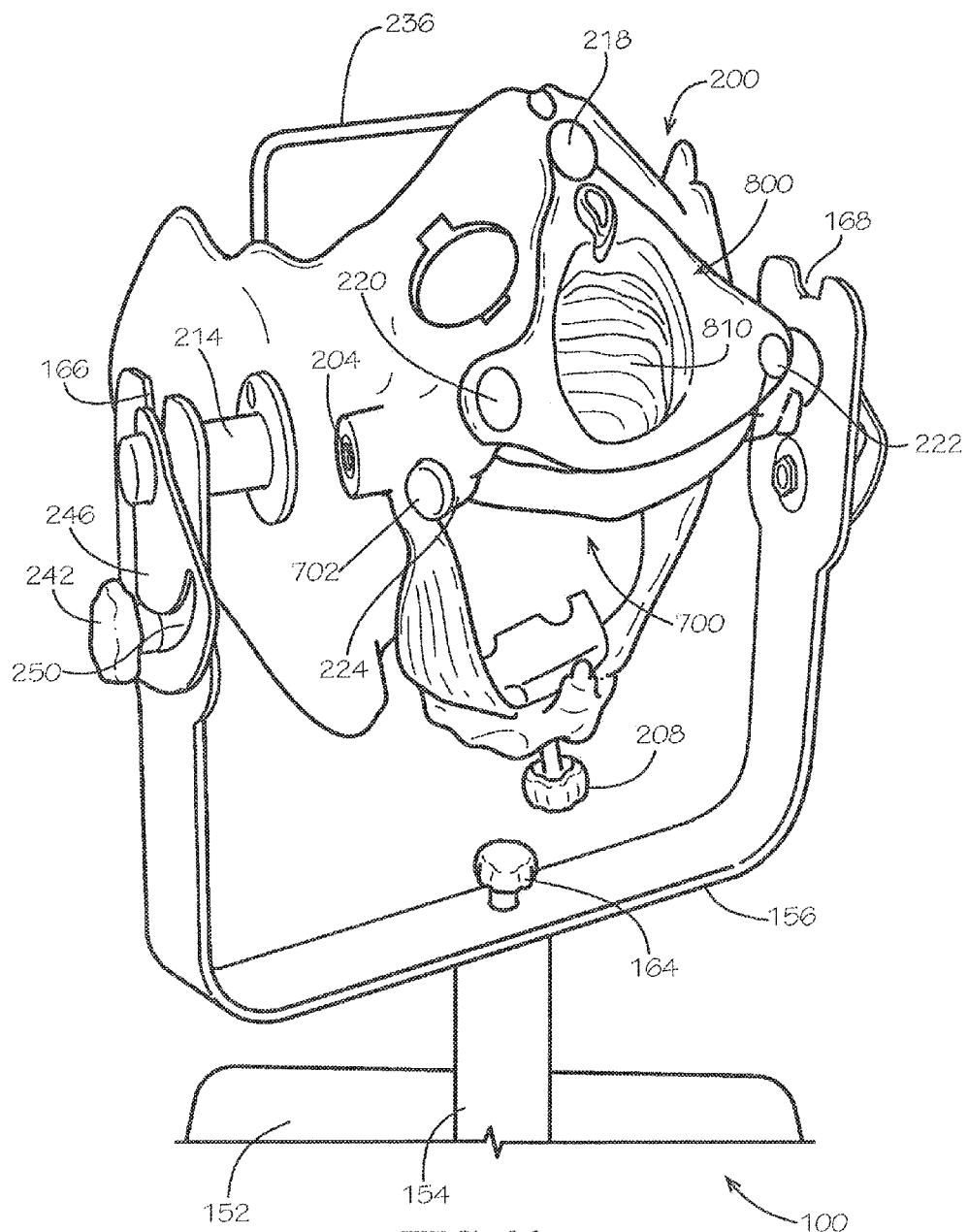
Figure 24:
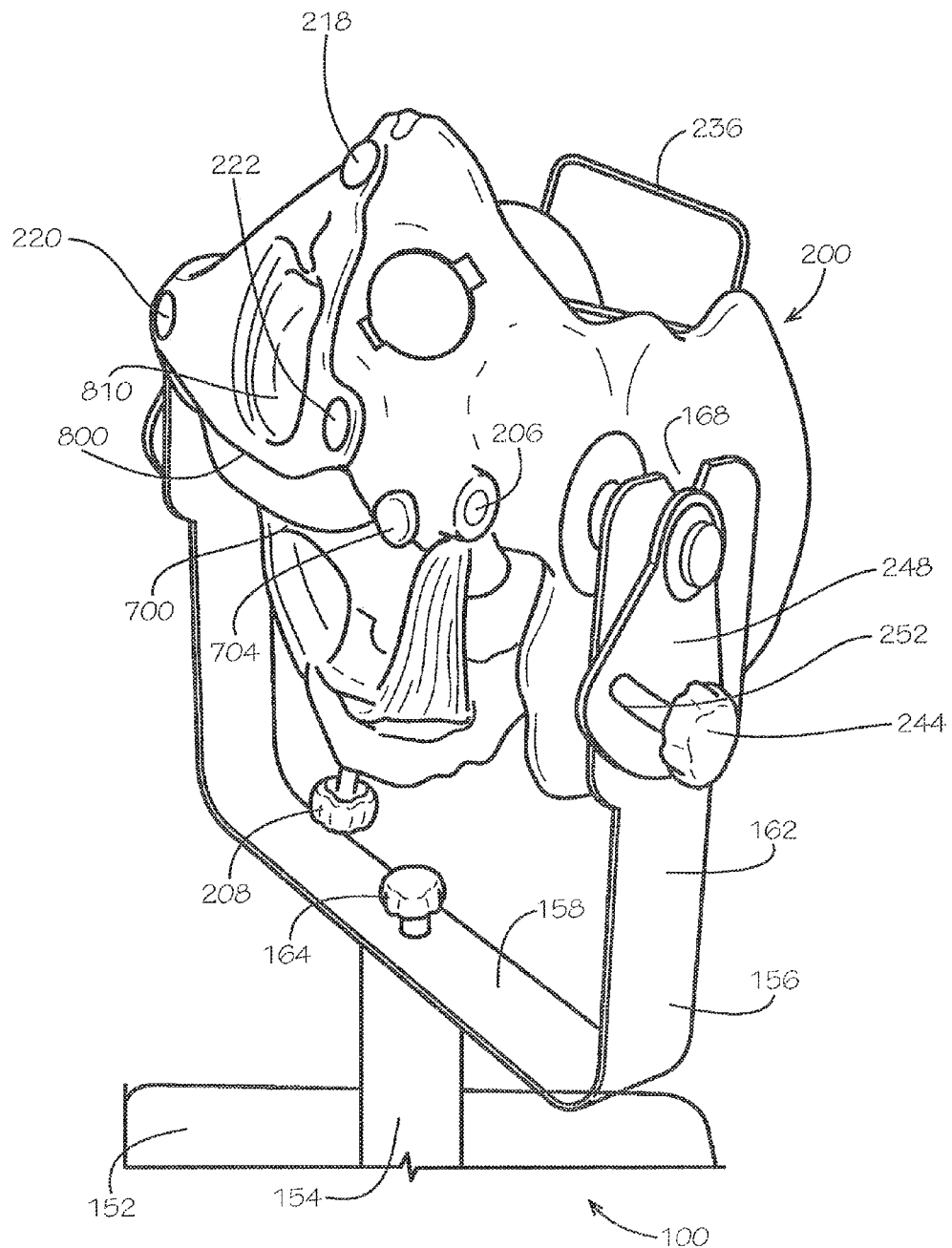
Figure 25:
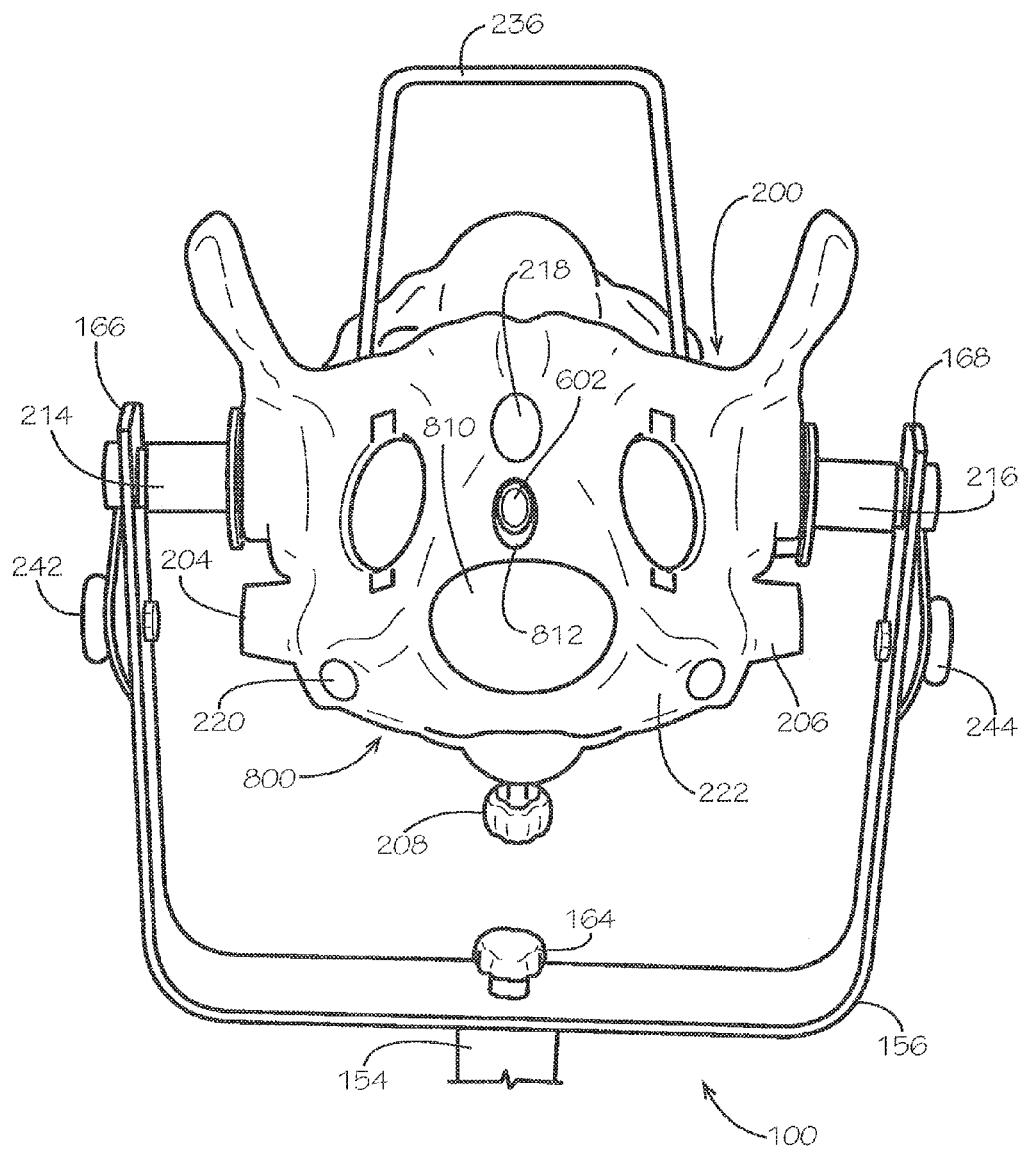
Figure 37:
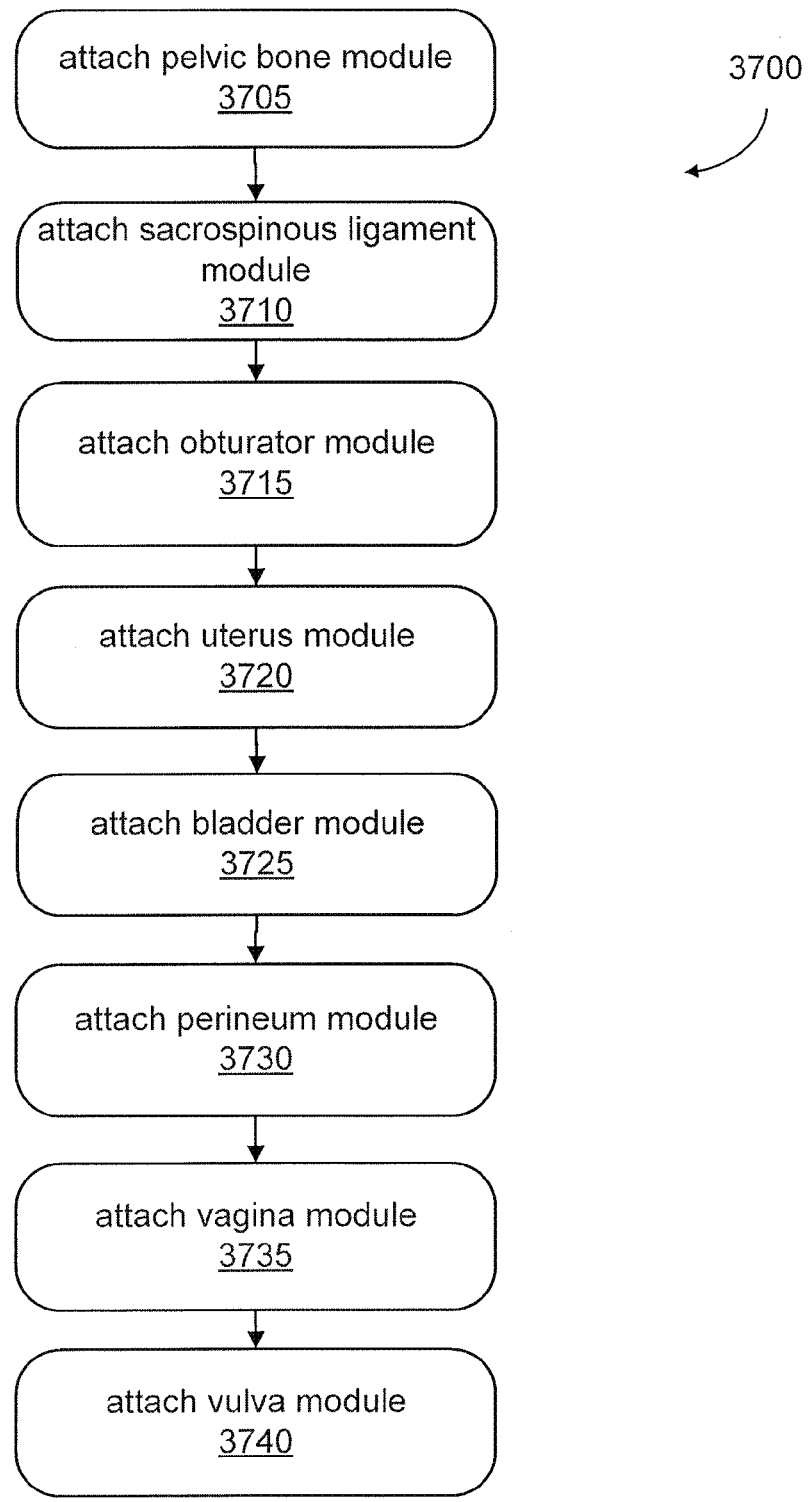
FIG. 37 is a flow chart illustrating a method of assembling model according to an embodiment.

FIG. 37 is a flow chart illustrating a method of assembling a model according to an embodiment. The method 3700 shown in FIG. 37 will be described with respect to pelvic model 100 shown in FIGS. 1-29. The method 3700 begins in block 3705 when a pelvic bone module is attached. For example, in one embodiment, pelvic bone module 200 is attached to stand 150. In one embodiment, as shown in FIG. 19, pelvic bone module 200 is attached to stand 150 by sitting a left rod 214 that is connected to or integrated into bone module 200 into groove 166 on stand 150 and by sitting a right rod 216 that is connected to or integrated into bone module 200 into groove 168 on stand 150. In some embodiments, as shown in FIG. 20, pelvic bone module 200 is attached to stand 150 by inserting bolt 242 through left vertical rotation restraint opening 250 of pelvic bone module 200 and through a corresponding threaded receptacle on left vertical member 160 and tightening bolt 242. In some embodiments, as shown in FIG. 24, pelvic bone module 200 is attached to stand 150 by inserting bolt 244 through right vertical rotation restraint opening 252 of pelvic bone module 200 and through a corresponding threaded receptacle on right vertical member 162 and tightening bolt 244. In other embodiments, pelvic bone module 200 may be attached to stand 150 in any number of other ways, including but not limited to, using one or more screws, nails, staples, bolts, washers, nuts, glues, other fasteners, or a combination thereof. In yet other embodiments, pelvic bone module 200 may be integrated into stand 150. In embodiments, pelvic bone module 200 is integrated into stand 150 such that vertical and/or horizontal rotation of pelvic bone module 200 relative to stand 150 is possible. Numerous other embodiments are disclosed herein and variations are within the scope of this disclosure.

Referring back to method 3700, once the pelvic bone module is attached 3705, then method 3700 proceeds to block 3710. In block 3710, a sacrospinous ligament module is attached. For example, in one embodiment, sacrospinuous ligament module 300 is attached to pelvic bone module 200. In the embodiments shown in FIGS. 3 and 6, sacrospinous ligament module 300 can be attached to the pelvic bone module 200 using a left snap fitting 302 that corresponds with a mating snap fitting on the pelvic bone module 200 and by using a left snap fitting 304 that corresponds with another mating snap fitting on the pelvic bone module. In addition, in the embodiments shown in FIGS. 3, 6, and 4, sacrospinous ligament module 300 can define an opening and bolt 208 can be placed through receptacle 202 of pelvic bone module 200 and through the opening in the sacrospinous ligament module 300 and screwed into a threaded receptacle of support plate 254 connected to or integrated with pelvic bone module 200. In embodiments, when the sacrospinous ligament module 300 has been correctly placed underneath support plate 254, bolt 208 has been tightened, and snap fittings 302 and 304 connected with the pelvic bone module 200, the sacrospinous ligament module 300 is in an anatomically accurate position relative to pelvic bone module 200. In other embodiments, sacrospinous module 300 can be attached to and detached from pelvic bone module 200 by using one or more bolts, threaded receptacles, sliding receptacles, clips, grooves, nuts, openings, pegs, etc. Numerous other embodiments are disclosed herein and variations are within the scope of this disclosure.

Referring back to method 3700, once the sacrospinous ligament module is attached 3710, then method 3700 proceeds to block 3715. In block 3715, an obturator module is attached. For example, in one embodiment, obturator module 400 is attached to pelvic bone module 200. In the embodiments shown in FIGS. 6, and 7, obturator module 400 can be attached to pelvic bone module 200 using left snap fitting 402 and tight snap fitting 404 on the obturator module 400 with a mating left snap fitting receptacle 256 and a mating right snap fitting receptacle 258 on the pelvic bone module 200. Moreover, as shown in FIG. 8, in some embodiments, two obturator modules 400 can be simultaneously attached to pelvic bone module 200. In other embodiments, obturator module 400 can be attached to and detached from pelvic bone module 200 by using one or more bolts, threaded receptacles, sliding receptacles, clips, grooves, nuts, openings, pegs, etc. In embodiments, once one or more obturator modules 400 have been correctly snapped into position in the pelvic bone module 200 (e.g., attaching 402 with 256 and attaching 404 with 258), the one or more obturator modules 400 is in an anatomically accurate position relative to pelvic bone module 200. Numerous other embodiments are disclosed herein and variations are within the scope of this disclosure.

Referring back to method 3700, once the obturator module is attached 3715, then method 3700 proceeds to block 3720. In block 3720, a uterus module is attached. For example, in one embodiment, uterus module 500 is attached to pelvic bone module 200. In the embodiments shown in FIGS. 9 and 10, uterus module 500 can be attached to pelvic bone module 200 using left sliding connection 504 and right sliding connection 506 of the uterus module 500 and mating left sliding receptacle 232 and mating right sliding receptacle 234 of the pelvic bone module 200. In other embodiments, uterus module 500 can be attached to and detached from pelvic bone module 200 by using one or more bolts, threaded receptacles, sliding receptacles, clips, grooves, nuts, openings, pegs, etc. In embodiments, once uterus module 500 has been correctly slid into place in the pelvic bone module 200 (e.g., attaching 504 with 232 and attaching 506 with 234), the uterus module 500 is in an anatomically accurate position relative to pelvic bone module 200. Numerous other embodiments are disclosed herein and variations are within the scope of this disclosure.

Referring back to method 3700, once the uterus module is attached 3720, then method 3700 proceeds to block 3725. In block 3725, a bladder module is attached. For example, in one embodiment, bladder module 600 is attached to pelvic bone module 200. In the embodiments shown in FIGS. 11, 12, and 14, bladder module 600 can be attached to pelvic bone module 200 using top slip attachment 504 and bottom slip attachment 506 on the bladder module 600 and top groove 228 and bottom groove 230 on the pelvic bone module 200. In other embodiments, bladder module 600 can be attached to and detached from pelvic bone module 200 by using one or more bolts, threaded receptacles, sliding receptacles, clips, grooves, nuts, openings, pegs, etc. in embodiments, once bladder module 600 has been correctly attached to the pelvic bone module 200 (e.g., attaching 504 with 228 and attaching 506 with 230), the bladder module 600 is in an anatomically accurate position relative to pelvic bone module 200. Numerous other embodiments are disclosed herein and variations are within the scope of this disclosure.

Referring back to method 3700, once the bladder module is attached 3725, then method 3700 proceeds to block 3730. In block 3730, a perineum module is attached. For example, in one embodiment, perineum module 700 is attached to pelvic bone module 200. In the embodiments shown in FIGS. 15 and 16, perineum module 700 can be attached to pelvic bone module 200 using left slip attachment 702 and right slip attachment 704 on the perineum module 700 and left groove 224 and right groove 228 on the pelvic bone module 200. In other embodiments, perineum module 700 can be attached to and detached from pelvic bone module 200 by using one or more bolts, threaded receptacles, sliding receptacles, clips, grooves, nuts, openings, pegs, etc. In embodiments, once perineum module 700 has been correctly attached to the pelvic bone module 200 (e.g., attaching 702 with 224 and attaching 704 with 226), the perineum module 700 is in an anatomically accurate position relative to pelvic bone module 200. Numerous other embodiments are disclosed herein and variations are within the scope of this disclosure.

Referring back to method 3700, once the perineum module is attached 3730, the method 3700 proceeds to block 3735. In block 3735, a vagina module is attached. For example, in one embodiment, vagina module 800 is attached to pelvic bone module 200. In the embodiments shown in FIGS. 17, 18, and 19, vagina module 800 comprises a vagina material 802 that defines a top opening 804, left opening 806, and right opening 808. In these embodiments, the top opening 804 of the vagina module 800 can be slid over top peg 218 of the pelvic bone module 200, left opening 806 of the vagina module 800 can be slid over left peg 220 of the pelvic bone module 200, and right opening 808 of the vagina module 800 can be slid over right peg 222 of the pelvic bone module 200 to attach the vagina module 800 with the pelvic bone module 200. In other embodiments, vagina module 800 can be attached to and detached from pelvic bone module 200 by using one or more bolts, threaded receptacles, sliding receptacles, clips, grooves, nuts, openings, pegs, etc. In embodiments, once vagina module 800 has been correctly attached to the pelvic bone module 200 (e.g., attaching 804 with 218, attaching 806 with 220, and attaching 808 with 222), the vagina module 800 is in an anatomically accurate position relative to pelvic bone module 200. Numerous other embodiments are disclosed herein and variations are within the scope of this disclosure.

Referring back to method 3700, once the vagina module is attached 3735, the method 3700 proceeds to block 3740. In block 3740, a vulva module is attached. For example, in one embodiment, vulva module 900 is attached to pelvic bone module 200. In the embodiments shown in FIGS. 2, 26, 27, 28, and 29, vulva module 900 comprises a vulva material 902 that defines a bottom attachment opening 908, a left attachment opening 910, and a right attachment opening 912. In these embodiments, bottom bolt 208 can be inserted through bottom attachment opening 902 of the vulva module 900 and inserted into bottom threaded receptacle 202 of the pelvic bone module 200, left bolt 210 can be inserted through left attachment opening 904 of the vulva module 900 and inserted into bottom threaded receptacle 204 of the pelvic bone module 200; and right bolt 212 can be inserted through right attachment opening 906 of the vulva module 900 and inserted into right threaded receptacle 206 of the pelvic bone module 200. In other embodiments, vulva module 900 may be attached to pelvic bone module 200 by using one or more bolts, threaded receptacles, sliding receptacles, clips, grooves, nuts, openings, pegs, etc. In embodiments, once vulva module 900 has been correctly attached to the pelvic bone module 200 (e.g., attaching 202 to 208 through 902, attaching 204 to 210 through 904, and attaching 206 to 212 through 906), the module 900 is in an anatomically accurate position relative to pelvic bone module 200. Numerous other embodiments are disclosed herein and variations are within the scope of this disclosure.

The order of the blocks presented in the examples above for embodiments of the methods disclosed herein can be varied—for example, blocks can be re-ordered, combined, and/or broken into sub-blocks. For example, referring to FIG. 37, in one embodiment, blocks 3710-3740 may be performed and then block 3705 can be performed. In this embodiment, a sacrospinous ligament module, an obturator module, an uterus module, a bladder module, a perineum module, a vagina module, and/or a vulva module can be attached before a pelvic bone module is attached to a stand. As another example, in one embodiment, block 3735 can be performed before block 3730. Thus, while the steps of methods disclosed herein have been shown and described in a particular order, other embodiments may comprise the same, additional, or fewer steps. Some embodiments may perform the steps in a different order or in parallel.

Illustrative Method of Disassembling a Model

Figure 38:
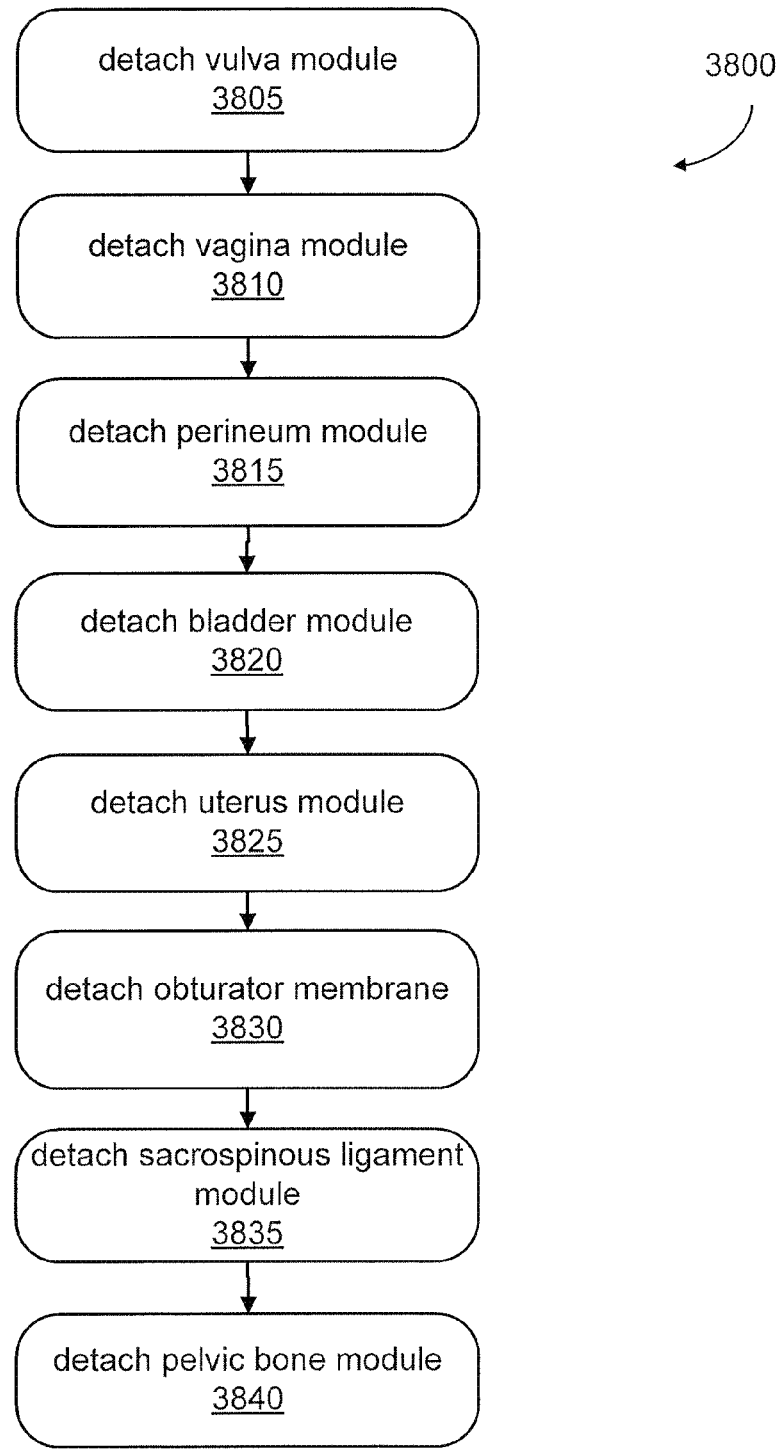
FIG. 38 is a flow chart illustrating a method of disassembling a model according to an embodiment.

FIG. 38 is a flow chart illustrating a method 3800 of disassembling a model according to an embodiment. The method 3800 begins in block 3805 when a vulva module is detached. For example, in one embodiment, vulva module 900 is detached from pelvic bone module 200. In embodiments, referring to FIG. 37, a vulva module may be detached in an opposite way that the vulva module was attached as described herein with respect to block 3740. Numerous other embodiments are described herein and variations are within the scope of this disclosure.

Referring back to method 3800, once the vulva module is detached 3805, the method 3800 proceeds to block 3810. In block 3810, a vagina module is detached. For example, in one embodiment, vagina module 800 is detached from pelvic bone module 200. In embodiments, referring to FIG. 37, a vagina module may be detached in an opposite way that the vagina module was attached as described herein with respect to block 3735. Numerous other embodiments are described herein and variations are within the scope of this disclosure.

Referring back to method 3800, once the vagina module is detached 3810, then method 3800 proceeds to block 3815. In block 3815, a perineum module is detached. For example, in one embodiment, perineum module 700 is detached from pelvic bone module 200. In embodiments, referring to FIG. 37, a perineum module may be detached in an opposite way that the perineum module was attached as described herein with respect to block 3730. Numerous other embodiments are described herein and variations are within the scope of this disclosure.

Referring back to method 3800, once the perineum module is detached 3815, then method 3800 proceeds to block 3820. In block 3820, a bladder module is detached. For example, in one embodiment, bladder module 600 is detached from pelvic bone module 200. In embodiments, referring to FIG. 37, a bladder module may be detached in an opposite way that the bladder module was attached as described herein with respect to block 3725. Numerous other embodiments are described herein and variations are within the scope of this disclosure.

Referring back to method 3800, once the bladder module is detached 3820, then method 3800 proceeds to block 3825. In block 3825, a uterus module is detached. For example, in one embodiment, uterus module 500 is detached from pelvic bone module 200. In embodiments, referring to FIG. 37, a uterus module may be detached in an opposite way that the uterus module was attached as described herein with respect to block 3720. Numerous other embodiments are described herein and variations are within the scope of this disclosure.

Referring back to method 3800, once the uterus module is detached 3825, then method 3800 proceeds to block 3830. In block 3830, an obturator module is detached. For example, in one embodiment, obturator module 400 is detached from pelvic bone module 200. As another example, in one embodiment, a left obturator module and a right obturator module is detached from pelvic bone module 200. In embodiments, referring to FIG. 37, an obturator module may be detached in an opposite way that the obturator module was attached as described herein with respect to block 3715.

Numerous other embodiments are described herein and variations are within the scope of this disclosure.

Referring back to method 3800, once the uterus module is detached 3830, then method 3800 proceeds to block 3835. In block 3835, a sacrospinous ligament module is detached. For example, in one embodiment, sacrospinuous ligament module 300 is detached from pelvic bone module 200. In embodiments, referring to FIG. 37, a sacrospinuous ligament module may be detached in an opposite way that the sacrospinuous ligament module was attached as described herein with respect to block 3710. Numerous other embodiments are described herein and variations are within the scope of this disclosure.

Referring back to method 3800, once the sacrospinous ligament module is detached, then method 3800 proceeds to block 3840. In block 3840, a pelvic bone module is detached. For example, in one embodiment, pelvic bone module 200 is detached from stand 150. In embodiments, referring to FIG. 37, a pelvic bone may be detached in an opposite way that the perineum module was attached as described herein with respect to block 3705. Numerous other embodiments are described herein and variations are within the scope of this disclosure.

The order of the blocks presented in the examples above for embodiments of the methods disclosed herein can be varied—for example, blocks can be re-ordered, combined, and/or broken into sub-blocks. For example, referring to FIG. 38, in one embodiment, block 3840 can be performed and then blocks 3805-3835 may be performed. In this embodiment, a pelvic bone module can be detached from a stand before any of the modules are detached from the pelvic bone module. As another example, referring to FIG. 38, in one embodiment, perineum module 3815 may be detached before vagina module 3810. Thus, while the steps of methods disclosed herein have been shown and described in a particular order, other embodiments may comprise the same, additional, or fewer steps. Some embodiments may perform the steps in a different order or in parallel.

Figure 39:
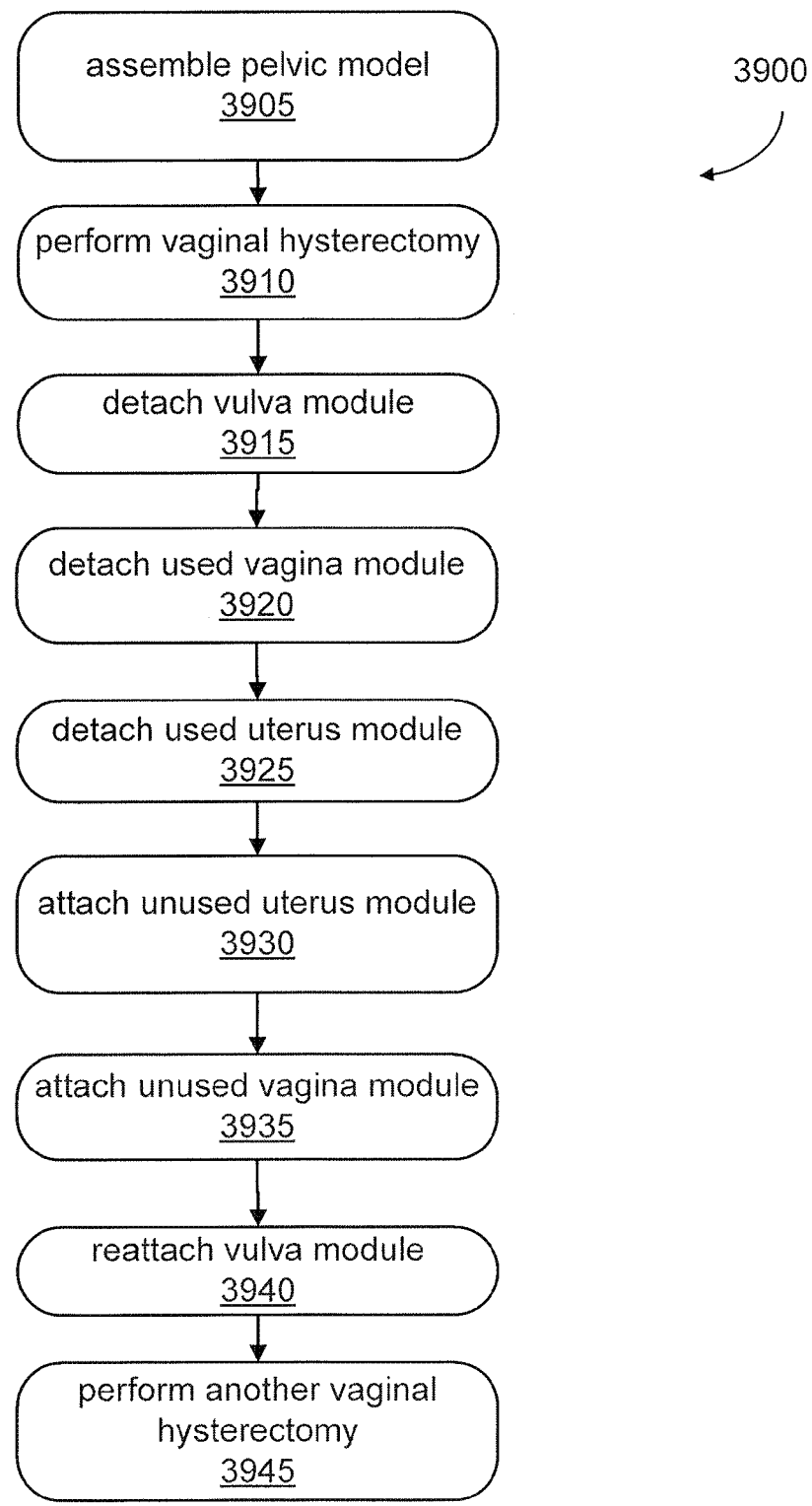
FIG. 39 is a flow chart illustrating a method of performing multiple vaginal hysterectomies on a model according to an embodiment.

Illustrative Method of Reusing a Model to Perform Multiple Vaginal Hysterectomies FIG. 39 is a flow chart illustrating a method of performing multiple vaginal hysterectomies on a model according to an embodiment. The method 3900 shown in FIG. 39 will be described with respect to pelvic model 100.

The method 3900 begins in block 3905 when a model is assembled. For example, in one embodiment, a pelvic model is assembled as shown in FIG. 37 and described herein. In other embodiments, a pelvic model is assembled by attaching a sacrospinous ligament module, an obturator module, an uterus module, a bladder module, a perineum module, a vagina module, and/or a vulva module to a pelvic bone module. In some embodiments, a pelvic model is assembled by attaching a pelvic bone module to a stand. In yet other embodiments, assembling a pelvic model comprises attaching one or more cameras to a stand and/or a pelvic bone structure. In some embodiments, assembling a pelvic model comprises positioning one or more cameras such that a surgical procedure, such as a vaginal hysterectomy, performed on the model can be viewed in a remote location. In this embodiment, physician competency of a surgical procedure, such as a vagina hysterectomy, can be evaluated remotely. In embodiments, once a pelvic model is assembled, a surgical procedure can be performed on the model. For example, in one embodiment, once the pelvic model is assembled, a vaginal hysterectomy can be performed on the model. In embodiments, the pelvic model, when assembled, is configured to provide a realistic operating experience for a surgical procedure, such as a vaginal hysterectomy. In some embodiments, physician competency of a surgical procedure, such as a vaginal hysterectomy, can be evaluated locally and/or remotely using the assembled pelvic model. Numerous other embodiments are disclosed herein and variations are within the scope of this disclosure.

Referring back to method 3900, once the model is assembled 3905, then method 3900 proceeds to block 3910. In block 3910, a surgical procedure is performed on the assembled model. For example, in one embodiment, a vaginal hysterectomy is performed on the assembled model, in one embodiment, a vaginal hysterectomy can be performed on pelvic model 100 in the same or a similar way that a vaginal hysterectomy would be performed on a human. In other embodiments, various types of hysterectomies or other surgical procedures may be performed on the assembled model. In some embodiments, surgical competency of a physician performing a surgical procedure, such as a vagina hysterectomy, on the assembled model can be evaluated, For example, in one embodiment, an evaluator may watch the physician performing the surgical procedure to verify that the procedure is properly performed. In embodiments, one or more modules in a model has one or more sensors integrated sensors) and/or attached sensor(s)) that can alert an evaluator that a physician performing a surgical procedure has incorrectly performed part of a procedure. For example, one or more sensors may be integrated into and/or connected with a bladder module that can detect whether a physician performing a surgical procedure, such as a vaginal hysterectomy, has nicked, cut, and/or perforated the bladder module. In this example, if the bladder module is nicked, cut, and/or perforated an indication may be displayed. In various embodiments, an indication can be a light changing color, a blinking light, a sound, a notification sent to a device (locally and/or remotely) associated with an evaluator, another indication, another notification, or a combination thereof. Numerous other embodiments are disclosed herein and variations are within the scope of this disclosure.

Referring back to method 3900, once the surgical procedure has been performed on the assembled model 3910, the method 3900 proceeds to block 3915. In block 3915, one or more modules of the model are detached. For example, if a vaginal hysterectomy was performed on the assembled model, then a vulva module may be detached from the model. In one embodiment, a vulva module is detached from a pelvic bone module. In some embodiments, the vulva module may be detached from the pelvic bone module by removing one or more bolts attaching the vulva module to the pelvic bone module. In one embodiment, the vulva module is detached from the pelvic bone module by remove three bolts. As another example, referring to FIG. 37, a vulva module may be detached in an opposite way that the vulva module was attached as described herein with respect to block 3740. As yet another example, referring to FIG. 38, a vulva module may be detached in one or more ways described with respect to 3805. In other embodiments, a vulva module may be detached as described herein. Numerous other embodiments are described herein and variations are within the scope of this disclosure.

Referring back to method 3900, once the vulva module has been detached 3915, the method 3900 proceeds to block 3920. In block 3920, a vagina module is detached. For example, in one embodiment, a vagina module is detached from a pelvic bone module. In some embodiments, the vagina module may be detached from the pelvic bone module by slipping one or more parts of the vagina module off of pegs on the pelvic bone module. In one embodiment, the vagina module is detached from the pelvic bone module by slipping three openings on the vagina module off of three pegs on the pelvic bone module that are used to hold the vagina module in place, when attached. In some embodiments, the vagina module is detached from the pelvic bone module by sliding a left portion of the vagina module from a left groove of the pelvic bone module and/or sliding a right portion of the vagina module from a right groove of the pelvic bone module. As another example, referring to FIG. 37, a vagina module may be detached in an opposite way that the vagina module was attached as described herein with respect to block 3735. As yet another example, referring to FIG. 38, a vagina module may be detached in one or more ways described with respect to 3810. In other embodiments, a vagina module may be detached as described herein. Numerous other embodiments are described herein and variations are within the scope of this disclosure.

Referring back to method 3900, once the vagina module is detached 3920, the method 3900 proceeds to block 3925. In block 3925, a uterus module is detached. For example, in one embodiment, a uterus module is detached from a pelvic bone module. In some embodiments, the uterus module may be detached from the pelvic bone module by sliding a left portion of the uterus module from a left sliding receptacle of the pelvic bone module and/or by sliding a right portion of the uterus module from a right sliding receptacle of the pelvic bone module. As another example, referring to FIG. 37, a uterus module may be detached in an opposite way that the uterus module was attached as described herein with respect to block #24. As yet another example, referring to FIG. 38, a uterus module may be detached in one or more ways described with respect to block 3825. In other embodiments, a uterus module may be detached as described herein. Numerous other embodiments are described herein and variations are within the scope of this disclosure.

Referring back to method 3900, once the uterus module is detached 3925, the method 3900 proceeds to block 3930. In block 3930, a uterus module is attached. For example, a new, unused or replacement uterus module may be attached. In one embodiment, a uterus module is attached to a pelvic bone module. In some embodiments, the uterus module may be attached to the pelvic bone module by sliding a left portion of the uterus module into a left sliding receptacle of the pelvic bone module and/or by sliding a right portion of the uterus module into a right sliding receptacle of the pelvic bone module. As another example, referring to FIG. 37, a uterus module may be attached in one or more ways described herein with respect to block 3720. As yet another example, referring to FIG. 38, a uterus module may be attached in an opposite way that the uterus module is detached with respect to block 3825. In other embodiments, a uterus module may be attached in any number of ways described herein. Numerous other embodiments are described herein and variations are within the scope of this disclosure.

Referring back to method 3900, once a uterus module has been attached 3930, the method 3900 proceeds to block 3935. In block 3935, a vagina module is attached. For example, a new, unused or replacement vagina module may be attached. In one embodiment, a vagina module is attached to a pelvic bone module. In some embodiments, the vagina module may be attached to the pelvic bone module by sliding one or more openings in the vagina module over one or more pegs on the pelvic bone module. In one embodiment, the vagina module is attached to the pelvic bone module by slipping three openings on the vagina module over three pegs on the pelvic bone module that are used to hold the vagina module in place, when attached. In some embodiments, the vagina module is attached to the pelvic bone module by sliding a right portion of the vagina module into a left groove of the pelvic bone module and/or sliding a right portion of the vagina module into a right groove of the pelvic bone module. As another example, referring to FIG. 37, a vagina module may be attached in one or more ways described herein with respect to block 3735. As yet another example, referring to FIG. 38, a vagina module may be attached in an opposite way that the vagina module is detached with respect to block 3810. In other embodiments, a vagina module may be attached in any number of ways described herein. Numerous other embodiments are described herein and variations are within the scope of this disclosure.

Referring back to method 3900, once a vagina module has been attached 3935, the method 3900 proceeds to block 3940, in block 3940, a vulva module is attached. For example, a vulva module initially used when assembling pelvic model in block 3905 may be reattached. As another example, a new, unused or replacement vulva module may be attached. In one embodiment, a vulva module is attached to a pelvic bone module. In some embodiments, the vulva module may be attached to the pelvic bone module by inserting and tightening one or more threaded bolts that attach the vulva module to the pelvic bone module. In one embodiment, the vulva module is attached to the pelvic bone module by inserting three bolts. As another example, referring to FIG. 37, a vulva module may be attached in one or more ways described herein with respect to block 3740. As yet another example, referring to FIG. 38, a vulva module may be attached in an opposite way that the vagina module is detached with respect to block 3805. In other embodiments, a vulva module may be attached in any number of ways described herein. Numerous other embodiments are described herein and variations are within the scope of this disclosure.

Referring back to method 3900, once a vulva module has been attached 3940, then method 3900 proceeds to block 3945. In block 3945, another surgical procedure is performed. For example, in one embodiment where a vaginal hysterectomy was performed in block 3910, another vaginal hysterectomy may be performed in block 3945 using the reassembled model. In some embodiments, a same surgical procedure may be performed in blocks 3910 and 3945. In other embodiments, a different surgical procedure may be performed on the model in block 3910 than is performed on the reassembled model in block 3945. In one embodiment where a vaginal hysterectomy was correctly performed in block 3910, another vaginal hysterectomy and/or another surgical procedure may be performed in block 3945 by replacing only the uterus module and the vagina module used in the vaginal hysterectomy in block 3910 with a new uterus module and vagina module. In other embodiments, where a vaginal hysterectomy was incorrectly performed in block 3910, one or more additional modules may need to be replaced in order to perform another vaginal hysterectomy and/or another surgical procedure in block 3945. For example, in one embodiment, if a bladder module was punctured during a vaginal hysterectomy performed in block 3910, then the bladder module, vagina module, and uterus module require replacement before another vaginal hysterectomy can be performed. Numerous other embodiments are described herein and variations are within the scope of this disclosure.

Figure 40:
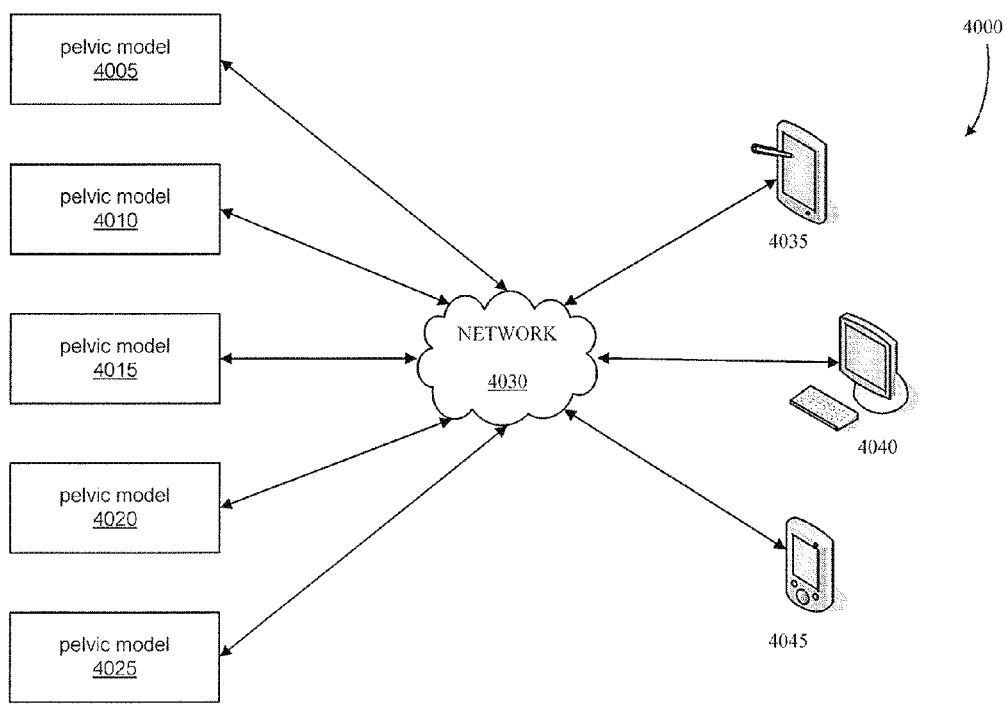
FIG. 40 illustrates aspects of an illustrative system for remotely evaluating physician competency of a surgical procedure using a pelvic model according to an embodiment.

Illustrative Systems and Methods for Remotely Evaluating Competency for a Surgical Procedure Using a Model Referring now to FIG. 40, this figure illustrates an example system diagram depicting illustrative pelvic models and electronic devices in an illustrative environment according to an embodiment. The system 4000 shown in FIG. 40 includes pelvic models 4005-4025, electronic devices 4035-4045, and network 4030. In the embodiment shown in FIG. 40, each of the pelvic models 4005-1350 and electronic devices is connected to network 4030. In this embodiment, each of the pelvic models 4005-4025 is in communication with one or more of the electronic devices 4035-4045 through 4030. Thus, each of the pelvic models 4005-4025 can send information to tablet 4035, desktop computer 4040, and/or smartphone 4045 using network 4030. For example, in one embodiment, pelvic model 4005 comprises a module with one or more sensors that can detect if the module is nicked, cut, and/or punctured. In this embodiment, if the module in pelvic model 4005 is nicked, cut, and/or punctured, then pelvic module 4005 sends a notification to one or more of electronic devices 4035-4045 to provide an alert that the module has been nicked, cut, and/or punctured. In some embodiments, one or more cameras are attached to one or more pelvic models 4005-4025. In various embodiments, one or more pelvic models 4005-4025 can be a pelvic model 100 as described herein and/or shown in one or more of FIGS. 1-36. For example, in one embodiment, pelvic models 4005-4025 are one or more variations of pelvic model 100 shown in one or more of FIGS. 1-36 and/or described herein. A pelvic model, such as pelvic model 100, may be particularly well suited for such an embodiment. For example, in embodiments of various pelvic model 100, certain modules can easily be replaced to evaluate any number of different surgical procedures. Pelvic model 100 may also be used to evaluate the same surgical procedure multiple times, with the same environment by replacing one or more components with new component(s) that are the same and/or in different environments by replacing one or more components with new component(s) that simulate a different condition, such as a prolapse. Pelvic model 100 can also be well-suited for this environment because, in certain embodiments, pelvic model 100 has an open design that can easily allow a camera to be attached to a stand and/or one or more modules in the model 100. In some embodiments, one or more cameras may more clearly display and/or record a surgical procedure being performed on model 100 because the open design. As another example, pelvic model 100 can be well-suited for some embodiments of system 4000 disclosed herein because the base 152 of stand 150 can house various components, such as a network interface, processor, notification device, user input device, and/or display, etc. Numerous other embodiments are disclosed herein and variations are within the scope of this disclosure.

In an embodiment, network 4030 shown in FIG. 40 facilitates communications between one or more electronic devices 4035-4045 and one or more pelvic models 4005-4025. Network 4030 may be any suitable number or type of networks or links, including, but not limited to, a dial-in network, a local area network (LAN), wide area network (WAN), public switched telephone network (PSTN), a cellular network, a WiFi network, a Bluetooth network, a peer-to-peer network, the Internet, an intranet or any combination of hard-wired and/or wireless communication links. In one embodiment, network 4030 is a single network. In other embodiments, network 4030 may comprise two or more networks. For example, electronic devices 4035-4045 may be connected to a first network and pelvic models 4005-4025 may be connected to a second network and the first and the second network may be connected by a third network. As another example, pelvic model 4005 may be in a first location and connected to a first network, pelvic model 4010 may be in a second location different than the first location and connected to a second network, and pelvic model 4015 may be in a third location different than the first and second locations and connected to a third network. In this example, the first, second, and/or third networks may be connected to the Internet. In addition, in this example, desktop computer 4040 may be in a location remote from the pelvic models 4005-4015 and connected to the Internet. In this way, in embodiments, a remote evaluator using desktop computer 4040 can receive notifications from pelvic models 4005-4015 via the Internet and/or other networks. For example, if a vaginal hysterectomy is being performed on pelvic model 4005 and a bladder module of the pelvic model 4005 is punctured during the vaginal hysterectomy, then pelvic model 4005 may send notification(s) to tablet 4035, desktop computer 4040, and/or smartphone 4045 to alert a local evaluator and/or a remote evaluator that the bladder module has been punctured. In embodiments, a same surgical procedure is performed on the pelvic models at the same time. In other embodiments, one or more different surgical procedures may be performed on various pelvic models at the same time. For example, in one embodiment, a first surgical procedure may be performed on pelvic model 4005, a second surgical procedure different than the first surgical procedure may be performed on pelvic model 4010, a third surgical procedure different than the first and second surgical procedures may be performed on pelvic model 4015 at the same time. Numerous other embodiments are disclosed herein and variations are within the scope of disclosure.

In embodiments, an electronic device (such as tablet 4035, desktop computer 4040, and/or smartphone 4045) comprises a housing, a processor, a memory, a display, and a network interface. In one embodiment, the processor is in communication with the memory and, in this embodiment, both the processor and the memory are disposed within the housing. In embodiments, the display is a touch-sensitive display, which comprises or is in communication with a touch-sensitive surface, and is at least partially disposed within the housing such that at least a portion of the touch-sensitive display is exposed to a user of the electronic device. In some embodiment, the display may not be touch-sensitive and/or may not be disposed within the housing. For example, an electronic device may be connected to or otherwise in communication with a display 230 disposed within a separate housing.

In embodiments, a touch-sensitive display of an electronic device is in communication with the processor and is configured to provide signals to the processor or the memory, or both. The memory stores program code or data, or both, for use by the processor and the processor executes program code stored in memory and receives signals from the touch-sensitive display. The processor may output signals to cause the display to output images. In one embodiment, the processor is in communication with the network interface and is configured to receive signals form the network interface and/or to output signals to the network interface to communicate with other components or devices. For example, referring to FIG. 40, electronic devices 4035-4045 may receive notifications from one or more pelvic models 4005-4025 through network 4030 via network interfaces in the electronic devices 4035-4045. As another example, referring to FIG. 40, electronic devices 4035-4045 may receive one or more video feeds from one or more pelvic models 4005-4025 through network 4030 via network interfaces in the electronic devices 4035-4045.

In one embodiment, an electronic device further comprises a speaker and the processor is in communication with the speaker. In this embodiment, the processor can be configured to output signals to cause the speaker to output various sounds. In embodiments, an electronic device may comprise or be in communication with fewer or additional components or devices. For example, other user input devices such as a mouse or a keyboard, or both, may be comprised within the electronic device or be in communication with the electronic device.

In one embodiment, an electronic device (such as tablet 4035, desktop computer 4040, and/or smartphone 4045) can be any device that is capable of receiving notifications and/or video feeds from one or more models. In another embodiment, an electronic device is capable of receiving user input. For example, in embodiments, an electronic device comprises a touch-sensitive display that comprises a touch-sensitive surface. In some embodiments, a touch-sensitive surface may be overlaid on the touch-sensitive display. In other embodiments, an electronic device may comprise or be in communication with a display and a separate touch-sensitive surface. In still other embodiments, an electronic device may comprise or be in communication with a display and may comprise or be in communication with other user input devices, such as a mouse, a keyboard, buttons, knobs, slider controls, switches, wheels, rollers, other manipulanda, or a combination thereof, that allow user input.

In some embodiments, one or more touch-sensitive surfaces may be included on or disposed within one or more sides of an electronic device. For example, in one embodiment, a touch-sensitive surface is disposed within or comprises a rear surface of an electronic device. In another embodiment, a first touch-sensitive surface is disposed within or comprises a rear surface of an electronic device and a second touch-sensitive surface is disposed within or comprises a side surface of the electronic device. In some embodiments where an electronic device comprises at least one touch-sensitive surface on one or more sides of the electronic device or in embodiments where the electronic device is in communication with an external touch-sensitive surface, a display may or may not comprise a touch-sensitive surface. In some embodiments, one or more touch-sensitive surfaces may have a flexible touch-sensitive surface. In other embodiments, one or more touch-sensitive surfaces may be rigid. In various embodiments, an electronic device may comprise both flexible and rigid touch-sensitive surfaces.

In various embodiments, an electronic device may comprise or be in communication with fewer or additional components than described herein. For example, e embodiment, an electronic device is not in communication with a speaker. In another embodiment, an electronic device does not comprise a touch-sensitive display, but comprises a touch-sensitive surface and is in communication with an external display. In various embodiments, an electronic device may comprise or be in communication with any number of components, such as in the various embodiments disclosed herein as well as variations that would be apparent to one of skill in the art.

A housing of an electronic device can provide protection for at least some of the components electronic device. For example, a housing of an electronic device may be a plastic casing that protects a processor and memory from foreign articles such as rain. In some embodiments, a housing protects the components in the housing from damage if an electronic device is dropped by a user. A housing can be made of any suitable material including but not limited to plastics, rubbers, or metals. Various embodiments may comprise different types of housings or a plurality of housings. For example, in some embodiments, an electronic device may be a smartphone, personal digital assistant (PDA), laptop, tablet, desktop computer, medical instrument, etc.

In embodiments, a network interface of an electronic device is in communication with a processor and provides wired or wireless communications from the electronic device to other components or other devices such as one or more pelvic models. For example, in one embodiment, an electronic device can communicate with a pelvic model to receive one or more video feeds and/or notifications from the pelvic model. In other embodiments, a network interface of an electronic device allows another device, such as one or more pelvic models, to push information to the electronic device. For example, in one embodiment, a pelvic model can push notifications to an electronic device without the electronic device requesting notifications from the pelvic model.

A network interface may provide wireless communications between an electronic device and a pelvic model. A network interface can be any component or collection of components that enables an electronic device to communicate with another component or device. For example, a network interface may comprise a PCI network adapter, a USB network adapter, an Ethernet adapter. In embodiments, a network interface may communicate using wireless Ethernet (such as 802.11a, g, b, and/or n, etc.) standards. In various embodiments, a network interface can communicate using Bluetooth, CDMA, TDMA, FDMA, GSM, WiFi, or other cellular or wireless technology. In other embodiments, a network interface may communicate through a wired connection and may be in communication with one or more networks, such as Ethernet, token ring, USB, FireWire 1394, fiber optic, etc.

In embodiments, one or more electronic devices communicate with a network and request information from one or more pelvic models. In other embodiments, one or more electronic devices receive push notifications from one or more pelvic models via network 4030. For example, in FIG. 40, one electronic device 4035 is a tablet. The tablet 4035 includes a touch-sensitive display and is able to communicate with the network 4030 by using a wireless network interface card. Another device that may be an electronic device 4040 shown in FIG. 40 is a desktop computer. The desktop computer 4040 is in communication with a display and is able to connect to the network 4040 through a wired network connection. The desktop computer 4040 may be in communication with any number of input devices such as a keyboard or a mouse. In FIG. 40, a smartphone is an electronic device 4045. The smartphone 4045 may be able to communicate with the network 4030 over a wireless communications means using Bluetooth, CDMA, TDMA, FDMA, GSM, Wifi, or other cellular or wireless technology. Numerous other embodiments are disclosed herein and variations are within the scope of this disclosure.

In embodiments, a pelvic model (such as one or more pelvic models 4005-4025 and/or pelvic model 100) comprises a housing, a sensor, a memory, a processor, and a network interface. In one embodiment, the processor is in communication with the memory and, in this embodiment, both the processor and the memory are disposed within the housing. In one embodiment, the housing is base 152 of stand 150 of pelvic model 100. In some embodiments, a pelvic model comprises a display and/or a notification device. For example, a pelvic model can comprise a non-touch sensitive display, a touch-sensitive display, a speaker, a light, another notification device, or a combination therefore. In some embodiments, the display and/or the notification device are disposed at least partially within base 152 of stand 150 of pelvic model 100. In embodiments, a pelvic model comprises one or more cameras. For example, pelvic model 100 can comprise one or more cameras.

Figure 29:
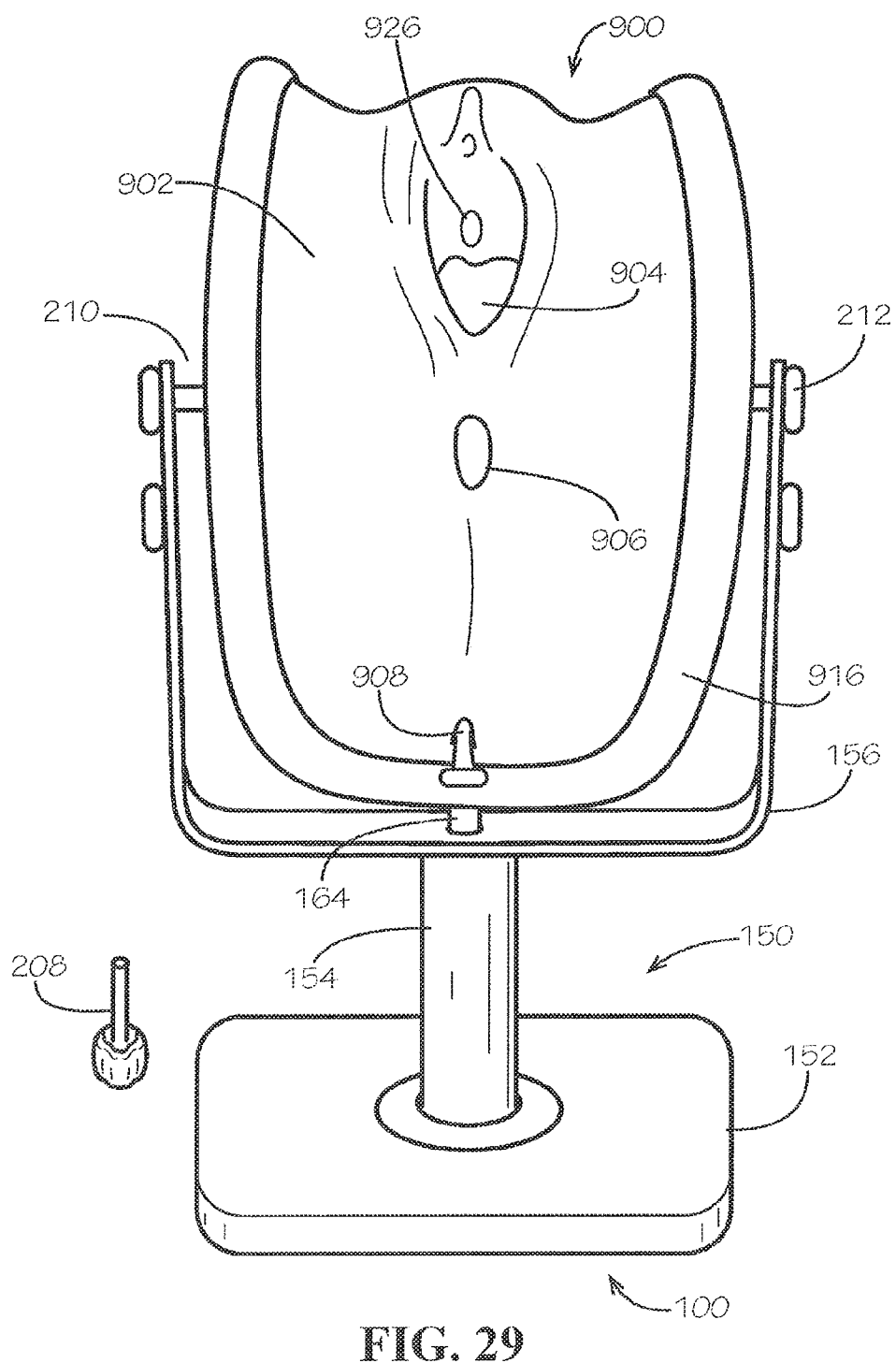
Figure 30:
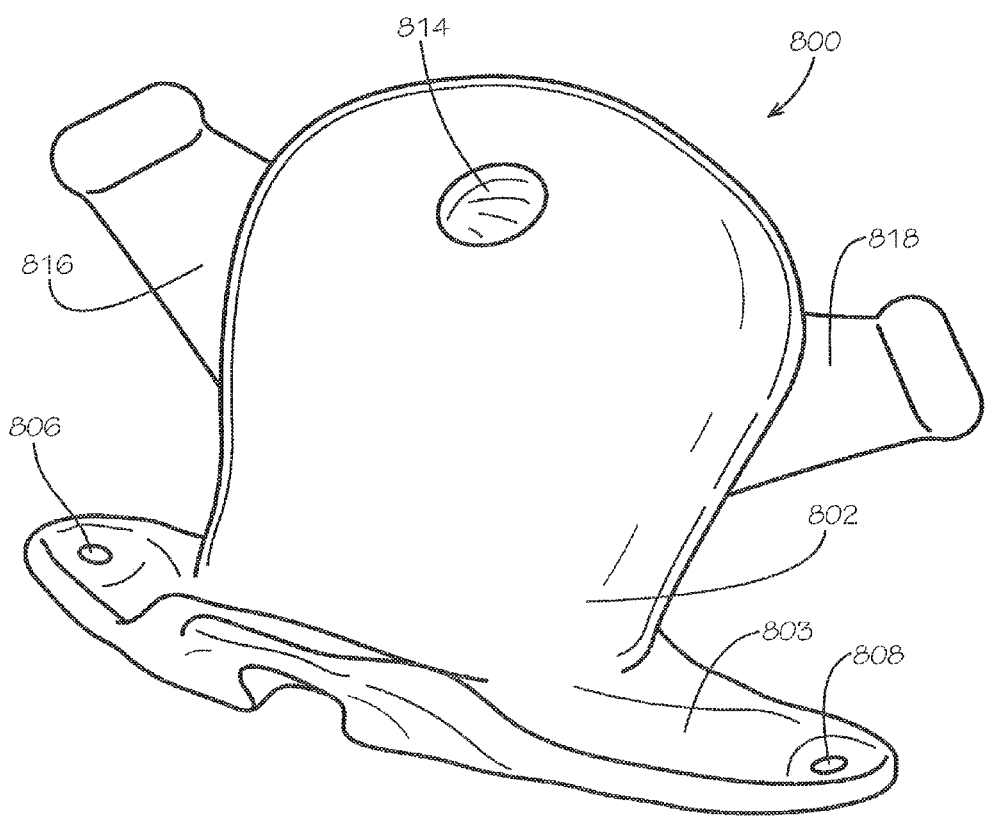
FIG. 30 illustrates aspects of an illustrative vagina module for a pelvic model according to an embodiment.
Figure 31:
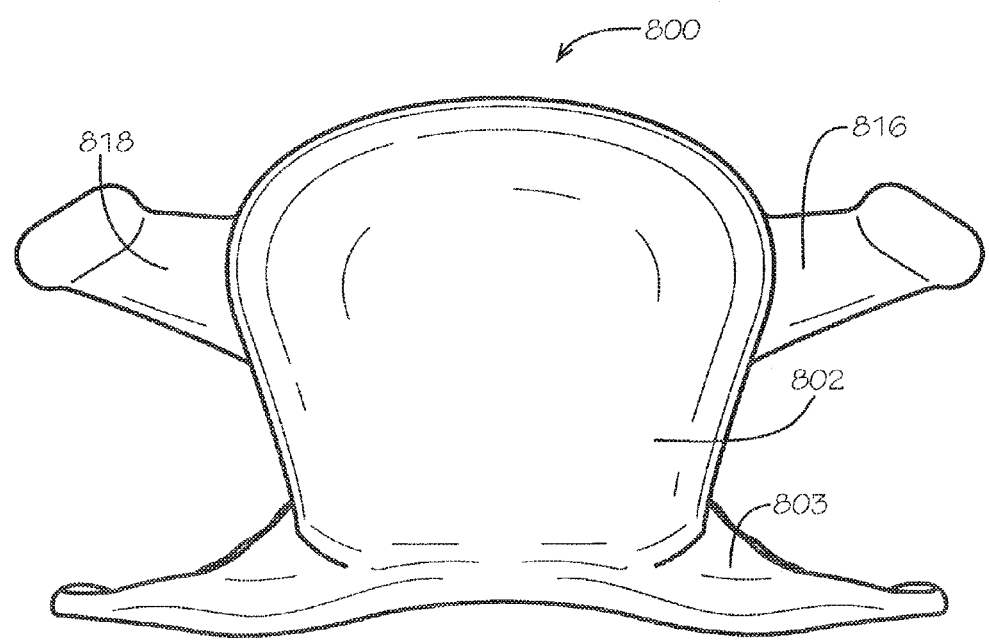
FIG. 31 illustrates aspects of an illustrative vagina module for a pelvic model according to an embodiment.
Figure 32:
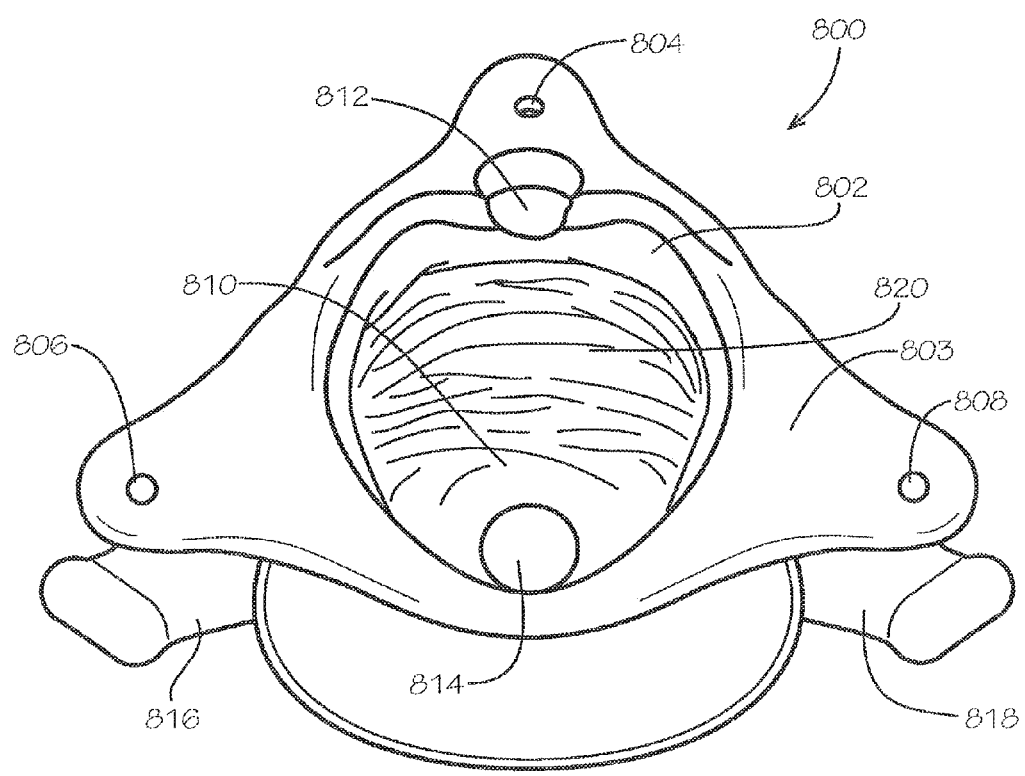
FIG. 32 illustrates aspects of an illustrative vagina module for a pelvic model according to an embodiment.
Figure 33:
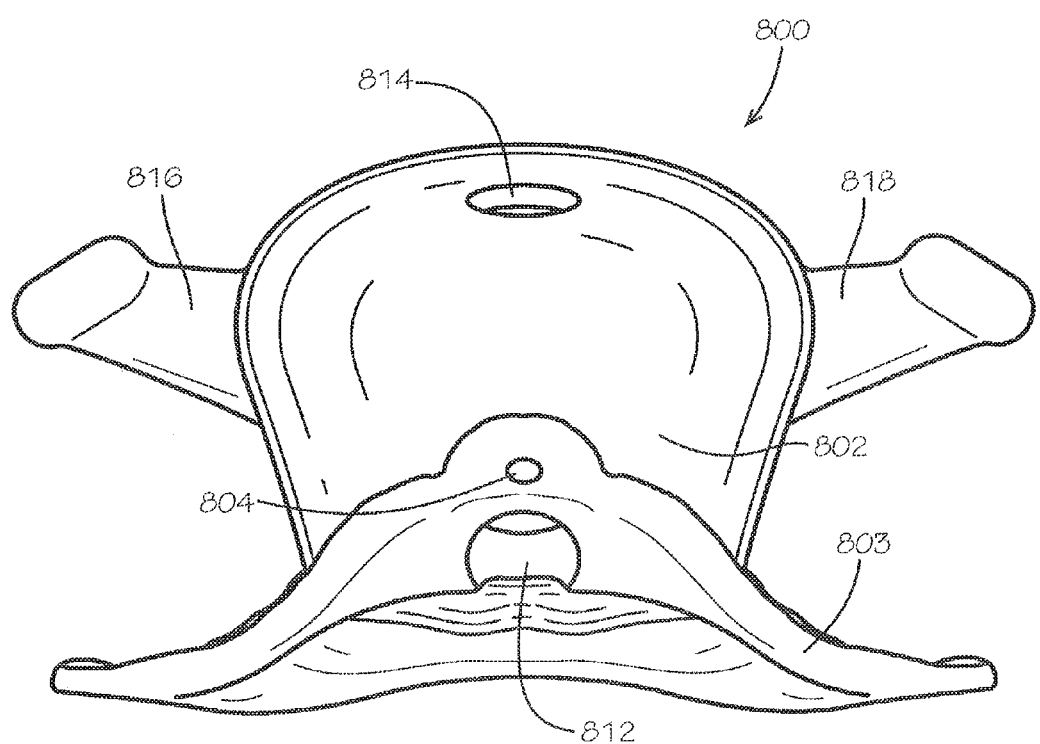
FIG. 33 illustrates aspects of an illustrative vagina module for a pelvic model according to an embodiment.

In some embodiments, a camera is connected to or integrated into a stand and/or one or more modules of a pelvic model. For example, in one embodiment, a camera is attached to crossbar 156 of pelvic model 100. In one embodiment, a camera is attached to left vertical member 160 of crossbar 156 and/or right vertical member 162 of crossbar 156 of pelvic model 100. In this embodiment, the camera(s) may be positioned such that a view opposite the vaginal opening (such as shown in FIG. 16, for example) can be seen. In some embodiments, one or more cameras can be positioned to view at least part of pelvic bone module 200, sacrospinous ligament module 300, obturator module 400, uterus module 500, bladder module 600, vagina module 800, and/or vulva module 900. In embodiments, one or more cameras may be connected to or otherwise integrated into one or more modules of a pelvic model. For example, in one embodiment, one or more cameras are mounted to pelvic bone module 200. In this embodiment, the camera(s) can be positioned such that a view opposite the vaginal opening (such as shown in FIG. 16, for example) can be seen. In another embodiment, the camera(s) are permanently integrated into the pelvic bone module 200. As another example, in one embodiment, one or more cameras are connected to or integrated into vagina module 800 and/or vulva module 900. In one embodiment, a camera is connected to or integrated into a perimeter of the vaginal opening 900 of the vulva module 900 such that the vaginal opening 810 of the vagina module 800 can be seen as shown in FIG. 29. In some embodiments, the camera(s) are positioned such the cervix 502 of the uterus module 500 that is inserted through the cervix opening 814 of the vagina module 800 can be seen. Numerous other embodiments are disclosed herein and variations are within the scope of this disclosure.

In some embodiments, a sensor is connected to or integrated into a pelvic model. In one embodiment, a sensor is connected to or disposed within a module of a pelvic model. For example, a liquid detection sensor may be connected to the outside of bladder module 600 to detect liquid that spills from the bladder module as a result of the bladder module 600 being punctured. As another example, bladder module 600 may comprise a photoelectronic sensor disposed within the bladder module 600 such that it does not receive light unless the bladder module 600 is punctured. As yet another example, bladder module 600 can comprise a proximity sensor to detect a nick, cut, and/or puncture of the bladder module 600. In some embodiments, one or more sensors are connected to or otherwise integrated into at least part of pelvic bone module 200, sacrospinous ligament module 300, obturator module 400, uterus module 500, bladder module 600, vagina module 800, and/or vulva module 900. In embodiments, a sensor can be a photoelectronic sensor, a pressure sensor, a liquid detection sensor, a proximity sensors, a magnetic sensor, another suitable sensor, or a combination thereof. Numerous other embodiments are disclosed herein and variations are within the scope of this disclosure.

In embodiments, a pelvic model comprises a notification device and/or a display. For example, in one embodiment, base 152 of stand 150 comprises one or more notification devices and/or displays. In another embodiment, one or more modules, such as vulva module 900 and/or bladder module 600 comprises a notification device. For example, in one embodiment, bladder module 600 comprises a light. In this embodiment, the light may remain off until a sensor detects that the bladder has been nicked, cut, and/or punctured and then the light turns on and/or blinks to provide an alert that the bladder has been nicked, cut, and/or punctured. In another embodiment, the base comprises one or more lights that provide notifications as to whether a mistake or potential mistake, such as an inadvertent puncture of a module, has occurred. In some embodiments, notifications can be provided on a display at least partially disposed within base 152 of stand 150. For example, in one embodiment, a surgical procedure can be selected using by pressing a touch-sensitive display partially disposed within base 152 or otherwise connected with pelvic model 100. In this embodiment, once a particular surgical procedure has been selected, pelvic model 100 can determine whether one or more of the modules in pelvic model 100 has been nicked, cut, or punctured. In this embodiment, notifications can be displayed on the display. In some embodiments, a video feed can be displayed on a display at least partially disposed within base 152 of stand 150. For example, a video feed of a view opposite the vaginal opening (such as shown in FIG. 16, for example) can be displayed on the display. In this way a surgeon practicing a surgical procedure may be able to view the location of a surgical tool within the pelvic model 100 on the display.

In embodiments, a touch-sensitive display of a pelvic model is in communication with the processor and is configured to provide signals to the processor or the memory, or both. The memory stores program code or data, or both, for use by the processor and the processor executes program code stored in memory and receives signals from the touch-sensitive display. The processor may output signals to cause the display to output images. In one embodiment, the processor is in communication with the network interface and is configured to receive signals form the network interface and/or to output signals to the network interface to communicate with other components or devices. In some embodiments, the processor can be in communication with one or more sensors in a model. For example, the processor can be in communication with one or more sensors in a stand, pelvic bone module, sacrospinous ligament module, obturator module, uterus module, bladder module, perineum module, vagina module, and/or vulva module. In embodiments, the sensor can send information to the processor and the processor can determine whether a notification should be displayed on a display, another notification device, and/or sent to an electronic device separate from the pelvic model. For example, referring to FIG. 40, pelvic models 4005-4025 may send notifications to one or more electronic devices 4035-4045 through network 4030 via network interfaces in the pelvic models 4005-4025. As another example, referring to FIG. 40, pelvic models 4005-4025 may send one or more video feeds to one or electronic devices 4035-4045 through network 4030 via network interfaces in the pelvic models 4005-4025.

In one embodiment, a pelvic model further comprises a speaker and the processor is in communication with the speaker. In this embodiment, the processor can be configured to output signals to cause the speaker to output various sounds. In this embodiment, if a sensor detects a particular condition (such as a module being nicked, cut, and/or punctured), then the speaker may output a sound notifying a user of the condition.

In one embodiment, a pelvic model can be any device that is capable of receiving notifications and/or video feeds from one or more models. In another embodiment, a pelvic model is capable of receiving user input. For example, in embodiments, a pelvic model comprises a touch-sensitive display that comprises a touch-sensitive surface. In some embodiments, a touch-sensitive surface may be overlaid on the touch-sensitive display. In other embodiments, a pelvic model may comprise or be in communication with a display and a separate touch-sensitive surface. In still other embodiments, a pelvic model may comprise or be in communication with a display and may comprise or be in communication with other user input devices, such as a mouse, a keyboard, buttons, knobs, slider controls, switches, wheels, rollers, other manipulanda, or a combination thereof, that allow the user to provide input.

In various embodiments, a pelvic model may comprise or be in communication with fewer or additional components than described herein. For example, in one embodiment, a pelvic model is not in communication with a speaker. In another embodiment, a pelvic model does not comprise a touch-sensitive display, but comprises a touch-sensitive surface and is in communication with an external display. In other embodiment, a pelvic model may not comprise a display at all. In various embodiments, a pelvic model may comprise or be in communication with any number of components, such as in the various embodiments disclosed herein as well as variations that would be apparent to one of skill in the art.

A housing of a pelvic model can provide protection for at least some of the components pelvic model. For example, a housing of a pelvic model may be a plastic casing that protects a processor and memory from foreign articles such as rain. In some embodiments, a housing protects the components in the housing from damage if a pelvic model is dropped by a user. A housing can be made of any suitable material including but not limited to plastics, rubbers, or metals. Various embodiments may comprise different types of housings or a plurality of housings. In one embodiment, the housing is base 152 of stand 150 of pelvic model 100. In this embodiment, a processor, a memory, a network interface, a notification device, a display, etc. may be disposed within base 152. In embodiments, base 152 of stand 150 of pelvic model 100 comprises some of the components used for providing notifications and/or video feeds to the pelvic model, other pelvic models, and/or electronic devices. For example, in one embodiment, base 152 of stand 150 of pelvic model 100 comprises a processor, a memory, and a network interface.

In embodiments, a network interface of a pelvic model is in communication with a processor and provides wired or wireless communications from the pelvic model to other components or other devices such as one or more other pelvic models and/or electronic devices. For example, in one embodiment, a pelvic model can communicate with an electronic device to send one or more video feeds and/or notifications from the pelvic model to the electronic device. In other embodiments, a network interface of a pelvic model allows the pelvic model to push information to other pelvic models and/or electronic devices. For example, in one embodiment, a pelvic model can push notifications to an electronic device without the electronic device requesting the notifications from the pelvic model. A network interface may provide wireless communications between a pelvic model and an electronic device. A network interface can be any component or collection of components that enables a pelvic model to communicate with another component or device, such as an electronic device. For example, a network interface may comprise a PCI network adapter, a USB network adapter, an Ethernet adapter. In embodiments, a network interface may communicate using wireless Ethernet (such as 802.11a, g, b, and/or n, etc.) standards. In embodiments, one or more pelvic models communicate with a network and request information from one or more electronic devices and/or send information to one or more electronic devices. In other embodiments, one or more pelvic models receive push notifications to one or more electronic devices via a network. In various embodiments, a network interface in a pelvic model communicates with an electronic device using Bluetooth, CDMA, TDMA, FDMA, GSM, WiFi, or other cellular or wireless technology. In some embodiments, a network interface communicates through a wired connection and may be in communication with one or more networks, such as Ethernet, token ring, USB, FireWire 1394, fiber optic, etc. Numerous other embodiments are disclosed herein and variations are within the scope of this disclosure.

Figure 41:
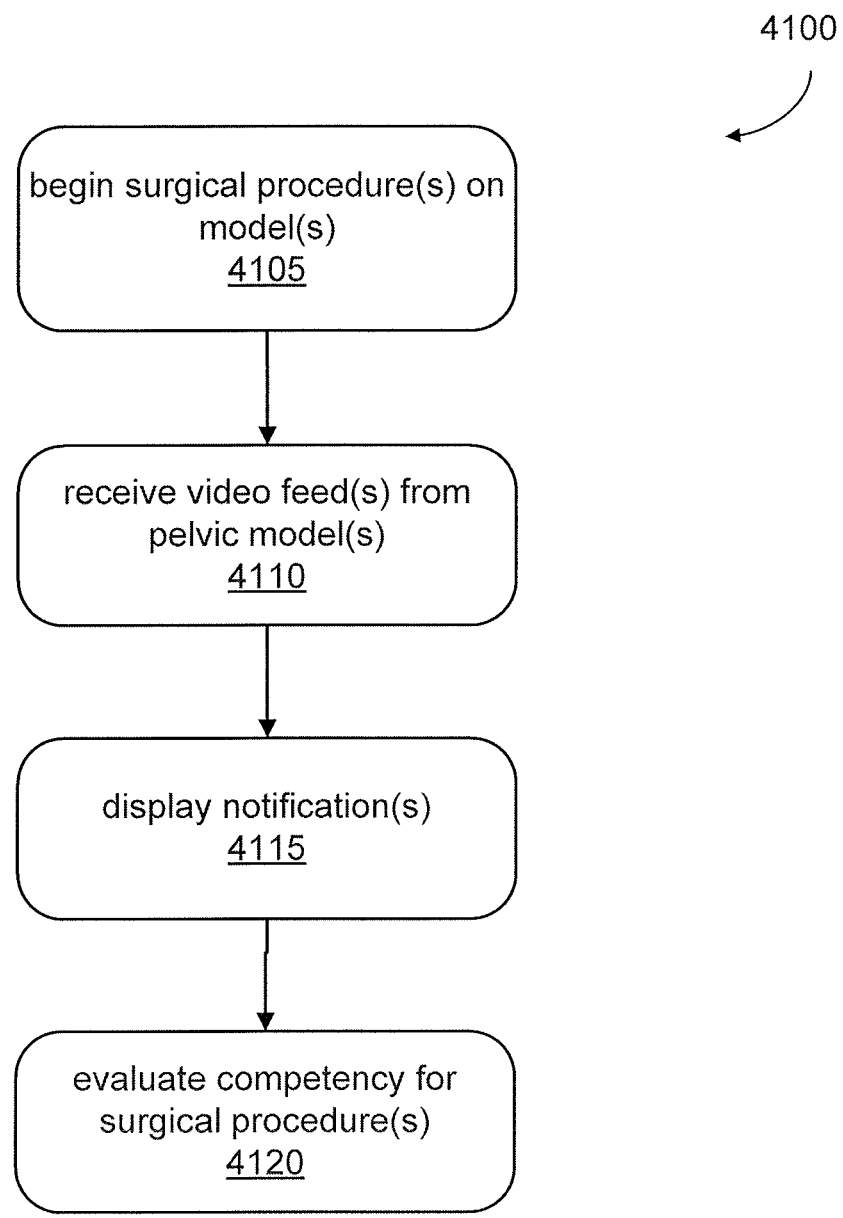
FIG. 41 is a flow chart illustrating a method of remotely evaluating physician competency of a surgical procedure using a pelvic model according to an embodiment.

Referring now to FIG. 41, this figure is a flow chart illustrating a method of evaluating physician competency of a surgical procedure using a pelvic model according to an embodiment. Method 4100 shown in FIG. 41 will be described with respect to system 4000 shown in FIG. 40 and/or with respect to pelvic model 100 described herein.

The method 4100 begins in block 4105 when a surgical procedure is started on one or more models. For example, referring to FIG. 40, a surgical procedure such as a vaginal hysterectomy can be started on pelvic model 4005. As another example, a same surgical procedure such as a vaginal hysterectomy may be started on pelvic models 4005-4025. As yet another example, a first surgical procedure (such as a total vaginal hysterectomy without bilateral salpingo oophorectomy) can be started on pelvic model 4005 and a second, different surgical procedure (such as a bilateral sacrospinous ligament fixation dilation and curettage) can be started on pelvic model 4010. In one embodiment, a same surgical procedure or different surgical procedures are started using pelvic models 4005-4025 at the same time. In other embodiments, a same surgical procedure or different surgical procedures are started using pelvic models 4005-4025 at different times. For example, a first surgical procedure may be started on pelvic model 4005 and a second surgical procedure may be started on pelvic model 4010 after the first surgical procedure has been started but before the first surgical procedure has been completed. As another example, a first surgical procedure may be started on pelvic model 4005 and a second surgical procedure may be started on pelvic model 4010 after the first surgical procedure has been completed. Numerous other embodiments are disclosed herein and variations are within the scope of this disclosure.

Referring back to method 4100, once the surgical procedures(s) have been started on the model(s) 4105, then method 4100 proceeds to block 4110. In block 4110, one or more video feeds are received from one or more models. For example, referring to FIG. 40, one or more video feeds can be received by one or more electronic device (such as tablet 4035, desktop 4040, smartphone 4045, a laptop, another electronic device, etc.) and displayed on a display of the electronic device(s). In one embodiment, a single video feed is received by an electronic device from each of the pelvic models that a surgical procedure is being performed on. For example, if a first surgical procedure is being performed on pelvic model 4005 and a second surgical procedure is being performed on 4010, then a first video feed of at least part of the first surgical procedure being performed on pelvic model 4005 may be received by tablet 4035 and a second video feed of at least part of the second surgical procedure being performed on 4010 may also be received. In this embodiment, a user of the tablet 4035 may simultaneously view the first and second video feed corresponding to the first surgical procedure being performed on pelvic model 4005 and the second surgical procedures being performed on pelvic model 4010, respectively. In this embodiment, a user of the tablet 4035 may evaluate surgical competencies of the person(s) performing the surgical procedures on the pelvic models by viewing the video feeds on the tablet.

In some embodiments, a user of the tablet 4035 can select a particular video feed to display in a larger format. For example, if a first video feed of a first surgical procedure and a second video feed of a second surgical procedure is displayed on tablet 4035, then the user may select the first video feed (by, for example, touching a location of the screen corresponding to the first video feed, selecting the first video teed using a mouse, pressing a key combination corresponding to the first video feed, etc.) to view the first video feed on a larger portion (e.g., twice as large, full screen, etc.) of the tablet 4035.

In some embodiments, more than one video feed may be available for a particular pelvic model. For example, pelvic model 4005 may have one video feed that displays inside a vaginal opening on a pelvic model (such as one or more views shown in FIGS. 2, 19, 25, 29, and/or 32, etc.) and a second video feed that displays an opposite side of the pelvic model (such as one or more views shown in FIGS. 21, 22, etc.). In one embodiment, both the first and the second video feed is simultaneously displayed on a display of an electronic device. In other embodiments, either the first and the second video feed is displayed on a display on an electronic device. For example, a user may select to have the first video feed for pelvic model 4005 displayed on the display of the electronic device. In one embodiment, a user can change the video feed for a particular pelvic model that is displayed on the electronic device. For example, in an embodiment, a user can select a different video feed (such as a second video feed for a particular pelvic model) to display that video feed on the display of the electronic device in addition to or in place of the first video feed for a particular pelvic model.

In one embodiment, one or more video feeds for a particular model can be displayed on an electronic device based at least in part on a surgical procedure that is being performed on the model. For example, in one embodiment, the electronic device displays a first video feed if a first surgical procedure is being performed and a second video feed if a second, different surgical procedure is being performed on the model. In one embodiment, one or more video feeds displayed on an electronic device for a particular model is based at least in part on a current stage of the surgical procedure as it is being performed on the model. For example, if a vaginal hysterectomy is being performed on the model, then a first video feed of the vaginal opening may be displayed until the vagina is cut and then a second video feed of an opposite side of the model (such as one or more views shown in FIGS. 21, 22, etc.) r ray be displayed in addition to or in place of the first video feed once the vagina is initially cut. In this way, an evaluator using the electronic device may be able to automatically view the most relevant view(s) at various times as surgical procedures are performed on one or more surgical models.

In some embodiments, one or more video feeds for a particular model can be displayed on an electronic device based at least in part on an importance of an aspect of a surgical procedure. For example, an important aspect of evaluating surgical competency for a vaginal hysterectomy can be whether a person performing the vaginal hysterectomy nicks, cuts, or punctures a bladder while performing the vaginal hysterectomy. In one embodiment, when a surgical instrument approaches a bladder module in a pelvic model, one or more video feeds displaying at least a part of the bladder are displayed on the electronic device of an evaluator. In this way, an evaluator can automatically be directed to more closely monitor important aspects of a surgical procedure, such as a vaginal hysterectomy, that is being performed on the pelvic model. In one embodiment, a determination as to whether to display a particular video teed can be made by a pelvic model and/or an electronic device receiving the video feed. For example, a distance between a surgical tool and a module in the pelvic model (such as a distance between a scalpel and a bladder module in a pelvic model) can be calculated or estimated and used to determine whether to display a particular video feed on a display of an electronic device of an evaluator. Numerous other embodiments are disclosed herein and variations are within the scope of this disclosure.

Referring back to method 4100, once one or more video feeds are received from one or more pelvic models, one or more notifications can be displayed. For example, one or more notifications can be displayed on a model on which a surgical procedure is being performed and/or on an electronic device. In one embodiment a model comprises one or more visual indicators and/or auditory indicators. In this embodiment, if a mistake and/or potential mistake has been made during a surgical procedure, then the model may activate one or more of the visual indicators and/or auditory indicators. For example, if a person performing a vaginal hysterectomy on a pelvic model nicks, cuts; or punctures a bladder module while performing the vaginal hysterectomy, then a light on the pelvic model may be activated to indicate that the bladder module has been and/or has possibly been nicked, cut, or punctured. In one embodiment, a module may comprise a visual and/or auditory indicator. For example, a bladder module may comprise a visual indicator to alert a person performing a surgical procedure and/or an evaluator that the bladder module has been and/or has possibly been nicked, cut, or punctured during the surgical procedure. In one embodiment, a visual indicator turns on when a mistake and/or possible mistake has occurred. In another embodiment, a visual indicator changes color (such as from green to orange or red) when a mistake and/or possible mistake has occurred. In yet another embodiment, a visual indicator's color is based at least in part on a severity of damage. For example, if a bladder module is nicked then the visual indicator may display orange and if the bladder module is punctured then then visual indicator may display red. Similarly, a first audible sound may be output if a bladder module is nicked and a second audible sound may be output if the bladder module is punctured.

In some embodiments, a visual and/or audible notification is output by an electronic device when a mistake and/or possible mistake is made during a surgical procedure being performed on a model. For example, referring to FIG. 40, in one embodiment an audible notification is output by an electronic device (such as tablet 4035, desktop computer 4040, and/or mobile phone 4045) when a possible mistake is made during one or more surgical procedures being performed on pelvic models 4005-4025. As another example, in some embodiments, a visual indicator (such as a flashing light, an enlarged display of a particular video feed, a symbol, a particular color, etc.) is displayed on a display of the electronic device when a mistake has been made and/or has possibly been made during one or more surgical procedures being performed on pelvic models 4005-4025. In this way, an evaluator can be alerted to possible lack of competencies of person(s) performing surgical procedures on pelvic models 4005-4025. Numerous other embodiments are disclosed herein and variations are within the scope of this disclosure.

A mistake and/or potential mistake may be detected in numerous ways. In one embodiment, a mistake and/or potential mistake is based at least n part on the surgical procedure being performed for on a particular model. For example, a mistake and/or potential mistake can be based on whether a particular module in a model is accidentally nicked, cut, and/or punctured during a surgical procedure that is being performed on the model that should not be nicked, cut, and/or punctured. In one embodiment, a mistake and/or potential mistake is manually detected by an evaluator. For example, an in-person evaluator may watch the surgical procedure being performed on a particular model and determine whether a mistake and/or potential mistake has been made. As another example, an in-person evaluator and/or a remote evaluator may monitor one or more surgical procedures being performed on one or more models by viewing video feed(s) displayed on an electronic device of the evaluator to determine whether a mistake and/or potential mistake has been made. In some embodiments, visual indicators and/or audible indicators output by the pelvic model 4005-4025 and/or electronic devices 4035-4045 aid an evaluator in determining whether a mistake and/or potential mistake was made. For example, as discussed above, blinking lights, colored lights, symbols, sounds, etc. can be used to alert an evaluator that a mistake and/or potential mistake during a particular surgical procedure on a particular pelvic model has occurred.

In some embodiments, video feeds can be used to determine a mistake or possible mistake. For example, a video feed of a particular module can be used to determine whether a surgical instrument has contacted that module, punctured that module etc. In some embodiments, one or more modules in a model comprises one or more sensors used to detect a mistake and/or possible mistake. For example, a photoelectronic sensor may be integrated into or otherwise placed inside a module (such as a bladder module) that can detect a puncture of the module. As another example, a pressure sensor may be integrated into or connected with a module and used whether threshold pressure(s) on the module are exceeded during a surgical procedure performed on the model to determine whether the module has been nicked, cut, and/or punctured. In one embodiment, where the bladder module is filled with a liquid, a liquid detection sensor can be used on the outside of the bladder module to determine whether the bladder module has been punctured during a surgical procedure. In another embodiment, a proximity sensor integrated into or connected with a module to determine whether a surgical instrument has nicked, cut, and/or punctured the module. In yet another embodiment, a magnetic sensor is integrated into or connected with a module to determine whether a surgical instrument has nicked, cut, and/or punctured the module. In various embodiments, one or more cameras, photoelectronic sensors, pressure sensors, liquid detection sensors, proximity sensors, magnetic sensors, other suitable sensors, etc. are integrated into or connected with a model, such as pelvic model 100. In some embodiments, one or more cameras, photoelectronic sensors, pressure sensors, liquid detection sensors, proximity sensors, magnetic sensors, other suitable sensors, etc. are integrated into or connected with a module (such as pelvic bone module 200, sacrospinous ligament module 300, one or more obturator modules 400, uterus module 500, bladder module 600, perineum module 700, vagina module 800, and/or vulva module 900) and/or stand 150 in pelvic model 100. Numerous other embodiments are disclosed herein and variations are within the scope of this disclosure.

Referring back to method 4100, using video feed(s) 4110 and/or notification(s) 4115, surgical competency for one or more surgical procedures being performed can be evaluated as shown in block 4120. For example, in one embodiment, one or more evaluators can evaluate surgical competencies for surgical procedures being performed on pelvic models 4005-4025 in-person. In this embodiment, an evaluator may watch all or portions of surgical procedures as they are being performed on pelvic models 4005-4025 by viewing the actual pelvic models 4005-4025 as the surgical procedures are being performed. In another embodiment, an evaluator can watch one or more video feeds on a display of an electronic device for one or more surgical procedures being performed on pelvic models 4005-4025 In this embodiment, an evaluator may be local (such as in the same room or the same building) as where the surgical procedures are being performed on pelvic models 4005-4025. In some embodiments, an evaluator is remote (e.g., at a different location) as where the surgical procedures are being performed on pelvic models 4005-4025. In this embodiment, an evaluator may evaluate competencies for surgical procedures that are simultaneously being performed in one, two, three, four, or more different locations by viewing video feeds of the surgical procedures. In one embodiment, video feeds of one or more surgical procedures are stored in a repository (such as a file, database, network, cloud-based storage, etc.) such that competencies for surgical procedures can be evaluated at a later time. In this embodiment, comparisons between various surgical procedures that were performed on pelvic models 4005-4025 can also be evaluated to determine common mistakes, improve competency guidelines, improve detection of mistakes, etc. Numerous other embodiments are disclosed herein and variations are within the scope of this disclosure.

While some methods and systems herein are described in terms of software executing on various machines, these methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for a pelvic model to send a notification to an electronic device and/or for an electronic device to receive and display notifications received from a pelvic model. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICS), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

The order of the blocks presented in the examples above for embodiments of the methods disclosed herein can be varied for example, blocks can be re-ordered, combined, and/or broken into sub-blocks. For example, referring to FIG. 37, in one embodiment, blocks 3710-3740 may be performed and then block 3705 can be performed. In this embodiment, a sacrospinous ligament module, an obturator module, an uterus module, a bladder module, a perineum module, a vagina module, and/or a vulva module can be attached before a pelvic bone module is attached to a stand. As another example, referring to FIG. 38, in one embodiment, block 3840 may be performed before blocks 3805-3835. In this embodiment, a pelvic bone module can be detached from the stand before a sacrospinous ligament module, an obturator module, an uterus module, a bladder module, a perineum module, a vagina module, and/or a vulva module are detached from the pelvic bone module. Certain blocks or processes can be performed in parallel. Thus, while the steps of methods disclosed herein have been shown and described in a particular order, other embodiments may comprise the same, additional, or fewer steps. Some embodiments may perform the steps in a different order or in parallel.

The use of "adapted to" or "configured to" herein is meant as open and inclusive language that does not foreclose devices, systems, or methods adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A vagina module for use in a pelvic model, the vagina module comprising:
    a first material defining a vagina, the first material defining a plurality of openings corresponding with a plurality of protrusions on a pelvic bone module, wherein the vagina module is attachable to and detachable from the pelvic bone module by slipping each of the plurality of openings over a respective protrusion from the plurality of protrusions on the pelvic bone module.

2. The vagina module of claim 1, wherein the first material further defines:
    a cervix opening configured to receive at least part of a uterus module; and
    a urethra opening.

3. The vagina module of claim 2, wherein the first material defines a vaginal wall in the vagina.

4. The vagina module of claim 3, wherein the vaginal wall comprises a plurality of ridges.

5. The vagina module of claim 4, wherein the first material comprises a durometer of approximately 10 on a Shore 00 scale.

6. The vagina module of claim 1, further comprising a second material defining an endopelvic fascia layer.

7. The vagina module of claim 6, wherein the endopelvic fascia layer comprises a means of attaching to and detaching from the pelvic bone module.

8. The vagina module of claim 6, wherein the endopelvic fascia layer is permanently attached to the vagina.

9. The vagina module of claim 6, wherein the second material comprises a durometer of approximately 20 on a Shore 00 scale.

10. The vagina module of claim 6, wherein the second material further defines a plurality of fittings configured to attach to the pelvic bone module.

11. The vagina module of claim 6, wherein at least part of the vagina is glued to at least part of the endopelvic fascia layer using a filler material.

12. The vagina module of claim 11, wherein the filler material comprises a durometer of approximately 10 on a Shore 00 scale.

13. The vagina module of claim 1, wherein the plurality of openings comprise three openings.

14. The vagina module of claim 13, wherein the three openings form a triangular shape.

15. The vagina module of claim 1, wherein at least part of the vagina is reinforced with a subcutaneous mesh.

16. The vagina module of claim 1, wherein the first material comprises a thickness between approximately two millimeters and five millimeters in the vagina.

17. The vagina module of claim 1, wherein the plurality of protrusions in the pelvic bone module comprise a plurality of pegs and each of the plurality of openings is configured to slip over a respective peg from the plurality of pegs.

18. The vagina module of claim 1, wherein the first material further defines the plurality of openings.

19. The vagina module of claim 1, further comprising:
    a vaginal opening corresponding with an opening on a vulva module.

* * * * *